United States Patent
Lee et al.

(10) Patent No.: US 12,236,156 B2
(45) Date of Patent: Feb. 25, 2025

(54) SIGNAL PROCESSING DEVICE AND VEHICLE DISPLAY APPARATUS INCLUDING MULTIPLE DISPLAYS

(71) Applicant: LG ELECTRONICS INC., Seoul (KR)

(72) Inventors: Chulhee Lee, Seoul (KR); Junyoung Jung, Seoul (KR); Dongkyu Lee, Seoul (KR); Eunkoo Lee, Seoul (KR); Eunjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/288,250

(22) PCT Filed: Jan. 13, 2022

(86) PCT No.: PCT/KR2022/000622
§ 371 (c)(1),
(2) Date: Oct. 25, 2023

(87) PCT Pub. No.: WO2023/136374
PCT Pub. Date: Jul. 20, 2023

(65) Prior Publication Data
US 2024/0211197 A1    Jun. 27, 2024

(51) Int. Cl.
*G06F 3/14*       (2006.01)
*B60K 35/22*     (2024.01)
*B60K 35/28*     (2024.01)

(52) U.S. Cl.
CPC ............ *G06F 3/1454* (2013.01); *B60K 35/22* (2024.01); *B60K 35/28* (2024.01); *B60K 2360/182* (2024.01); *B60K 2360/184* (2024.01)

(58) Field of Classification Search
None
See application file for complete search history.

(56) References Cited

U.S. PATENT DOCUMENTS 8,499,114 B1 *  7/2013  Vincent ..................... G06F 8/65
                                                    711/6
2015/0109262 A1 *  4/2015  Nagao ..................... G06F 3/038
                                                    345/178

(Continued)

FOREIGN PATENT DOCUMENTS

JP          6292232 B2      3/2018
JP        2021-162602 A    10/2021

(Continued)

*Primary Examiner* — Jeffrey J Chow
(74) *Attorney, Agent, or Firm* — Birch, Stewart, Kolasch & Birch, LLP

(57) ABSTRACT

The present disclosure relates to a signal processing device and a vehicle display apparatus including the same. The signal processing device according to an embodiment of the present disclosure includes a processor configured to perform signal processing for displays located in a vehicle, wherein the processor is configured to: display a first image including a first overlay on a first display, transmit the first image by screen sharing, and display a second image of a mirrored image corresponding to the first image on a second display; generate a second overlay different from the first overlay while displaying the first image and the second image; transmit information related to the second overlay by instance copying; and display a second overlay generated based on the information related to the second overlay on top of the first image or the second image. Accordingly, objects may be displayed rapidly and accurately by instance copying during screen sharing.

20 Claims, 39 Drawing Sheets

(56) References Cited

U.S. PATENT DOCUMENTS

| | | | |
|---|---|---|---|
| 2017/0253122 A1* | 9/2017 | Jun | G06T 11/60 |
| 2017/0255442 A1* | 9/2017 | Kim | G06F 1/1652 |
| 2018/0129467 A1* | 5/2018 | Gage | B60N 2/002 |
| 2018/0208060 A1* | 7/2018 | Kim | B60K 35/00 |
| 2018/0293965 A1* | 10/2018 | Vembu | G06F 9/45533 |
| 2019/0225082 A1* | 7/2019 | Mittag | H04W 4/40 |
| 2019/0379712 A1 | 12/2019 | Mota et al. | |
| 2020/0104004 A1* | 4/2020 | Yaginuma | G06F 3/0416 |
| 2020/0159562 A1* | 5/2020 | Lee | G06F 3/1423 |
| 2020/0210360 A1* | 7/2020 | Reghunath | G06F 3/14 |
| 2020/0218487 A1* | 7/2020 | Rush | G06F 3/1423 |
| 2020/0219469 A1* | 7/2020 | Mittal | B60K 35/22 |
| 2022/0028029 A1* | 1/2022 | Tanibata | B60K 35/00 |
| 2022/0092198 A1* | 3/2022 | Afroz | G06F 21/602 |
| 2023/0221964 A1* | 7/2023 | Takahashi | G06F 3/14 |
| | | | 719/319 |
| 2024/0042858 A1* | 2/2024 | Kamiya | G09G 5/36 |
| 2024/0083252 A1* | 3/2024 | Kamiya | G09G 5/377 |

FOREIGN PATENT DOCUMENTS

| | | |
|---|---|---|
| KR | 10-2015-0009121 A | 1/2015 |
| KR | 10-2017-0033699 A | 3/2017 |

\* cited by examiner

SIGNAL PROCESSING DEVICE AND VEHICLE DISPLAY APPARATUS INCLUDING MULTIPLE DISPLAYS

CROSS REFERENCE TO RELATED APPLICATIONS

This application is the National Phase of PCT International Application No. PCT/KR2022/000622, filed on Jan. 13, 2022, which is hereby expressly incorporated by reference into the present application.

BACKGROUND

1. Technical Field

The present disclosure relates to a signal processing device and a vehicle display apparatus including the same, and more particularly to a signal processing device capable of displaying objects rapidly and accurately by instance copying during screen sharing, and a vehicle display apparatus including the signal processing device.

2. Description of the Related Art

A vehicle is an apparatus that a driver moves in a desired direction. A representative example of the vehicle is a car.

Meanwhile, a display apparatus for vehicle is mounted in the vehicle for convenience of users who use the vehicle.

For example, a display is disposed in a cluster to display various kinds of information. Meanwhile, to display vehicle driving information, various displays, such as an audio video navigation (AVN) display, are mounted in the vehicle, in addition to the cluster.

In the case in which the number of displays in the display apparatus for vehicle is increased, however, signal processing for the displays is complicated.

Meanwhile, during display of images using a plurality of overlays on a plurality of displays, a problem occurs in that signal processing becomes complicated.

Particularly, if an additional object and the like need to be displayed on the plurality of displays during screen sharing, very complicated signal processing is required, such that it is difficult to rapidly display the object

SUMMARY

It is an objective of the present disclosure to provide a signal processing device capable of displaying objects rapidly and accurately by instance copying during screen sharing, and a vehicle display apparatus including the signal processing device.

Meanwhile, it is another objective of the present disclosure to provide a signal processing device capable of displaying objects rapidly and accurately by instance copying during screen sharing even when the number of virtual machines increases, and a vehicle display apparatus including the signal processing device.

In accordance with an aspect of the present disclosure, the above and other objects can be accomplished by the provision of a signal processing device including a processor configured to perform signal processing for displays located in a vehicle, wherein the processor is configured to: display a first image including a first overlay on a first display, transmit the first image by screen sharing, and display a second image of a mirrored image corresponding to the first image on a second display; generate a second overlay different from the first overlay while displaying the first image and the second image; transmit information related to the second overlay by instance copying; and display a second overlay generated based on the information related to the second overlay on top of the first image or the second image.

Meanwhile, after displaying the first image and the second image, the processor may be configured to display images including the first overlay and the second overlay on the first display and the second display, respectively.

Meanwhile, in response to receiving an input through a human machine interface while displaying the first image and the second image, the processor may be configured to generate the second overlay.

Meanwhile, the processor may be configured to: in response to receiving an input through the first display while displaying the first image and the second image, generate the second overlay and display a third image, including the first overlay and the second overlay on the first display; transmit information related to the second overlay by instance copying; and display a fourth image including a second overlay generated based on the information related to the second overlay and the first overlay on the second display.

Meanwhile, the processor may be configured to: in response to receiving an input through the second display while displaying the first image and the second image, generate the second overlay and display a third image, including the first overlay and the second overlay on the second display; transmit information related to the second overlay by instance copying; and display a fourth image including a second overlay generated based on the information related to the second overlay and the first overlay on the first display.

Meanwhile, the processor may be configured to execute a plurality of containers, the plurality of containers operating for the plurality of displays, respectively, wherein among the plurality of containers, a first container may be configured to transmit the information related to the second overlay to a second container by the instance copying, and the second container may be configured to generate the second overlay based on the information received from the first container.

Meanwhile, the first overlay may include map information, and the second overlay may include message information.

Meanwhile, the first overlay may include map information, and the second overlay may include a search item, a zoom in item, and a zoom out item.

Meanwhile, the first overlay may include map information, and the second overlay may include an item corresponding to a human machine interface, wherein in response to receiving an input through the human machine interface, the processor may be configured to generate the second overlay.

Meanwhile, the processor may be configured to: display the first image including the first overlay on the first display; display a second image of a mirrored image corresponding to the first image on the second display by screen sharing; and while displaying the second image on the second display, further display screen sharing information.

Meanwhile, while displaying the screen sharing information, the processor may be configured to further display seat information related to an image source.

Meanwhile, the processor may be configured to: display the first image including the first overlay on the first display; and while displaying a second image of a mirrored image corresponding to the first image, on the second display by the screen sharing, enlarge and display the second image step by step in a direction between the first display and the second display.

Meanwhile, while displaying the second image on the second display, the processor may be configured to control the screen sharing information to disappear after being displayed for a predetermined period of time.

Meanwhile, the processor may be configured to: display a first image including map information on the first display and display a second image of a mirrored image corresponding to the first image on the second display; in response to receiving destination information through the second display while displaying the first image and the second image, generate the second overlay corresponding to the destination information; transmit information related to the second overlay by instance copying; and display a second overlay generated based on the information related to the second overlay on top of the first image on the first display.

Meanwhile, the processor may be configured to: display a first image including a menu options screen on the first display and display a second image of a mirrored image corresponding to the first image on the second display; in response to receiving order information through the second display while displaying the first image and the second image, generate the second overlay corresponding to the order information; transmit information related to the second overlay by instance copying; and display a second overlay generated based on the information related to the second overlay on top of the first image on the first display.

Meanwhile, the processor may be configured to: display a first image including map information on the first display and display a second image of a mirrored image corresponding to the first image on the second display; in response to receiving traffic information and place information while displaying the first image and the second image, generate the second overlay corresponding to the traffic information and a third overlay corresponding to the place information; transmit information related to the second overlay by instance copying and information related to the third overlay; display a second overlay generated based on the information related to the second overlay on top of the first image on the first display; and display a third overlay generated based on the information related to the third overlay on top of the second image on the second display.

Meanwhile, the processor may be configured to: display a first mage on the first display and display a second image corresponding to the first image on the second display; in response to receiving social networking service information while displaying the first image and the second image, generate the second overlay corresponding to the social networking service information; transmit information related to the second overlay by instance copying; display a second overlay generated based on the information related to the second overlay on top of the first image on the first display; and not display the second overlay on the second display.

Meanwhile, the processor may be configured to execute a server virtual machine and a plurality of guest virtual machines, wherein: a first guest virtual machine among the plurality of guest virtual machines may be configured to display the first image including a first overlay on the first display and to transmit the first image by screen sharing; and a second guest virtual machine among the plurality of guest virtual machines may be configured to display a second image of a mirrored image corresponding to the first image on the second display, wherein: the first guest virtual machine among the plurality of guest virtual machines may be configured to generate a second overlay different from the first overlay, while displaying the first image and the second image and to transmit information related to the second overlay by instance copying; and the second guest virtual machine among the plurality of guest virtual machines may be configured to display a second overlay generated based on the information related to the second overlay on top of the second image.

In accordance with another aspect of the present disclosure, there is provided a vehicle display apparatus including: a first display; a second display; and a signal processing device including a processor configured to perform signal processing for the first display and the second display, wherein the processor is configured to: display a first image including a first overlay on a first display, transmit the first image by screen sharing, and display a second image of a mirrored image corresponding to the first image on a second display; generate a second overlay different from the first overlay while displaying the first image and the second image; transmit information related to the second overlay by instance copying; and display a second overlay generated based on the information related to the second overlay on top of the first image or the second image.

Effects of the Disclosure

A signal processing device according to an embodiment of the present disclosure includes a processor configured to perform signal processing for displays located in a vehicle, wherein the processor is configured to: display a first image including a first overlay on a first display, transmit the first image by screen sharing, and display a second image of a mirrored image corresponding to the first image on a second display; generate a second overlay different from the first overlay while displaying the first image and the second image; transmit information related to the second overlay by instance copying; and display a second overlay generated based on the information related to the second overlay on top of the first image or the second image. Accordingly, objects may be displayed rapidly and accurately by instance copying during screen sharing. Particularly, the second overlay may be displayed rapidly and accurately.

Meanwhile, after displaying the first image and the second image, the processor may be configured to display images including the first overlay and the second overlay on the first display and the second display, respectively. Accordingly, the images including the first overlay and the second overlay may be displayed rapidly and accurately.

Meanwhile, in response to receiving an input through a human machine interface while displaying the first image and the second image, the processor may be configured to generate the second overlay. Accordingly, the second overlay may be displayed rapidly and accurately.

Meanwhile, the processor may be configured to: in response to receiving an input through the first display while displaying the first image and the second image, generate the second overlay and display a third image, including the first overlay and the second overlay on the first display; transmit information related to the second overlay by instance copying; and display fourth image including a second overlay generated based on the information related to the second overlay and the first overlay on the second display. Accordingly, the third image and the fourth image, which include the first overlay and the second overlay, may be displayed rapidly and accurately.

Meanwhile, the processor may be configured to: in response to receiving an input through the second display while displaying the first image and the second image, overlay and display a third image, generate the second including the first overlay and the second overlay on the second display; transmit information related to the second overlay by instance copying; and display a fourth image including a second overlay generated based on the information related to the second overlay and the first overlay on the first display. Accordingly, the third image and the fourth image, which include the first overlay and the second overlay, may be displayed rapidly and accurately.

Meanwhile, the processor may be configured to execute a plurality of containers, the plurality of containers operating for a plurality of displays, respectively, wherein among the plurality of containers, a first container may be configured to transmit the information related to the second overlay to a second container by the instance copying, and the second container may be configured to generate the second overlay based on the information received from the first container. Accordingly, the image including the second overlay may be displayed rapidly and accurately.

Meanwhile, the first overlay may include map information, and the second overlay may include message information. Accordingly, the message information may be displayed rapidly and accurately.

Meanwhile, the first overlay may include map information, and the second overlay may include a search item, a zoom in item, and a zoom out item. Accordingly, the search item, zoom in item, and zoom out item may be displayed rapidly and accurately on the map information.

Meanwhile, the first overlay may include map information, and the second overlay may include an item corresponding to a human machine interface, wherein in response to receiving an input through the human machine interface, the processor may be configured to generate the second overlay. Accordingly, the second overlay may be displayed rapidly and accurately.

Meanwhile, the processor may be configured to: display the first image including the first overlay on the first display; display a second image of a mirrored image corresponding to the first image on the second display by screen sharing; and while displaying the second image on the second display, further display screen sharing information. Accordingly, the screen sharing information may be displayed rapidly and accurately.

Meanwhile, while displaying the screen sharing information, the processor may be configured to further display seat information related to an image source. Accordingly, the seat information may be displayed rapidly and accurately.

Meanwhile, the processor may be configured to: display the first image including the first overlay on the first display; and while displaying a second image of a mirrored image corresponding to the first image, on the second display by the screen sharing, enlarge and display the second image step by step in a direction between the first display and the second display. Accordingly, the direction between the first display and the second display may be displayed intuitively.

Meanwhile, while displaying the second image on the second display, the processor may be configured to control the screen sharing information to disappear after being displayed for a predetermined period of time. Accordingly, the screen sharing information may be provided for a predetermined period of time.

Meanwhile, the processor may be configured to: display a first image including map information on the first display and display a second image of a mirrored image corresponding to the first image on display; in response to receiving destination information through the second display while displaying the first image and the second image, generate the second overlay corresponding to the destination information; transmit information related to the second overlay by instance copying; and display a second overlay generated based on the information related to the second overlay on top of the first image on the first display. Accordingly, the second overlay corresponding to the destination information may be displayed and rapidly accurately.

Meanwhile, the processor may be configured to: display a first image including a menu option screen on the first display and display a second image of a mirrored image corresponding to the first image on the second display; in response to receiving order information through the second display while displaying the first image and the second image, generate the second overlay corresponding to the order information; transmit information related to the second overlay by instance copying; and display a second overlay generated based on the information related to the second overlay on top of the first image on the first display. Accordingly, the second overlay corresponding to the order information may be displayed rapidly and accurately.

Meanwhile, the processor may be configured to: display a first image including map information on the first display and display a second image of a mirrored image corresponding to the first image on the second display; in response to receiving traffic information and place information while displaying the first image and the second image, generate the second overlay corresponding to the traffic information and a third overlay corresponding to the place information; transmit information related to the second overlay by instance copying and information related to the third overlay; display a second overlay generated based on the information related to the second overlay on top of the first image on the first display; and display a third overlay generated based on the information related to the third overlay on top of the second image on the second display. Accordingly, different information may be displayed on each display rapidly and accurately.

Meanwhile, the processor may be configured to: display a first mage on the first display and display a second image corresponding to the first image on the second display; in response to receiving social networking service information while displaying the first image and the second image, generate the second overlay corresponding to the social networking service information; transmit information related to the second overlay by instance copying; display a second overlay generated based on the information related to the second overlay on top of the first image on the first display; and not display the second overlay on the second display. Accordingly, the second overlay may be displayed rapidly and accurately only on the first display.

Meanwhile, the processor may be configured to execute a server virtual machine and a plurality of guest virtual machines, wherein: a first guest virtual machine among the plurality of guest virtual machines may be configured to display the first image including a first overlay on the first display and to transmit the first image by screen sharing; and a second guest virtual machine among the plurality of guest virtual machines may be configured to display a second image of a mirrored image corresponding to the first image on the second display, wherein: the first guest virtual machine among the plurality of guest virtual machines may be configured to generate a second overlay different from the first overlay, while displaying the first image and the second image and to transmit information related to the second overlay by instance copying; and the second guest virtual machine among the plurality of guest virtual machines may be configured to display a second overlay generated based on the information related to the second overlay on top of the second image. Accordingly, the second overlay may be displayed rapidly and accurately.

In accordance with another aspect of the present disclosure, there is provided a vehicle display apparatus including: a first display; a second display; and a signal processing device including a processor configured to perform signal processing for the first display and the second display, wherein the processor is configured to: display a first image including a first overlay on a first display, transmit the first image by screen sharing, and display a second image of a mirrored image corresponding to the first image on a second display; generate a second overlay different from the first overlay while displaying the first image and the second image; transmit information related to the second overlay by instance copying; and display a second overlay generated based on the information related to the second overlay on top of the first image or the second image. Accordingly, objects may be displayed rapidly and accurately by instance copying during screen sharing. Particularly, the second overlay may be displayed rapidly and accurately.

BRIEF DESCRIPTION OF THE DRAWINGS

The embodiments will be described in detail with reference to the following drawings in which like reference numerals refer to like elements wherein.

DETAILED DESCRIPTION

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
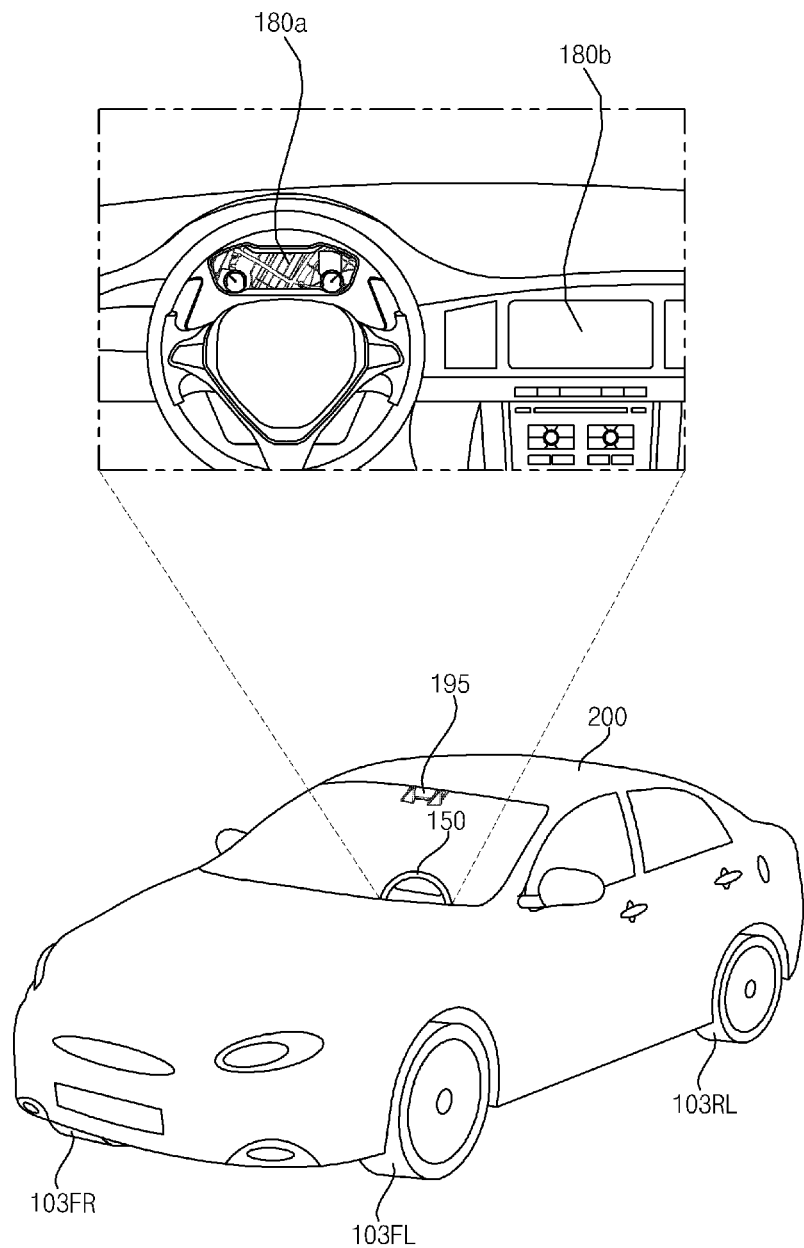
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
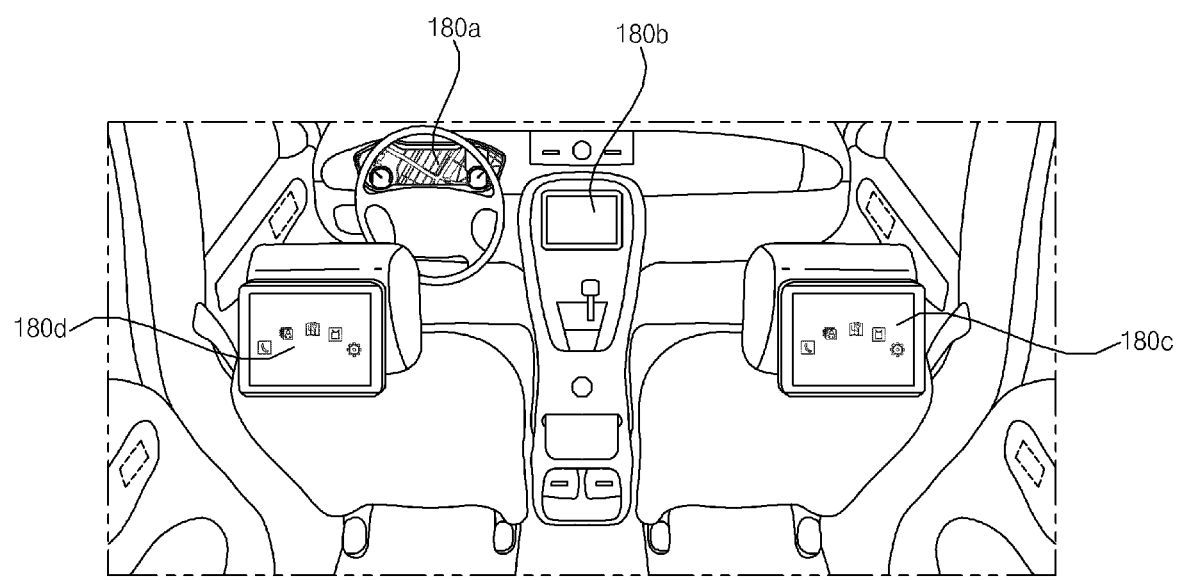
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be mounted in the vehicle.

The embodiment of the present disclosure proposes a scheme for a vehicle display apparatus 100 capable of displaying objects rapidly and accurately by instance copying during screen sharing, which will be described later with reference to FIG. 5 and the following figures.

Figure 2:
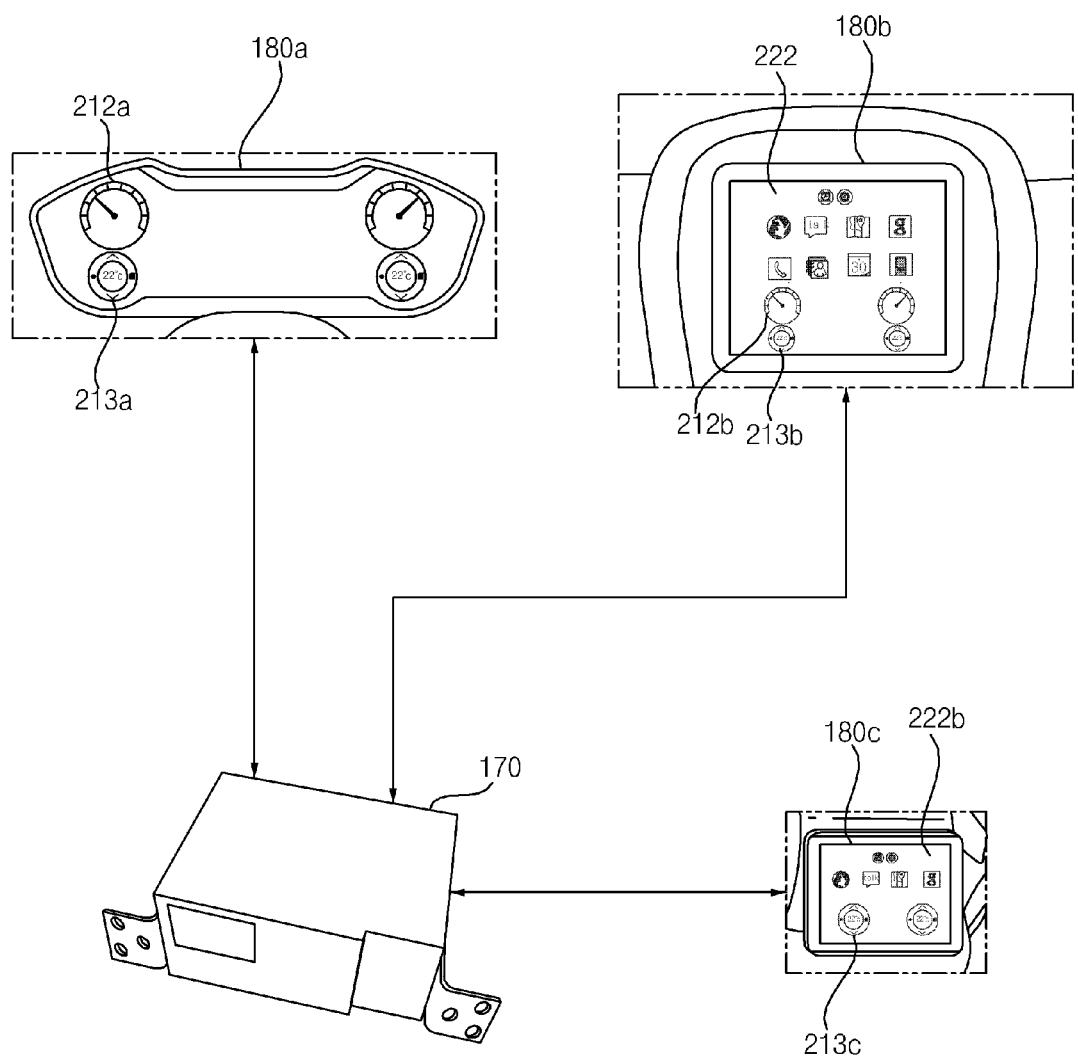
FIG. 2 is a view showing the external appearance of a display apparatus for vehicle according to an embodiment of the present disclosure.

FIG. 2 is a view showing the external appearance of a display apparatus for vehicle according to an embodiment of the present disclosure.

The display apparatus 100 for vehicle according to the embodiment of the present disclosure may include a plurality of displays 180a and 180b and a signal processing device 170 configured to perform signal processing to display images and information on the plurality of displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines 520 to 540 may be executed by a hypervisor 505 in the processor 175.

The second virtual machine 530 may be operated for the first display 180a, and the third virtual machine 540 may be operated for the second display 180b.

Meanwhile, the first virtual machine 520 in the processor 175 may be configured to set a shared memory 508 based on the hypervisor 505 for transmission of the same data to the second virtual machine 530 and the third virtual machine 540. Consequently, the first display 180a and the second display 180b in the vehicle may be configured to display the same information or the same images in a synchronized state.

Meanwhile, the first virtual machine 520 in the processor 175 shares at least some of data with the second virtual machine 530 and the third virtual machine 540 for divided processing of data. Consequently, the plurality of virtual machines for the plurality of displays in the vehicle may divide and process data.

Meanwhile, the first virtual machine 520 in the processor 175 may receive and process wheel speed sensor data of the vehicle, and may transmit the processed wheel speed sensor data to at least one of the second virtual machine 530 or the third virtual machine 540. Consequently, at least one virtual machine may share the wheel speed sensor data of the vehicle.

In response to touch being input to any one of the displays 180a and 180b or 180a to 180c configured to be operated under various operating systems, the signal processing device 170 according to the embodiment of the present disclosure may be configured to rapidly and accurately process the touch input.

Meanwhile, FIG. 2 illustrates that a vehicle speed indicator 212a and an in-vehicle temperature indicator 213a are displayed on the first display 180a, a home screen 222 including a plurality of applications, a vehicle speed indicator 212b, and an in-vehicle temperature indicator 213b is displayed on the second display 180b, and a second home screen 222b including a plurality of applications and an in-vehicle temperature indicator 213c is displayed on the third display 180c.

Figure 3:
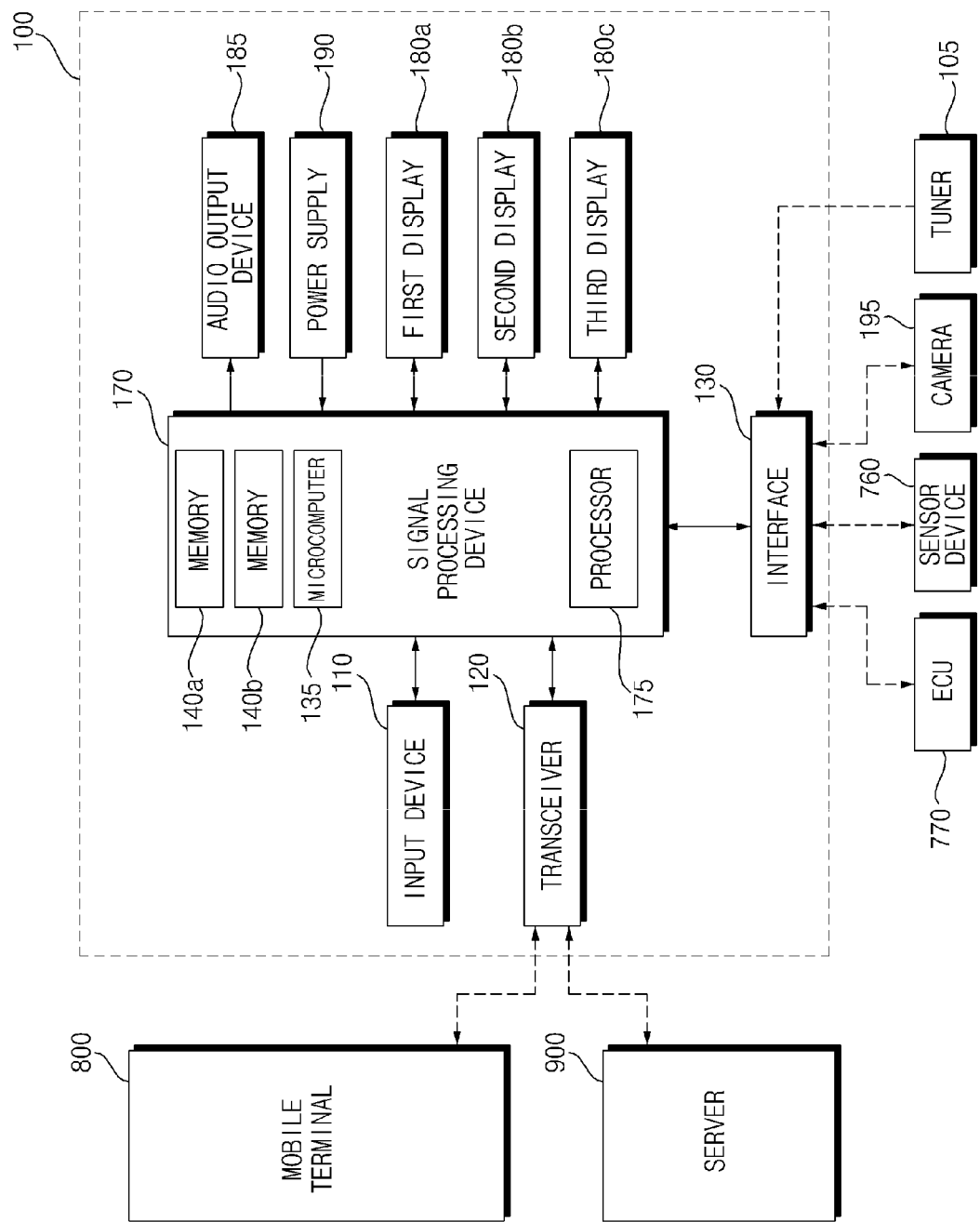
FIG. 3 illustrates an example of an internal block diagram of the display apparatus for vehicle of FIG. 2.

FIG. 3 illustrates an example of an internal block diagram of the display apparatus for vehicle according to the embodiment of the present disclosure.

Referring to the figure, the display apparatus 100 for vehicle according to the embodiment of the present disclosure may include an input device 110, a transceiver 120, an interface 130, a memory 140, a signal processing device 170, a plurality of displays 180a to 180c, an audio output device 185, and a power supply 190.

The input device 110 may include a physical button or pad for button input or touch input.

Meanwhile, the input device 110 may include a touch sensor (not shown) configured to sense touch input to the displays 180a, 180b, and 180c.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 800 or the server 900. To this end, the transceiver 120 may include a mobile communication module (not shown).

The interface 130 may receive sensor information from an electronic control unit (ECU) 770 or a sensor device 760, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown), and may transmit the received information to the signal processing device 170.

The memory 140 may store various data necessary for overall operation of the display apparatus 100 for vehicle, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicle.

For example, the signal processing device 170 may include a processor 175 configured to perform signal processing for the displays 180a and 180b.

The processor 175 may execute the first to third virtual machines 520 to 540 on the hypervisor 505 (see FIG. 5) in the processor 175.

Meanwhile, the processor 175 may further execute a legacy virtual machine configured to receive and process Ethernet data. For example, as shown in FIG. 5, the legacy virtual machine may be executed by the first virtual machine 520 in the processor 175.

Among the first to third virtual machines 520 to 540 (see FIG. 5), the first virtual machine 520 may be called a server virtual machine, and the second and third virtual machines 530 and 540 may be called guest virtual machines.

The second virtual machine 530 may be operated for the first display 180a, and the third virtual machine 540 may be operated for the second display 180b.

For example, the first virtual machine 520 in the processor 175 may receive, process, and output vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may process most of the data, whereby 1:N data sharing may be achieved.

As another example, the first virtual machine 520 may directly receive and process CAN communication data, audio data, radio data, USB data, and wireless communication data for the second and third virtual machines 530 and 540.

The first virtual machine 520 may transmit the processed data to the second and third virtual machines 530 and 540.

Consequently, only the first virtual machine 520, among the first to third virtual machines 520 to 540, may receive communication data and external input data, and may perform signal processing, whereby load in signal processing by the other virtual machines may be reduced and 1:N data communication may be achieved, and therefore synchronization at the time of data sharing may be achieved.

Meanwhile, the first virtual machine 520 writes some of data in a first shared memory (not shown) to be transmitted to the second virtual machine 530, and writes some other of data in the first shared memory (not shown) to be transmitted to the third virtual machine 540. The second virtual machine 530 and the third virtual machine 540 are configured to process the received data, and write the processed data in a second shared memory (not shown). Accordingly, objects may be displayed rapidly and accurately by instance copying during screen sharing.

At this time, data may be any one of image data, audio data, navigation data, and voice recognition data.

Meanwhile, the first virtual machine 520 may process some other of data, and may be configured to write the processed data in the second shared memory (not shown). That is, the first virtual machine 520 may perform data processing in addition to the second virtual machine 530 and the third virtual machine 540.

Meanwhile, in response to a fourth virtual machine 550 configured to be operated for the third display 180c being executed in the processor 175, the first virtual machine 520 may write some other of data in the first shared memory (not shown), and the fourth virtual machine 550 may process the received data and may be configured to write the processed data in the second shared memory (not shown).

Meanwhile, the first virtual machine 520 may generate command queues for distributed processing of data in the second virtual machine 530 and the third virtual machine 540. Consequently, the plurality of virtual machines may divide and process data.

Meanwhile, in response to the second virtual machine 530 and the third virtual machine 540 sharing the same data, the first virtual machine 520 in the processor 175 may generate one command queue. Consequently, the same data may be synchronized and shared.

Meanwhile, the first virtual machine 520 may generate command queues corresponding to the number of virtual machines for distributed processing of data.

Meanwhile, the first virtual machine 520 may be configured to transmit at least some of data to at least one of the second virtual machine 530 or the third virtual machine 540 for distributed processing of data.

For example, the first virtual machine 520 may allocate the first shared memory (not shown) for transmitting at least some of data to at least one of the second virtual machine 530 or the third virtual machine 540, and image data processed by the second virtual machine 530 or the third virtual machine 540 may be written in the second shared memory (not shown).

Meanwhile, the first virtual machine 520 may be configured to write data in the shared memory 508, whereby the second virtual machine 530 and the third virtual machine 540 share the same data.

For example, the first virtual machine 520 may be configured to write radio data or wireless communication data in the shared memory 508, whereby the second virtual machine 530 and the third virtual machine 540 share the same data. Consequently, 1:N data sharing may be achieved.

Eventually, the first virtual machine 520 may process most of the data, whereby 1:N data sharing may be achieved.

Meanwhile, the first virtual machine 520 in the processor 175 may be configured to set the shared memory 508 based on the hypervisor 505 to transmit the same data to the second virtual machine 530 and the third virtual machine 540.

That is, the first virtual machine 520 in the processor 175 may transmit the same data to the second virtual machine 530 and the third virtual machine 540 in a synchronized state using the shared memory 508 based on the hypervisor 505. Consequently, the plurality of displays 180a and 180b in the vehicle may be configured to display the same images in a synchronized state.

Meanwhile, the signal processing device 170 may process various signals, such as an audio signal, an image signal, and a data signal. To this end, the signal processing device 170 may be implemented in the form of a system on chip (SOC).

Figure 4:
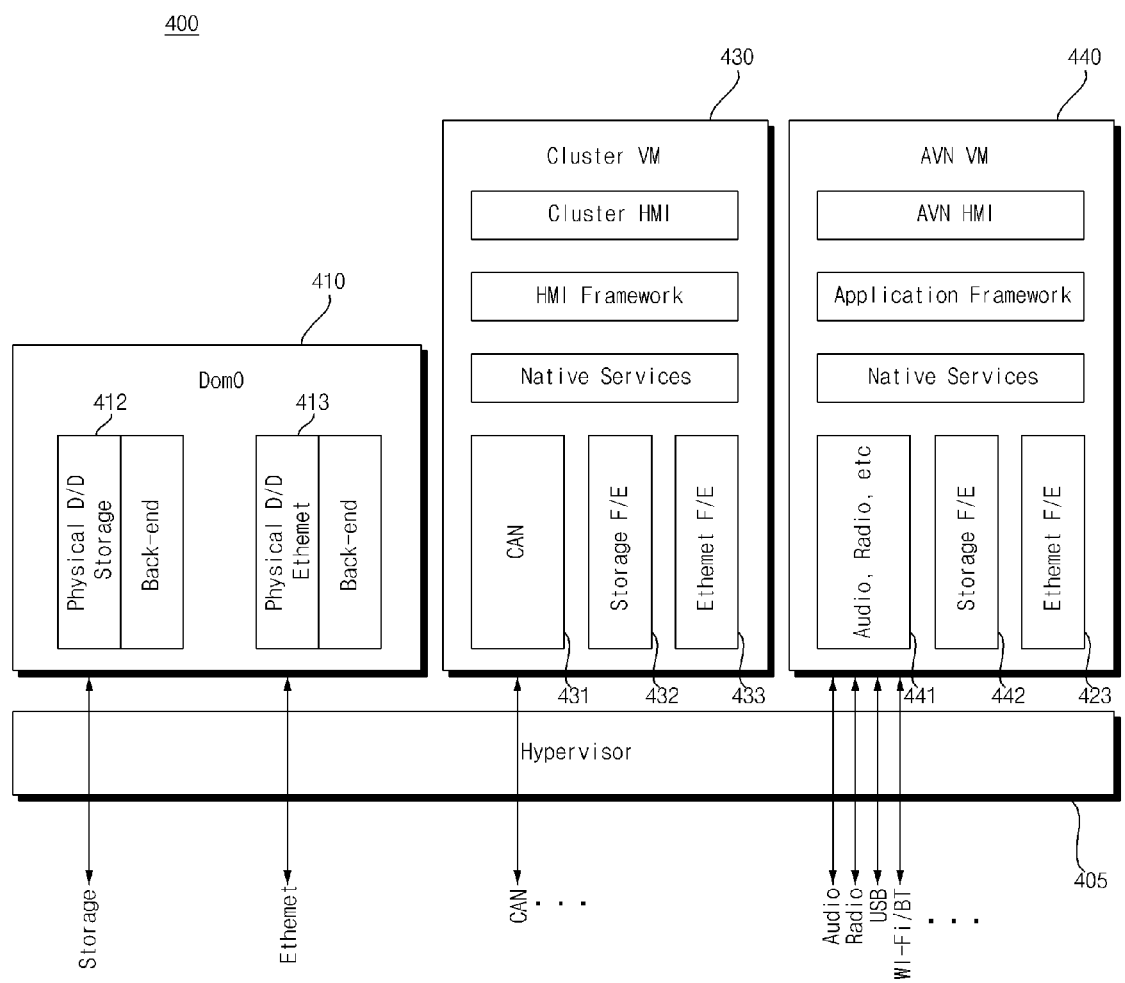
FIG. 4 is a view showing a system driven in a signal processing device related to the present disclosure.

FIG. 4 is a view showing a system driven in a signal processing device related to the present disclosure.

Referring to the figure, FIG. 4 is a view illustrating that virtual machines are used for the cluster display 180a and the AVN display 180b.

The system 400 driven in the signal processing device of FIG. 4 illustrates that a cluster virtual machine 430 and an AVN virtual machine 440 are executed through a hypervisor 405 in the processor 175.

Meanwhile, the system 400 driven in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for CAN communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that CAN communication data are input and output only in the cluster virtual machine 430, whereby the CAN communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a drawback in that the cluster virtual machine 430 and the AVN virtual machine 440 are required to include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines such that various memory data and communication data are input and output not in the guest virtual machines but in the server virtual machine. This will be described with reference to FIG. 5 and subsequent figures.

Figure 5:
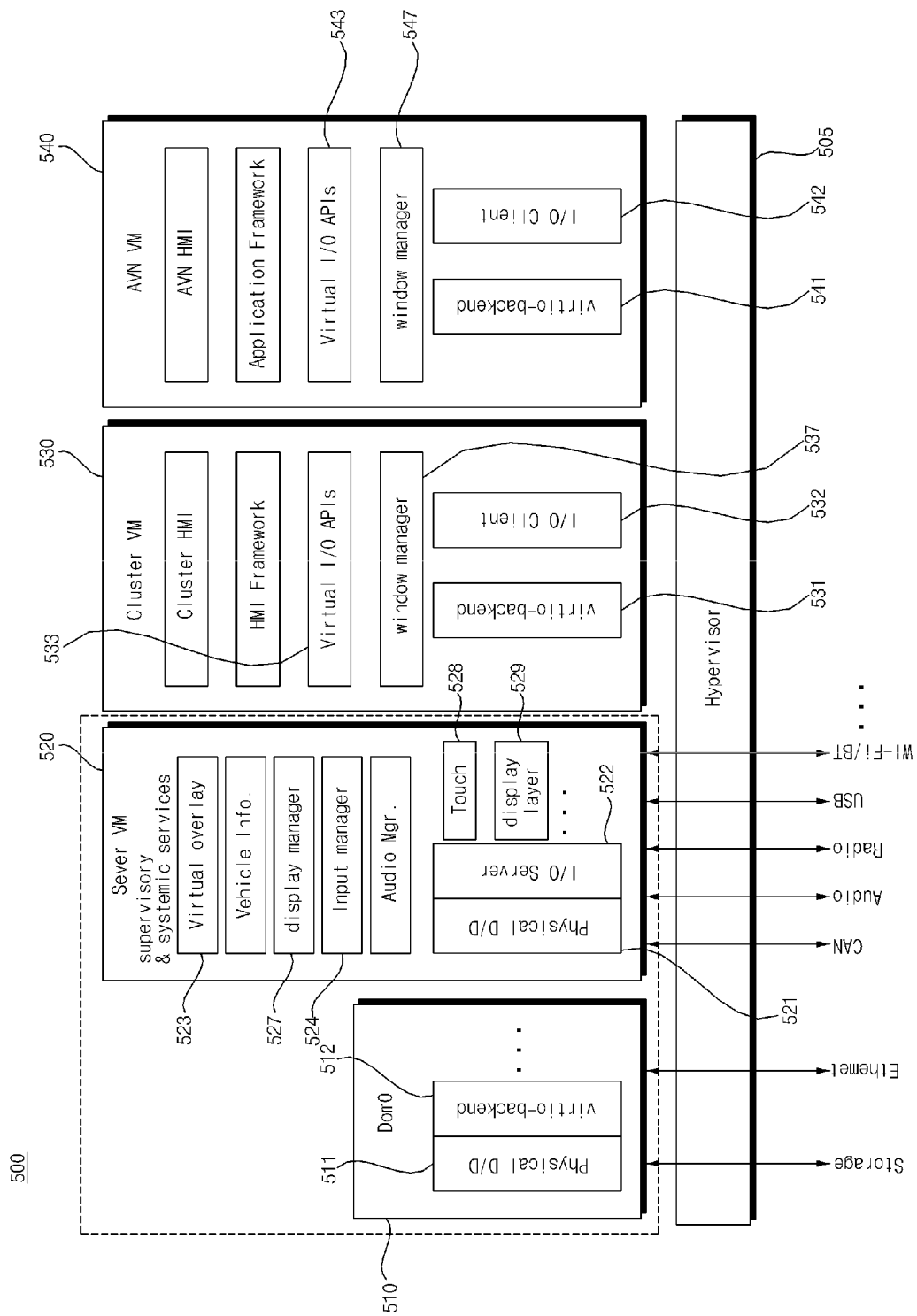
FIG. 5 is a view showing an example of a system driven in a signal processing device according to an embodiment of the present disclosure.

FIG. 5 is a view showing an example of a system driven in a signal processing device according to an embodiment of the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 may be a virtual machine for the cluster display 180a, and the third virtual machine 540 may be a virtual machine for the AVN display 180b.

That is, the second virtual machine 530 and the third virtual machine 540 may be operated for image rendering of the cluster display 180a and the AVN display 180b, respectively.

Meanwhile, the system 50 driven in the signal processing device 170 of FIG. 5 illustrates that a legacy virtual machine 510 is also executed on the hypervisor 505 in the processor 175.

The legacy virtual machine 510 may include an interface 511 for data communication with the memory 140 and Ethernet communication.

The figure illustrates that the interface 511 is a physical device driver; however, various modifications are possible.

Meanwhile, the legacy virtual machine 510 may further include a virtio-backend interface 512 for data communication with the second and third virtual machines 530 and 540.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, may control radio data and audio data at a supervisor level, and may provide the data to a plurality of guest virtual machines, such as the second and third virtual machines 530 and 540.

Meanwhile, the first virtual machine 520, which is a server virtual machine, may process vehicle data, sensor data, and surroundings-of-vehicle information, and may provide the processed data or information to a plurality of guest virtual machines, such as the second and third virtual machines 530 and 540.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 or Ethernet data by Ethernet communication from the virtio-backend interface 512 of the legacy virtual machine 510 through the virtio-backend interface.

Next, the third virtual machine 540 may include an input and output client interface 542 for data communication with the first virtual machine 520 and APIs 543 configured to control the input and output client interface 542.

In addition, the third virtual machine 540 may include a virtio-backend interface for data communication with the legacy virtual machine 510.

The third virtual machine 540 may receive memory data by communication with the memory 140 or Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, touch input to the first display 180a or the second display 180b is input only to the first virtual machine 520 and is not input to the second virtual machine 530 and the third virtual machine 540. Information regarding the touch input is transmitted to the second virtual machine 530 or the third virtual machine 540. Consequently, the touch input may be rapidly and accurately processed. In addition, the touch input may be rapidly and accurately processed even though the number of virtual machines that are driven is increased.

Meanwhile, in the system 500 of FIG. 5, the second and third virtual machines 530 and 540 may be operated based on different operating systems.

For example, the second virtual machine 530 may be operated based on a Linux OS, and the third virtual machine 540 may be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, the same data or the same images may be shared in a synchronized state. Eventually, the plurality of displays 180a and 180b may be configured to display the same data or the same images in a synchronized state.

Meanwhile, the first virtual machine 520 transmits information regarding the touch input to the second virtual machine 530 or the third virtual machine 540 even though the second and third virtual machines 530 and 540 are operated based on different operating systems. Consequently, the touch input may be rapidly and accurately processed even though the second and third virtual machines 530 and 540 are operated based on different operating systems (OS).

Meanwhile, the first virtual machine 520 may include a display manager 527 configured to control overlays displayed on the first display 180a and the second display 180b, a display layer server 529, and a virtual overlay creator 523 configured to generate a virtual overlay.

The display layer server 529 may receive a first overlay provided by the second virtual machine 530 and a second overlay provided by the third virtual machine 540.

Meanwhile, the display layer server 529 may transmit a virtual overlay generated by the virtual overlay creator 523 to at least one of the second virtual machine 530 or the third virtual machine 540.

Meanwhile, the display manager 527 in the first virtual machine 520 may receive the first overlay provided by the second virtual machine 530 and the second overlay provided by the third virtual machine 540 through the display layer server 529.

The display manager 527 in the first virtual machine 520 may be configured to transmit the virtual overlay different from the first overlay or the second overlay, to at least one of the second virtual machine 530 or the third virtual machine 540 through the display layer server 529.

In response thereto, the second virtual machine 530 may be configured to combine and display the first overlay and the virtual overlay on the first display 180*a*.

In addition, the third virtual machine 540 may be configured to combine and display the second overlay and the virtual overlay on the second display 180*b*.

Meanwhile, the first virtual machine 520 may include an input manager 524 configured to receive an input signal from the outside. At this time, the input signal may be an input signal from a predetermined button (start button) in the vehicle, a touch input signal, or a voice input signal.

For example, the input manager 524 in the first virtual machine 520 may receive touch input from the first display 180*a* or the second display 180*b*.

Meanwhile, the first virtual machine 520 may include a touch server 528 configured to transmit information regarding the touch input related to the touch input from the first display 180*a* or the second display 180*b* to the second virtual machine 530 or the third virtual machine 540.

For example, when there is touch input corresponding to the first display 180*a*, the touch server 528 in the first virtual machine 520 may transmit information regarding the touch input to the second virtual machine 530.

Meanwhile, the touch server 528 in the first virtual machine 520 may receive the touch input from the first display 180*a* or the second display 180*b*.

Figure 6:
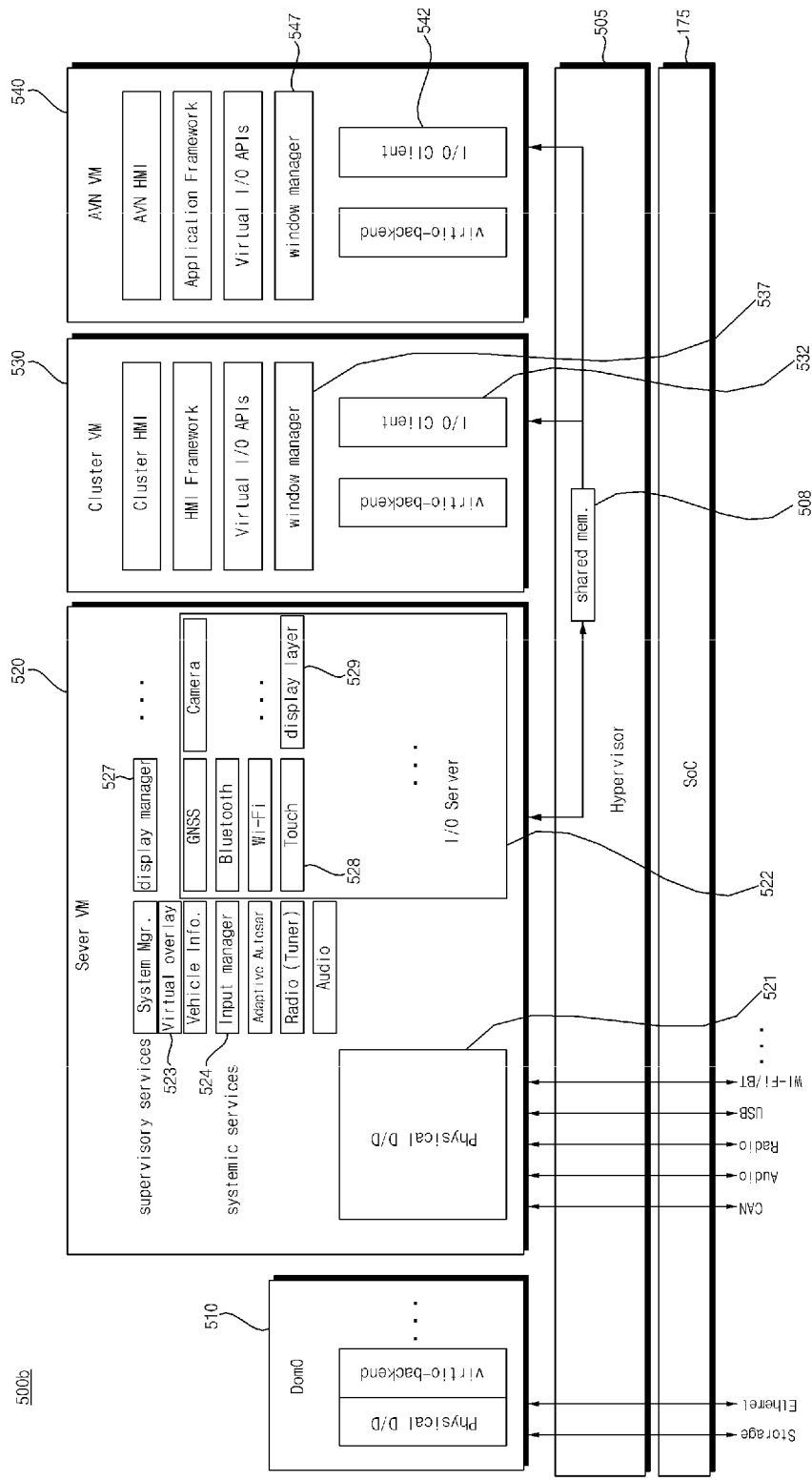
FIG. 6 is a view showing another example of the system driven in the signal processing device according to the embodiment of the present disclosure.

FIG. 6 is a view showing another example of the system driven in the signal processing device according to the embodiment of the present disclosure.

Referring to the figure, in the system 500*b* driven by the processor 175 in the signal processing device 170, the processor 175 in the signal processing device 170 executes the first to third virtual machines 520 to 540 on the hypervisor 505 in the processor 175, and the first virtual machine 520 in the processor 175 is configured to set the shared memory 508 based on the hypervisor 505 for transmission of data to the second and third virtual machines 530 and 540.

For example, information regarding touch input may be illustrated as the data. Consequently, the information regarding touch input may be transmitted to the second virtual machine 530 or the third virtual machine 540. Eventually, the touch input to the first display 180*a* or the second display 180*b* may be rapidly and accurately processed. In addition, the touch input may be rapidly and accurately processed even though the number of virtual machines that are driven is increased.

As another example, image data may be illustrated as the data. Consequently, an image may be displayed on the first display 180*a* or the second display 180*b*.

Meanwhile, in response to the same image data being shared in the shared memory 508, the plurality of displays 180*a* and 180*b* in the vehicle may be configured to display the same data in a synchronized state.

As another example, CAN communication data, audio data, radio data, USB data, wireless communication data, or position information data may be illustrated as the data. Consequently, information regarding the data may be displayed on the first display 180*a* or the second display 180*b*.

Meanwhile, although not shown in FIG. 6, the legacy virtual machine 510 may transmit memory data from the memory 140 or Ethernet data by Ethernet communication to the second and third virtual machines 530 and 540 using the shared memory 508 based on the hypervisor 505. Consequently, information corresponding to the memory data or the Ethernet data may be displayed on the first display 180*a* or the second display 180*b*.

Meanwhile, the first virtual machine 520 in the system 500*b* of FIG. 6 may include a display manager 527, a display layer server 529, a virtual overlay creator 523, an input manager 524, and a touch server 528, similarly to the first virtual machine 520 in the system 500 of FIG. 5.

Meanwhile, the input and output server interface 522 in the first virtual machine 520 in the system 500*b* of FIG. 6 may include a display layer server 529 and a touch server 528, unlike FIG. 5.

The operation of the display manager 527, the display layer server 529, the input manager 524, the virtual overlay creator 523, and the touch server 528 is the same to FIG. 5, and therefore a description thereof will be omitted.

Meanwhile, the first virtual machine 520 of FIG. 6 may further include a system manager for overall system control, a vehicle information manager for vehicle information management, an audio manager for audio control, and a radio manager for radio control.

Meanwhile, the input and output server interface 522 in the first virtual machine 520 in the system 500*b* of FIG. 6 may further include a GNSS server for GPS information input and output, a Bluetooth server for Bluetooth input and output, a Wi-Fi server for Wi-Fi input and output, and a camera server for camera data input and output.

Figure 7:
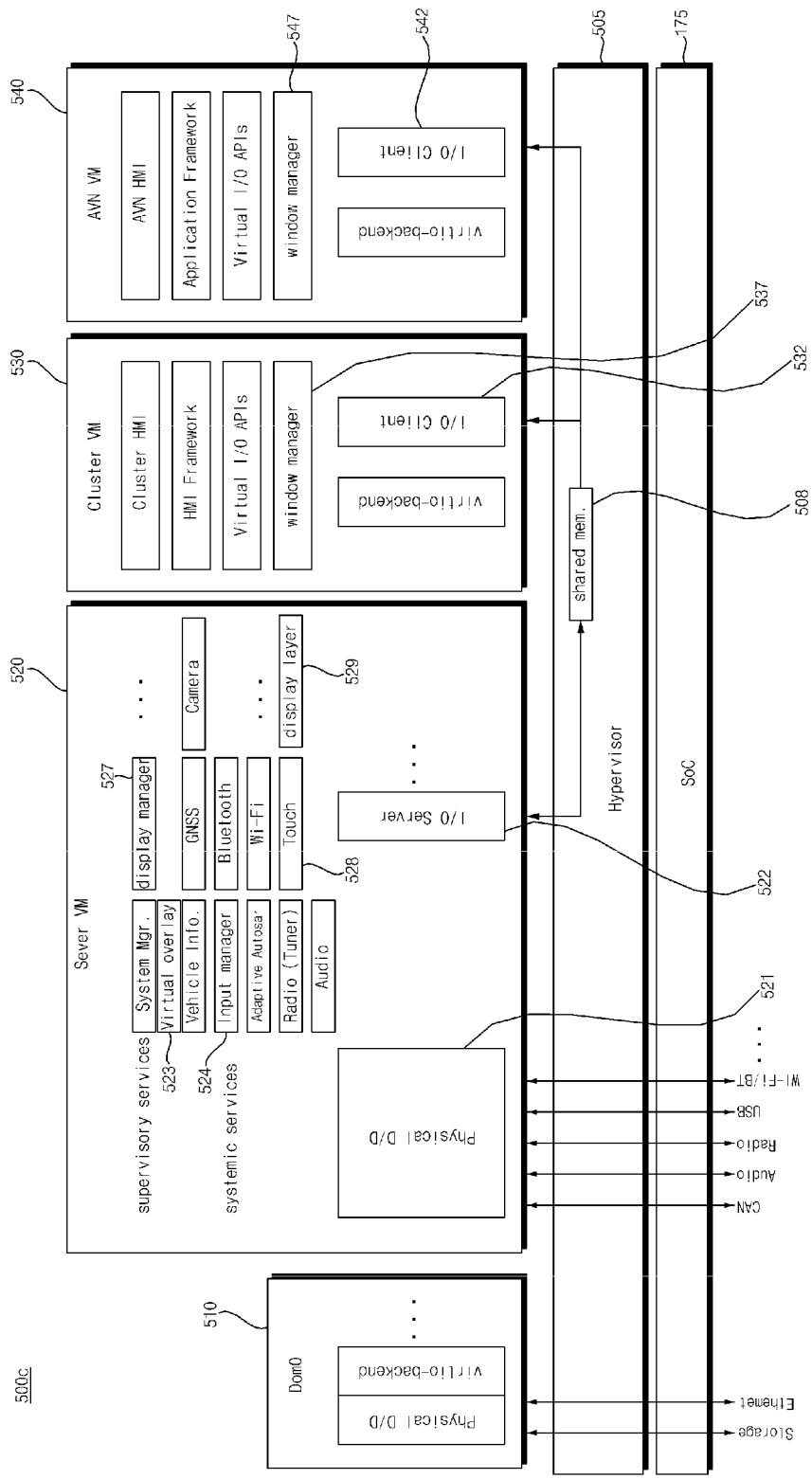
FIG. 7 is a view showing a further example of the system driven in a signal processing device according to the embodiment of the present disclosure.

FIG. 7 is a view showing a further example of the system driven in the signal processing device according to the embodiment of the present disclosure.

Referring to the figure, the system 500*c* driven by the processor 175 in the signal processing device of FIG. 7 is similar to the system 500*b* of FIG. 6.

That is, like FIG. 6, the processor 175 of FIG. 7 executes the first to third virtual machines 520 to 540 on the hypervisor 505 in the processor 175.

In FIG. 7, however, the display layer server 529 and the touch server 528 may be provided and executed in the first virtual machine 520 outside the input and output server interface 522, unlike FIG. 6.

In addition, the GNSS server for GPS information input and output, the Bluetooth server for Bluetooth input and output, the Wi-Fi server for Wi-Fi input and output, and the camera server for camera data input and output may be provided and executed in the first machine 520 outside the input and output server interface 522, unlike FIG. 6.

That is, the display manager 527, the display layer server 529, the virtual overlay creator 523, the input manager 524, and the touch server 528 may be provided and executed in the first virtual machine 520.

The operation of the display manager 527, the display layer server 529, the virtual overlay creator 523, the input manager 524, and the touch server 528 is the same to FIG. 5, and therefore a description thereof will be omitted.

Figure 8:
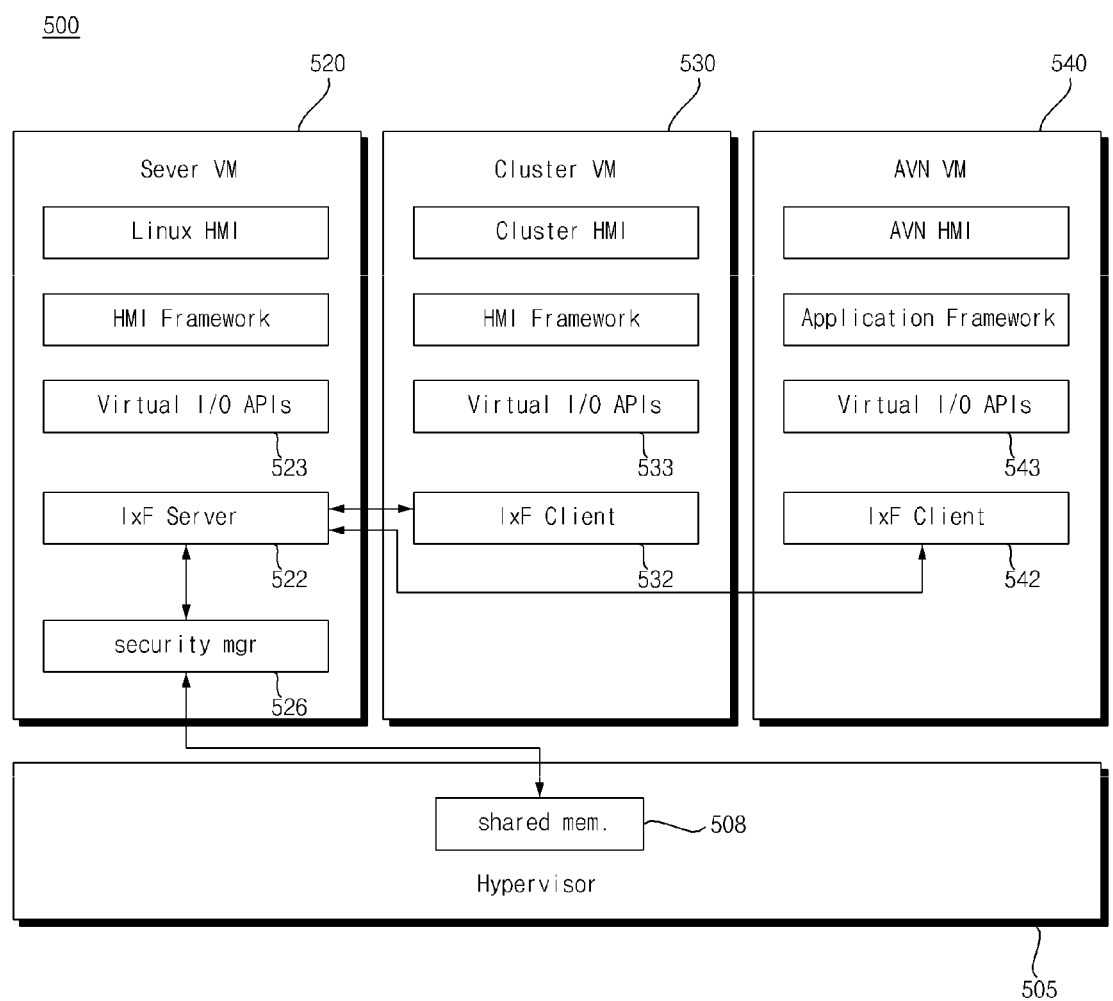
FIGS. 8 to 9B are diagrams referred to in the description of FIGS. 5 to 7.
Figure 9A:
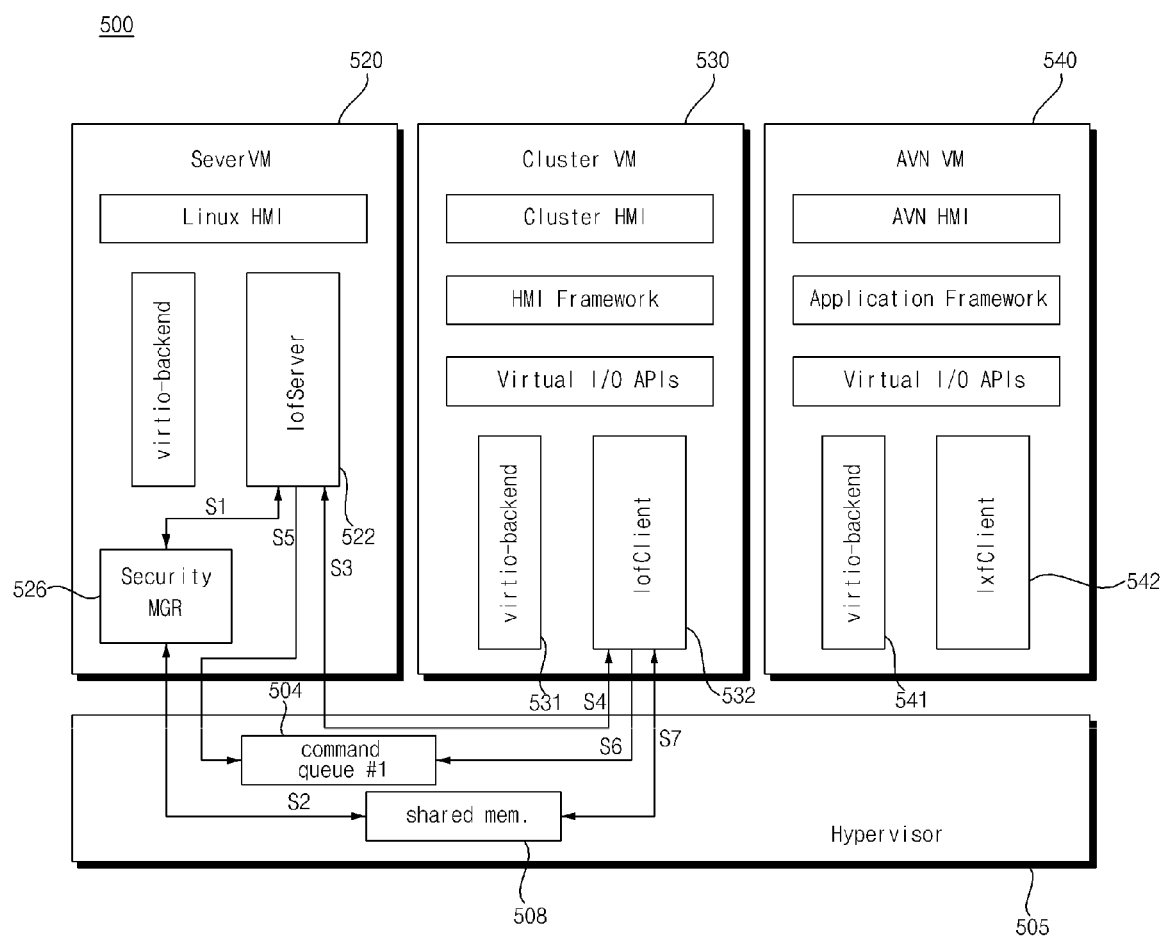
Figure 9B:
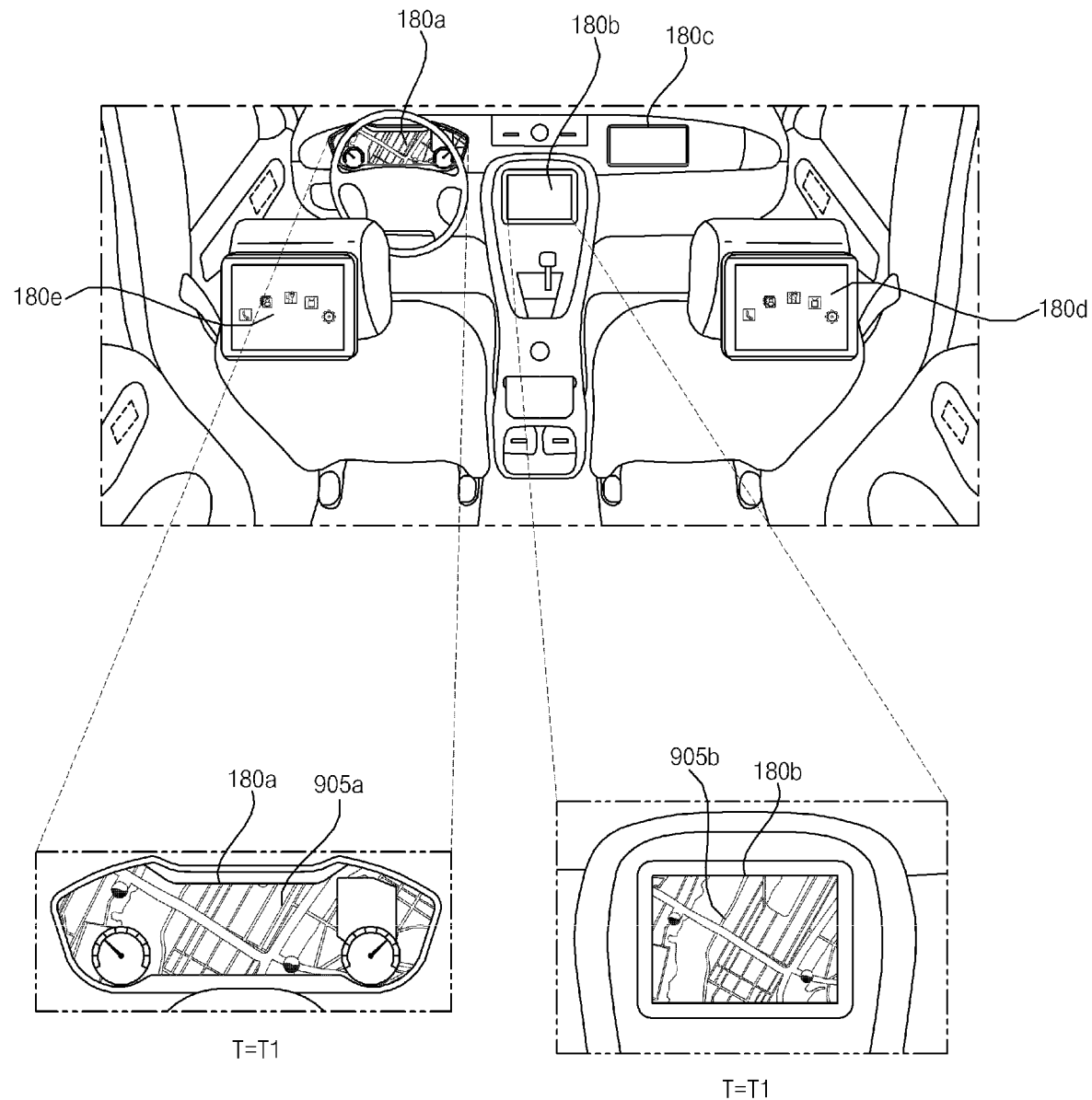

FIGS. 8 to 9B are diagrams referred to in the description of FIGS. 5 to 7.

First, FIG. 8 illustrates that the first to third virtual machines 520 to 540 are executed on the hypervisor 505 in the processor 175 of the system 500 according to the present disclosure and that the first virtual machine 520 in the processor 175 is configured to set the shared memory 508 based on the hypervisor 505 to transmit the same data to the second virtual machine 530 and the third virtual machine 540.

Consequently, the first display 180*a* and the second display 180*b* in the vehicle may be configured to display the same images in a synchronized state.

Meanwhile, high-speed data communication may be performed between the plurality of virtual machines. Furthermore, high-speed data communication may be performed even though the plurality of virtual machines is driven by different operating systems.

Meanwhile, the first virtual machine 520 in the processor 175 may not allocate memories corresponding in number to the virtual machines but may use a single shared memory 508, not memory allocation in response transmitting the data processed by the first virtual machine 520 to another virtual machine. Consequently, 1:N data communication using the shared memory 508, not 1:1 data communication, may be performed between the virtual machines.

Meanwhile, the first virtual machine 520 in the processor 175 may include an input and output server interface 522 and a security manager 526.

Meanwhile, the second virtual machine 530 and the third virtual machine 540 may include input and output client interfaces 532 and 542, respectively. Consequently, high-speed data communication between the plurality of virtual machines may be performed using the input and output server interface 522 and the input and output client interfaces 532 and 542.

The input and output server interface 522 in the first virtual machine 520 may receive requests for transmission of the same data from the input and output client interfaces 532 and 542 in the second virtual machine 530 and the third virtual machine 540, and may transmit shared data to the shared memory 508 through the security manager 526 based thereon.

FIG. 9A is a view illustrating transmission of shared data in more detail.

Referring to the figure, to transmit shared data, the input and output server interface 522 in the first virtual machine 520 transmits a request for allocation of the shared memory 508 to the security manager 526 (S1).

Subsequently, the security manager 526 may allocate the shared memory 508 using the hypervisor 505 (S2), and may write shared data in the shared memory 508.

Meanwhile, the input and output client interfaces 532 and 542 may transmit a request for connection to the input and output server interface 522 after allocation of the shared memory 508 (S3).

Meanwhile, the input and output server interface 522 transmits information regarding the shared memory 508 including key data to the input and output client interfaces 532 and 542 after allocation of the shared memory 508 (S4). At this time, the key data may be private key data.

Meanwhile, the first virtual machine 520 in the processor 175 may transmit information regarding the shared memory 508 to the second virtual machine 530 and the third virtual machine 540 after setting of the shared memory 508.

Subsequently, the input and output server interface 522 in the first virtual machine 520 is configured to generate a command or a command queue for event processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue may be generated in the first virtual machine 520, not the hypervisor 505, under control of the input and output server interface 522.

Subsequently, the input and output client interfaces 532 and 542 access the command queue buffer 504 to receive the generated command queue or information regarding the command queue (S6).

For example, in response to the commands transmitted to the input and output client interfaces 532 and 542 being the same, the generated command queues may be the same.

As another example, in response to the commands transmitted to the input and output client interfaces 532 and 542 being different from each other, different command queues may be transmitted to the input and output client interfaces 532 and 542.

Subsequently, the input and output client interfaces 532 and 542 may access the shared memory 508 based on the received key data (S5), and may copy or read the shared data from the shared memory 508 (S7).

Particularly, when the input and output client interfaces 532 and 542 receive the same shared data, the input and output client interfaces 532 and 542 may access the shared memory 508 based on the same command queues and the same key data (S5), and may copy or read the shared data from the shared memory 508.

Consequently, the second virtual machine 530 and the third virtual machine 540 may access the shared memory 508, and may eventually share the shared data.

For example, in the case in which the shared data are image data, the second virtual machine 530 and the third virtual machine 540 may share the image data, and eventually the plurality of displays 180*a* and 180*b* in the vehicle may be configured to display the same shared images in a synchronized state.

FIG. 9B illustrates that, by the system 500 of FIG. 9A, the second virtual machine 530 displays image data received through the shared memory 508 on the first display 180*a*, and the third virtual machine 540 displays image data received through the shared memory 508 on the second display 180*b*.

FIG. 9B illustrates that an image 905*a* displayed on the first display 180*a* and an image 905*b* displayed on the second display 180*b* are synchronized, whereby the same images 905*a* and 905*b* are displayed at the time of T1.

That is, image data processed by the first virtual machine 520 in the processor 175 are transmitted to the second virtual machine 530 and the third virtual machine 540 through the shared memory 508, and the first image 905*a* displayed on the first display 180*a* and the second image 905*b* displayed on the second display 180*b* based on the image data may be the same. Consequently, the plurality of displays 180*a* and 180*b* in the vehicle may be configured to display the same images in a synchronized state.

Meanwhile, referring to FIG. 9B, the vehicle display apparatus 100 according to an embodiment of the present disclosure includes a plurality of displays 180*a*, 180*b*, 180*c*, 180*d*, and 180*e* and the signal processing device 170, in which among the plurality of displays 180*a*, 180*b*, 180*c*, 180*d*, and 180*e*, a first display 180*a* may be the cluster display, a second display 180*b* may be the AVN display, a third display 180*c* may be a passenger seat display, a fourth display 180*d* may be a first RSE display, and a fifth display 180*e* may be a second RSE display.

Meanwhile, the signal processing device 170 includes a processor 175 therein, and may execute first to sixth virtual machines on the hypervisor 505 in the processor 175.

For example, a first virtual machine 520, which is a server virtual machine, may control a guest virtual machine and the like, a second virtual machine 530, which is a first guest virtual machine, may control the first display 180*a*, a third virtual machine 540, which is a second guest virtual machine, may control the second display 180*b*, a fourth virtual machine 550, which is a third guest virtual machine, may control the third display 180*c*, a fifth virtual machine 560, which is a fourth guest virtual machine, may control the fourth display 180*d*, and a sixth virtual machine 570, which is a fifth guest virtual machine, may control the fifth display 180*e*.

Figure 10:
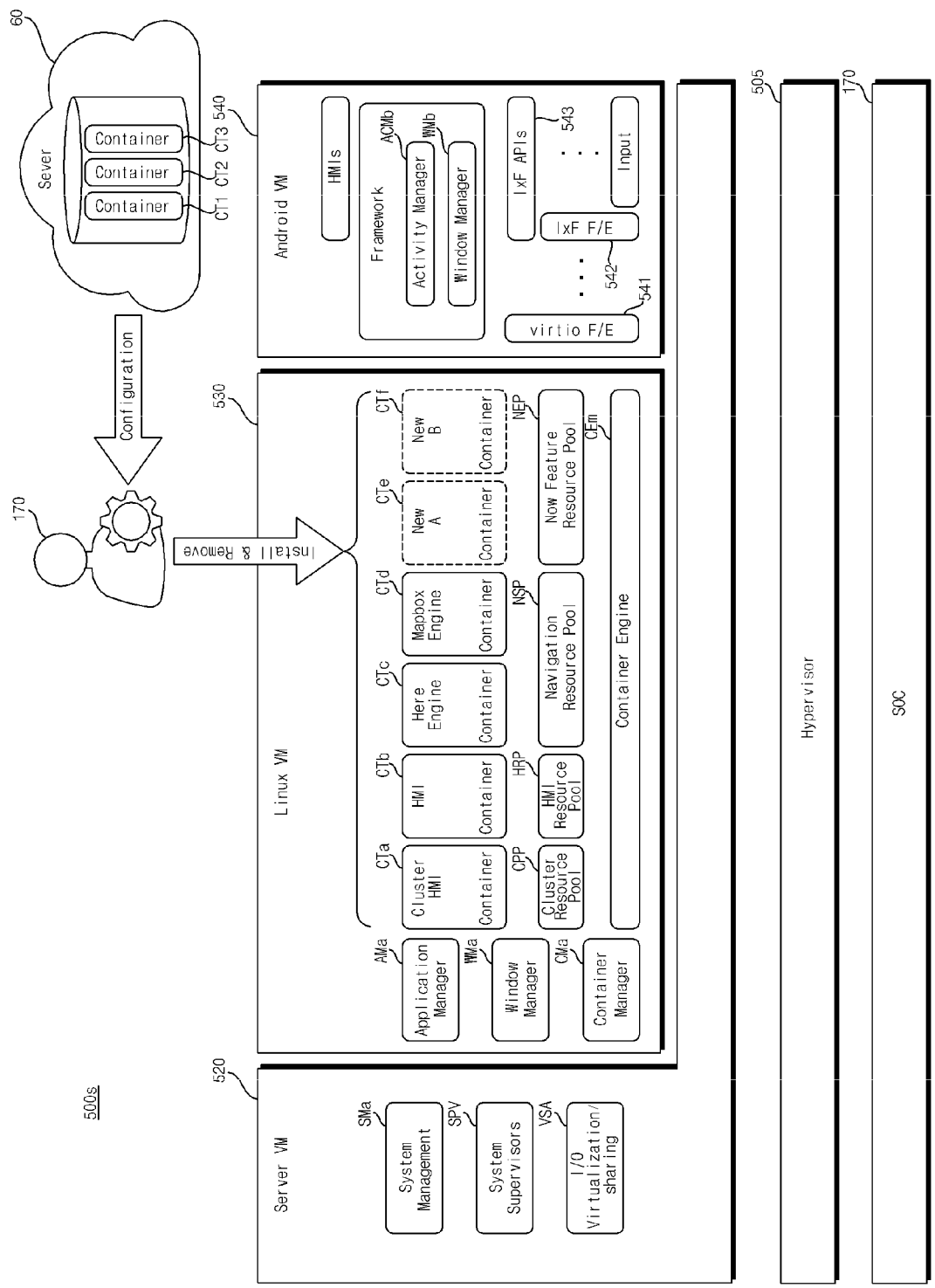
FIG. 10 is a diagram illustrating yet another example of a system executed in a signal processing device according to an embodiment of the present disclosure.

FIG. 10 is a diagram illustrating yet another example of a system executed in a signal processing device according to an embodiment of the present disclosure.

Referring to the drawing, a system 500*s* executed in the signal processing device 170 according to an embodiment of the present disclosure may run or execute the first to third virtual machines 520, 530, and 540, similarly to FIG. 5.

Particularly, the system 500*s* executed in the signal processing device 170 according to an embodiment of the present disclosure may execute the first to third virtual machines 520, 530, and 540 on the hypervisor 505 in the processor 175.

The first virtual machine 520, which is a server virtual machine, may execute system management SMa for overall system control, system supervisors SPV for overall system management, and input/output (I/O) virtualization VSA.

Meanwhile, the I/O virtualization VSA may correspond to the input and output server interface 522 of FIG. 5 and the like.

The second virtual machine 530, which is a guest virtual machine, may operate on the Linux Operating System (OS), and may execute at least one container therein for application execution.

In the drawing, an example of executing a plurality of containers is illustrated, and more specifically, it is illustrated that the second virtual machine 530 includes a cluster HMI cluster CTa, an HMI cluster CTb, a Here Engine cluster CTc related to a digital map, a map box engine cluster CTd, a first new cluster CTe, and a second new cluster CTf.

The cluster HMI cluster CTa may run on a cluster resource pool CPP, the HMI cluster CTb may run on an HMI resource pool HRP, the Here Engine cluster CTc and the map box engine cluster CTd may run on a navigation resource pool NSP, and the first new cluster CTe and the second new cluster CTf may run on a new feature resource pool NEP.

Meanwhile, the second virtual machine 530, which is a guest virtual machine, may include a container engine CEm and may run at least one container CTa to CTf on the container engine CEm.

Particularly, the second virtual machine 530, which is a guest virtual machine, may include the container engine CEm, may run at least one resource pool CPP, HRP, NSP, and NEP on the container engine CEm, and may run at least one container CTa to CTf on at least one resource pool CPP, HRP, NSP, and NEP.

Meanwhile, the second virtual machine 530, which is a guest virtual machine, may run a container manager CMa for managing the container engine CEm or at least one container CTa to CTf, Meanwhile, the second virtual machine 530, which is a guest virtual machine, may run a window manager WMa for window management.

Meanwhile, the second virtual machine 530, which is a guest virtual machine, may run an application manager AMa for application management.

Meanwhile, the second virtual machine 530, which is a guest virtual machine, may be executed in response to the I/O virtualization VSA or the input and output server interface 522 in the first virtual machine 520.

Meanwhile, unlike the second virtual machine 530, the third virtual machine 540 which is a guest virtual machine may operate on the Android operating system, and in order to run applications, the third virtual machine 540 may execute a physical device driver 541, the input and output client interface 542, APIs 543 for controlling the input and output client interface 542, framework including an activity manager ACMb and a window manager WMb, HMI, and the like.

Meanwhile, at least one container in the second virtual machine 530 may be any one which is selected from among a plurality of containers CT1 to CT3 in the server 60, to be installed and executed.

During deployment, installation, and execution of the containers, the deployment, installation, and execution of each of the containers result in significant data consumption and resource consumption. Particularly, as the number of containers installed increases, the data consumption and resource consumption increase significantly.

Figure 11:
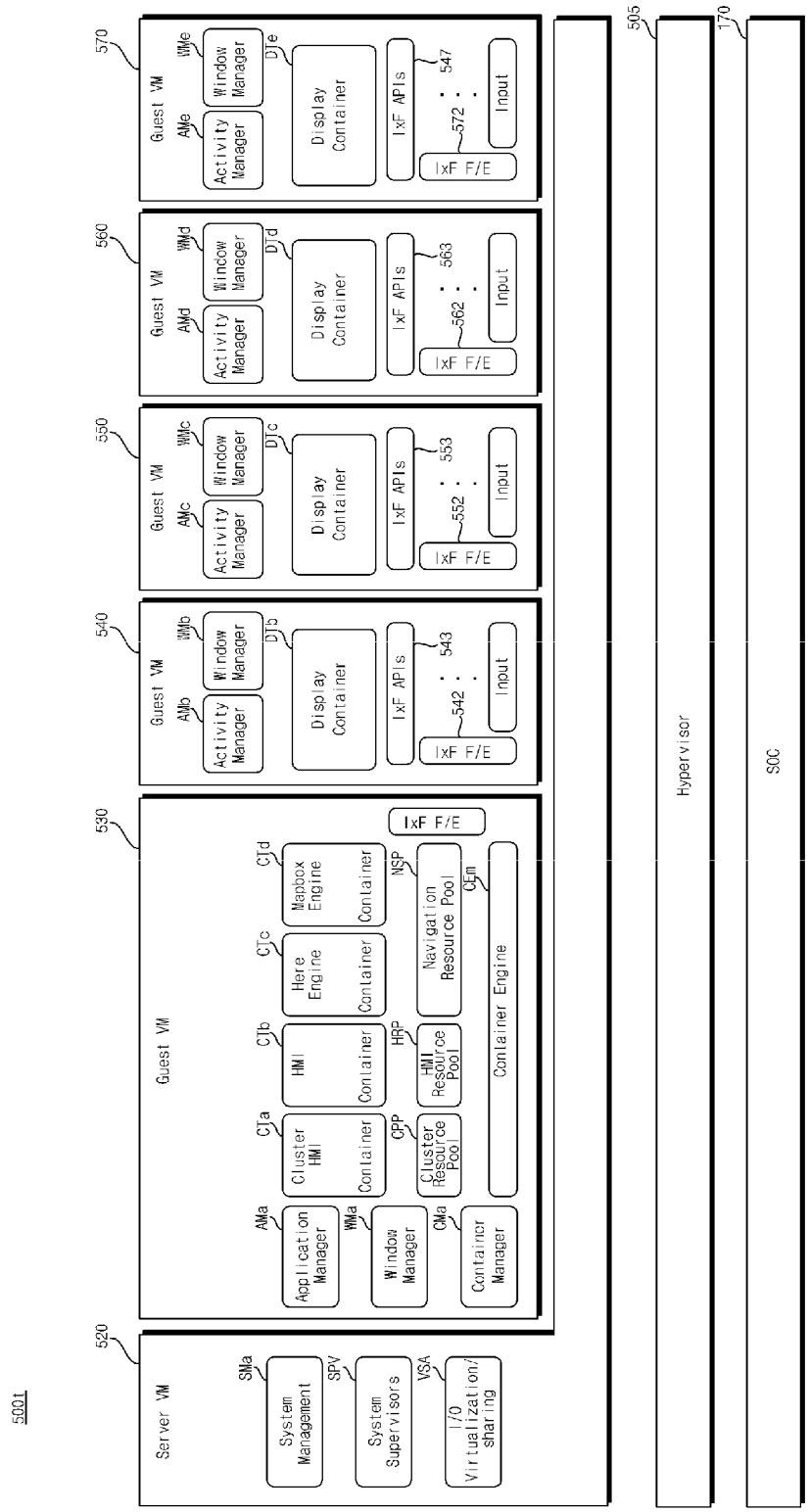
FIG. 11 is a diagram illustrating yet another example of a system executed in a signal processing device according to an embodiment of the present disclosure.

FIG. 11 is a diagram illustrating yet another example of a system executed in a signal processing device according to an embodiment of the present disclosure.

Referring to the drawing, a system 500*t* executed in the signal processing device 170 according to an embodiment of the present disclosure is similar to the system 500*s* of FIG. 10, but is different in that the system 500*t* executes the first to sixth virtual machines 520, 530, 540, 550, 560, and 570, instead of the first to third virtual machines 520, 530, and 540.

That is, there is a difference in that additional virtual machines are further executed for the plurality of displays 180*a*, 180*b*, 180*c*, 180*d*, and 180*e* of FIG. 9B. The following description will focus on differences from FIG. 10.

Particularly, the system 500*t* executed in the signal processing device 170 according to an embodiment of the present disclosure may execute the first to sixth virtual machines 520, 530, 540, 550, 560, and 570 on the hypervisor 505 in the processor 175.

The first virtual machine 520, which is a server virtual machine, may execute system management SMa for overall system control, system supervisors SPV for overall system management, and input/output (I/O) virtualization VSA.

The second virtual machine 530, which is a guest virtual machine, may execute at least one container therein for application execution.

In the drawing, an example of executing a plurality of containers is illustrated, and more specifically, it is illustrated that the second virtual machine 530 includes a cluster HMI cluster CTa, an HMI cluster CTb, a Here Engine cluster CTc related to a digital map, and a map box engine cluster CTd.

The cluster HMI cluster CTa may run on a cluster resource pool CPP, the HMI cluster CTb may run on an HMI resource pool HRP, the Here Engine cluster CTc and the map box engine cluster CTd may run on a navigation resource pool NSP.

Meanwhile, the second virtual machine 530, which is a guest virtual machine, may include a container engine CEm and may run at least one container CTa to CTd on the container engine CEm.

Meanwhile, the second virtual machine 530, which is a guest virtual machine, may run a container manager CMa for managing the container engine CEm or at least one container CTa to CTf, Meanwhile, the second virtual machine 530, which is a guest virtual machine, may run a window manager WMa for window management.

Meanwhile, the second virtual machine 530, which is a guest virtual machine, may run an application manager AMa for application management.

Meanwhile, the second virtual machine 530, which is a guest virtual machine, may be executed in response to the I/O virtualization VSA or the input and output server interface 522 in the virtual machine 520.

Meanwhile, for application execution, the third to sixth virtual machines 540 to 570 which are guest virtual machines may respectively execute input and output client interfaces 542, 552, 562, and 572, APIs 543, 553, 563, and 563 for controlling the input and output client interfaces 542, 552, 562, and 572, framework including activity managers AMb, AMc, AMd, and Ame and window managers WMb, WMc, WMd, and WMe, and HMI, and the like.

Meanwhile, at least one container in the second virtual machine 530 may be any one which is selected from among a plurality of containers CT1 to CT3 in the server 60, to be installed and executed.

Meanwhile, unlike the drawing, a container may be installed and executed in at least one of the third to sixth virtual machines 540 to 570.

FIGS. 12 to 15 are diagrams explaining display of images using a plurality of virtual overlays in the vehicle display apparatus of FIG. 9B.

Figure 12:
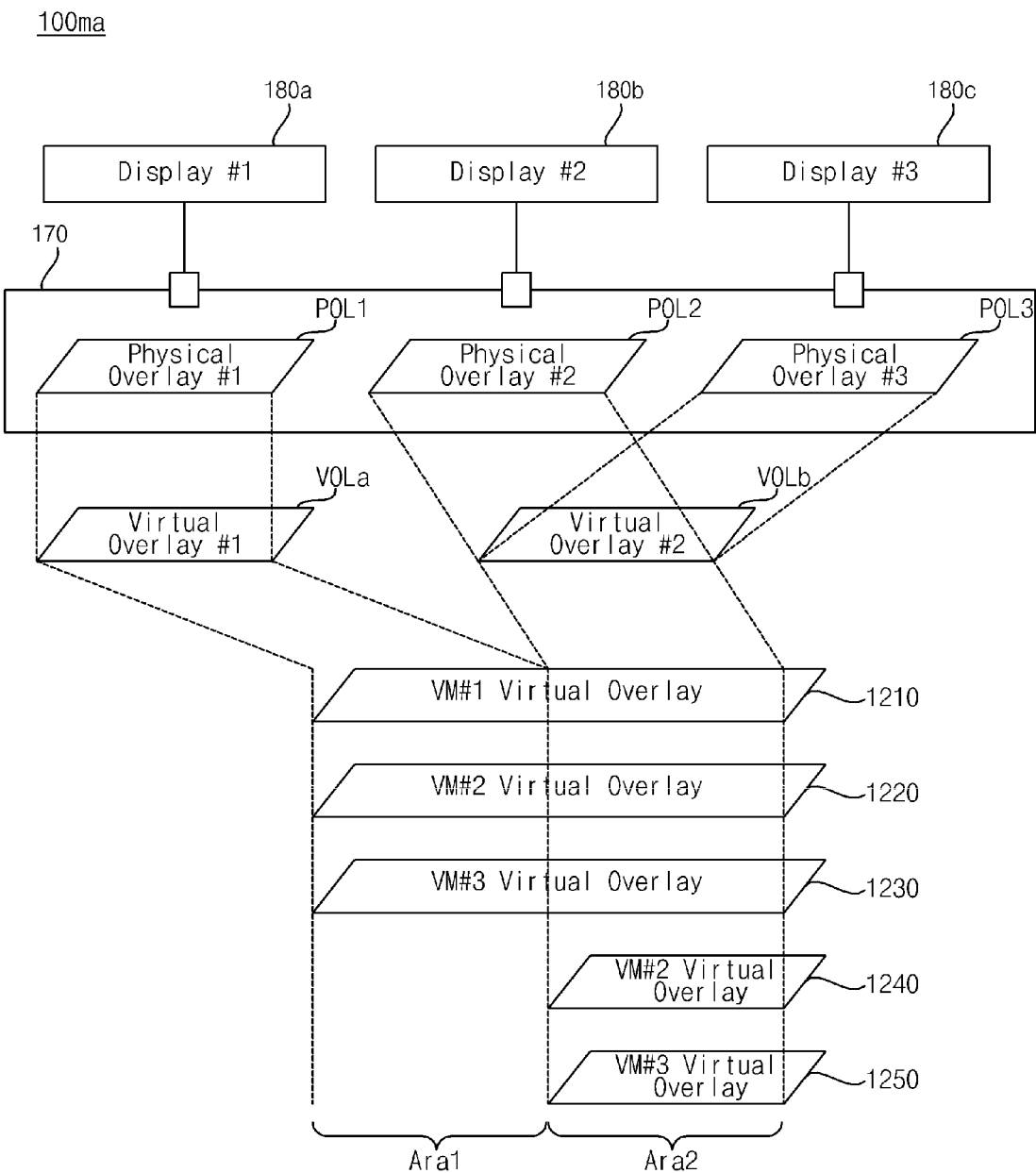
FIGS. 12 to 15 are diagrams explaining display of images using a plurality of virtual overlays in a vehicle display apparatus of FIG. 9B.

First, FIG. 12 is a diagram referred to in the description of display of images using a plurality of virtual overlays.

Referring to the drawing, the second virtual machine 530, the third virtual machine 540, and the fourth virtual machine 550 respectively generate a first virtual overlay 1210, a second virtual overlay 1220, and a third virtual overlay 1230, each including a first area Ara1 and a second area Ara2.

Meanwhile, the second virtual machine 530 and the third virtual machine 540 respectively generate a fourth virtual overlay 1240 and a fifth virtual overlay 1250, each including the second area Ara2.

The second virtual machine 530 may be configured to display a composite overlay generated by disposing a physical overlay POL1 on virtual overlays VOLa corresponding to the first area Ara1 among the first to fifth overlays 1210 to 1250 on the first display 180a.

The third virtual machine 540 may be configured to display a composite overlay generated by disposing a physical overlay POL2 on virtual overlays VOLb corresponding to the second area Ara2 among the first to fifth overlays 1210 to 1250 on the second display 180b.

The fourth virtual machine 550 may be configured to display a composite overlay generated by disposing a physical overlay POL3 on virtual overlays VOLb corresponding to the second area Ara2 among the first to fifth overlays 1210 to 1250 on the third display 180c.

Figure 13:
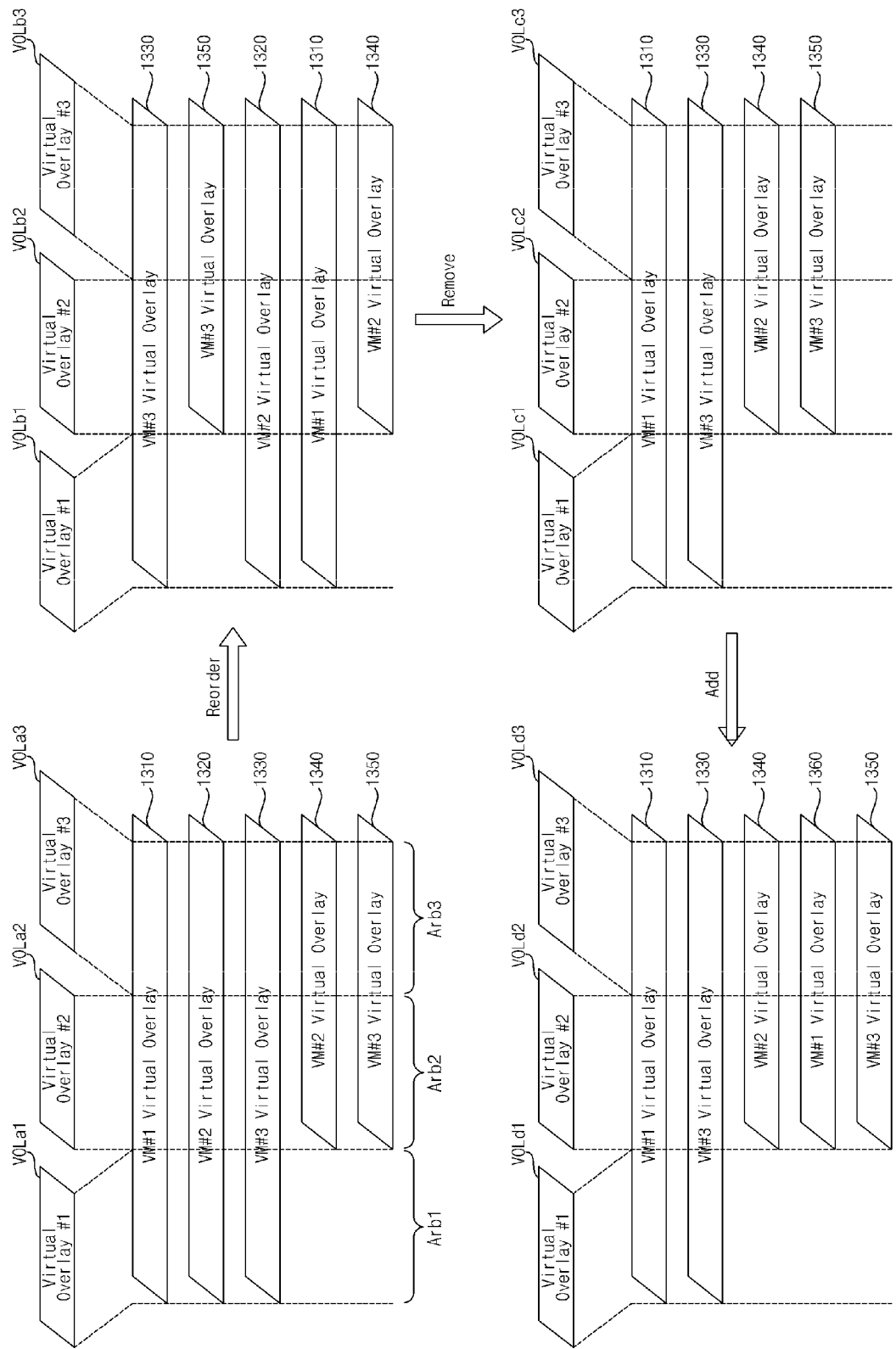

FIG. 13 is a diagram referred to in the description of sequence change, deletion, addition, and the like of a plurality of virtual overlays.

Referring to the drawing, the second virtual machine 530, and the third virtual machine 540, and the fourth virtual machine 550 respectively generate a first virtual overlay 1310, a second virtual overlay 1320, and a third virtual overlay 1330, each including a first area Arb1, a second area Arb2, and a third area Arb3.

Meanwhile, the second virtual machine 530 and the third virtual machine 540 respectively generate a fourth virtual overlay 1340 and a fifth virtual overlay 1350, each including the second area Arb2 and the third area Arb3.

The second virtual machine 530 may be configured to display virtual overlays VOLa1 corresponding to the first area Arb1 among the first to fifth virtual overlays 1310 to 1350 on the first display 180a.

The third virtual machine 540 may be configured to display virtual overlays VOLa2 corresponding to the second area Arb2 among the first to fifth overlays 1310 to 1350 on the second display 180b.

The fourth virtual machine 550 may be configured to display virtual overlays VOLa3 corresponding to the third area Arb3 among the first to fifth overlays 1310 to 1350 on the third display 180c.

Meanwhile, the figure illustrates an example in which the first virtual overlay 1310, the second virtual overlay 1320, the third virtual overlay 1330, the fourth virtual overlay 1340, and the fifth virtual overlay 1350 are disposed from top to bottom.

The layer disposition sequence may be set by the first virtual machine 520.

Meanwhile, the first virtual machine 520 or the second virtual machine 530 may change the layer sequence of the plurality of virtual layers.

Meanwhile, in the drawing, an example is illustrated in which the third virtual overlay 1330, the fifth virtual overlay 1350, the second virtual overlay 1320, the first virtual overlay 1310, and the fourth virtual overlay 1340 are disposed from top to bottom.

As described above, the layer sequence may be changed simply by using the first virtual machine 520 or the second virtual machine 530.

Meanwhile, as illustrated in the drawing, the first virtual machine 520 or the second virtual machine 530 may delete the second virtual overlay 1320, which is one of the plurality of virtual layers 1310 to 1350.

Meanwhile, as illustrated in the drawing, the first virtual machine 520 or the second virtual machine 530 may add a virtual overlay 1300 to the plurality of virtual layers 1310 and 1330 to 1350.

In the drawing, an example is illustrated in which the virtual overlay 1300 is added onto the fifth virtual overlay 1350.

As described above, the first virtual machine 520 or the second virtual machine 530 may perform various operations, such as layer sequence change, deletion, or addition of virtual overlays. Accordingly, overlay editing may be easily performed, and a user interface may be freely implemented.

Figure 14:
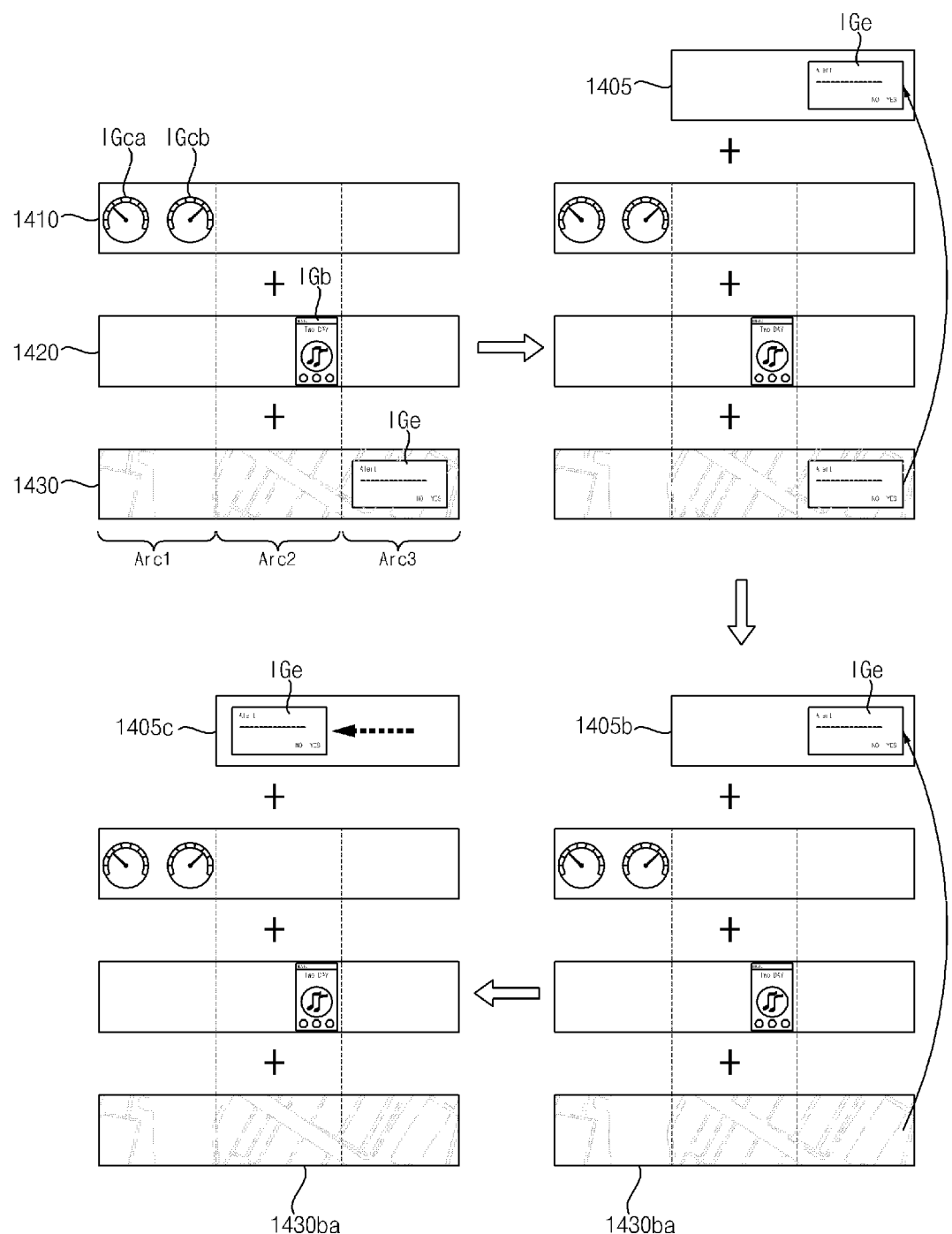
Figure 15:
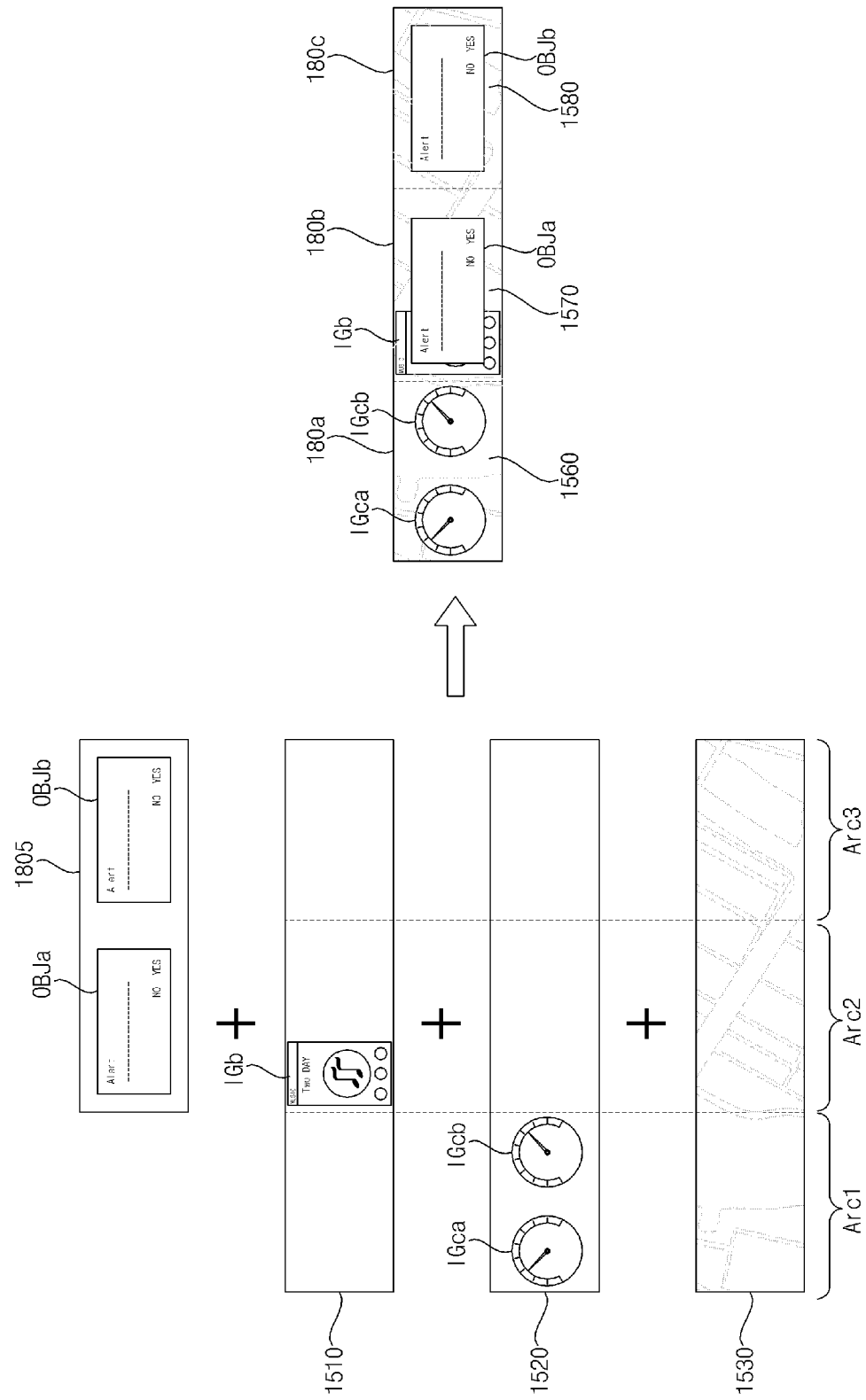

FIGS. 14 and 15 are diagrams illustrating various examples of virtual overlays for the first to third displays.

First, FIG. 14 illustrates an example in which message information is received during display of first to third virtual overlays 1410 to 1430, and a fourth virtual overlay 1405 including the message information is displayed.

Referring to the drawing, the second virtual machine 530 may generate a first virtual overlay 1410 including vehicle speed information IGca and IGcb in a first area Arc1, the third virtual machine 540 may generate a second virtual overlay 1420 including content information or contact information IGb in a second area Arc2, and the fourth virtual machine 550 may generate a third virtual overlay 1430 including map information in all areas Arc1, Arc2, and Arc3 and message information ICe in the third area Arc3.

Meanwhile, in response to receiving message information, the first virtual machine 520 or the second virtual machine 530 may generate the message information ICe and may display the message information ICe.

For example, in response to receiving message information, the first virtual machine 520 or the second virtual machine 530 may generate the message information ICe and may transmit the generated message information ICe to the fourth virtual machine 550.

In response thereto, the fourth virtual machine 550 may generate a fourth virtual overlay 1405 including the message information ICe in the third area Arc3.

Particularly, the fourth virtual machine 550 may generate a third virtual overlay 1430 including map information in all areas Arc1, Arc2, and Arc3 and message information ICe in the third area Arc3.

Meanwhile, the first virtual machine 520 may display at least one of the first to third virtual overlays on the first to third displays 180a, 180b, 180c, 180d, and 180e.

Accordingly, a variety of information may be displayed on the displays. In addition, even when the number of running virtual machines increases, objects may be displayed rapidly and accurately by instance copying during screen sharing.

For example, the vehicle speed information IGca and IGcb may be displayed on the first display 180a, the contact information IGb may be displayed on the second display 180b, and the map information and the message information ICe may be displayed on the third display 180c.

Meanwhile, as illustrated in the drawing, the first virtual machine 520 or the second virtual machine 530 may separately generate a fourth virtual overlay 1405 including the message information ICe in the third area Arc3.

Further, the first virtual machine 520 or the second virtual machine 530 may delete the message information ICe from the third virtual overlay 1430.

Accordingly, as illustrated in the drawing, the third virtual overlay 1430b may include only the map information in all areas Arc1, Arc2, and Arc3, while the message information ICe is deleted therefrom.

Meanwhile, the first virtual machine 520 or the second virtual machine 530 may move the position of the message information ICe in the fourth virtual overlay 1405.

For example, as illustrated in the drawing, the first virtual machine 520 or the second virtual machine 530 may move the position of the message information ICe in a fourth virtual overlay 1405 from the third area Arc3 to the second area Arc2.

As described above, as the position of the message information ICe is moved from the third area Arc3 to the second area Arc2, the vehicle speed information IGca and IGcb may be displayed on the first display 180a, the contact information IGb and the message information ICe may be displayed together on the second display 180b, and only the map information may be displayed on the third display 180c.

For example, if the first virtual machine 520 or the second virtual machine 530 assigns priority to the message information ICe by selecting between the contact information IGb and the message information ICe, the message information ICe may be displayed on top of the contact information IGb, such that the message information ICe may be displayed on top of the contact information IGb on the second display 180b.

FIG. 15 is a diagram illustrating an example in which four virtual overlays 1505, 1510, 1520, and 1530 are sequentially disposed from top to bottom.

Referring to the drawing, the second virtual machine 530 may generate a fourth virtual overlay 1805 including first message information OBJa in a second area Arc2 and second message information OBJb in a third area Arc3, the third virtual machine 540 may generate a second virtual overlay 1810 including content information or contact information IGb in the second area Arc2, the second virtual machine 530 may generate a first virtual overlay 1520 including vehicle speed information IGca and IGcb in the first area Arc1, and the fourth virtual machine 550 may generate a third virtual overlay 1830 including map information in all areas Arc1, Arc2, and Arc3.

The first virtual machine 520 or the second virtual machine 530 may sequentially fourth virtual overlay 1805, the second virtual overlay 1810, the first virtual overlay 1520, and the third virtual overlay 1830 from top to bottom.

Accordingly, the fourth virtual overlay 1805 may be disposed at the uppermost side.

As illustrated in the drawing, the vehicle speed information IGca and IGcb may be displayed on top of map information 1560 on the first display the contact information IGb may be displayed on top of map information 1570 on the second display 180b, the first message information OBJa may be displayed on top of the contact information IGb on the second display 180b, and the second message information OBJb may be displayed on top of map information 1580 on the third display 180c.

That is, in response to receiving message information, the first virtual machine 520 or the second virtual machine 530 may display the first message information OBJa on top of the contact information IGb on the second display 180b. Accordingly, a variety of information may be displayed on the displays.

Meanwhile, in response to receiving message information, the first virtual machine 520 or the second virtual machine 530 may display the second message information OBJb on top of the map information 1580 on the third display 180c. Accordingly, a variety of information may be displayed on the displays.

Meanwhile, the first virtual machine 520 or the second virtual machine 530 may move an object on the plurality of virtual overlays, and may display the moved object on at least one of the plurality of displays. Accordingly, the object may be moved and displayed.

Meanwhile, FIGS. 14 and 15 are diagrams illustrating an example in which the first to third displays 180a and 180c display each object while displaying map information.

Similarly, in order to display each object on the plurality of displays while common map information is displayed thereon, it is required to generate and share overlays. Particularly, signal processing may be complicated in order to display each object on the plurality of displays during screen sharing.

Accordingly, embodiments of the present disclosure disclose a method of rapidly and accurately displaying objects by instance copying during screen sharing, which will be described below.

The processor 175 according to an embodiment of the present disclosure is configured to display a first image including a first overlay on the first display 180c, transmit the first image by screen sharing, and display a second image of a mirrored image corresponding to the first image on the second display 180*d*; and generate a second overlay different from the first overlay, while displaying the first and second images, transmit information related to the second overlay by instance copying, and display a second overlay generated based on the information related to the second overlay on the top of the first image or the second image. Accordingly, objects may be displayed rapidly and accurately by instance copying during screen sharing. Particularly, the second overlay may be displayed rapidly and accurately.

Meanwhile, after displaying the first image and the second image, the processor 175 may display images including the first overlay and the second overlay on the first display 180*c* and the second display 180*d*, respectively. Accordingly, images including the first overlay and the second overlay may be displayed rapidly and accurately.

Meanwhile, in response to receiving an input through a human machine interface while displaying the first image and the second image, the processor 175 may generate the second overlay. Accordingly, the second overlay may be displayed rapidly and accurately.

Meanwhile, in response to receiving an input through the first display while displaying the first image and the second image, the processor 175 may be configured to generate the second overlay, display a third image including the first overlay and the second overlay on the first display 180*c*, transmit information related to the second overlay by instance copying, and display a fourth image including a second overlay generated based on the information related to the second overlay and the first overlay on the second display 180*d*. Accordingly, the third image and the fourth image, which include the first overlay and the second overlay, may be displayed rapidly and accurately.

Meanwhile, in response to receiving an input through the second display while displaying the first image and the second image, the processor 175 may be configured to generate a second overlay, display the third image including the first overlay and the second overlay on the second display 180*d*, transmit information related to the second overlay by instance copying, and display a fourth image including a second overlay generated based on the information related to the second overlay and the first overlay on the first 180*c*. Accordingly, the third image and the fourth image, which include the first overlay and the second overlay, may be displayed rapidly and accurately.

Meanwhile, the processor 175 may execute a plurality of containers DTc and DTd, and the plurality of containers DTc and DTd operate for the plurality of display 180*c* and 180*d*, respectively, in which a first container of the containers DTc and DTd may transmit information related to the second overlay to a second container by instance copying, and the second container may generate a second overlay based on the information received from the first container. Accordingly, an image including the second overlay may be displayed rapidly and accurately.

Meanwhile, the processor 175 may execute a server virtual machine and a plurality of guest virtual machines, in which a first guest virtual machine among the plurality of guest virtual machines may be configured to display a first image including a first overlay on the first display 180*c* and transmit the first image by screen sharing; and a second guest virtual machine among the plurality of guest virtual machines may be configured to display the second image of a mirrored image corresponding to the first image on the second display 180*d*, in which the first guest virtual machine among the plurality of guest virtual machines may generate a second overlay different from the first overlay, while displaying the first image and the second image and transmit information related to the second overlay by instance copying; and the second guest virtual machine among the plurality of guest virtual machines may be configured to display a second overlay generated based on the information related to the second overlay on top of the second image. Accordingly, the second overlay may be displayed rapidly and accurately.

Figure 16:
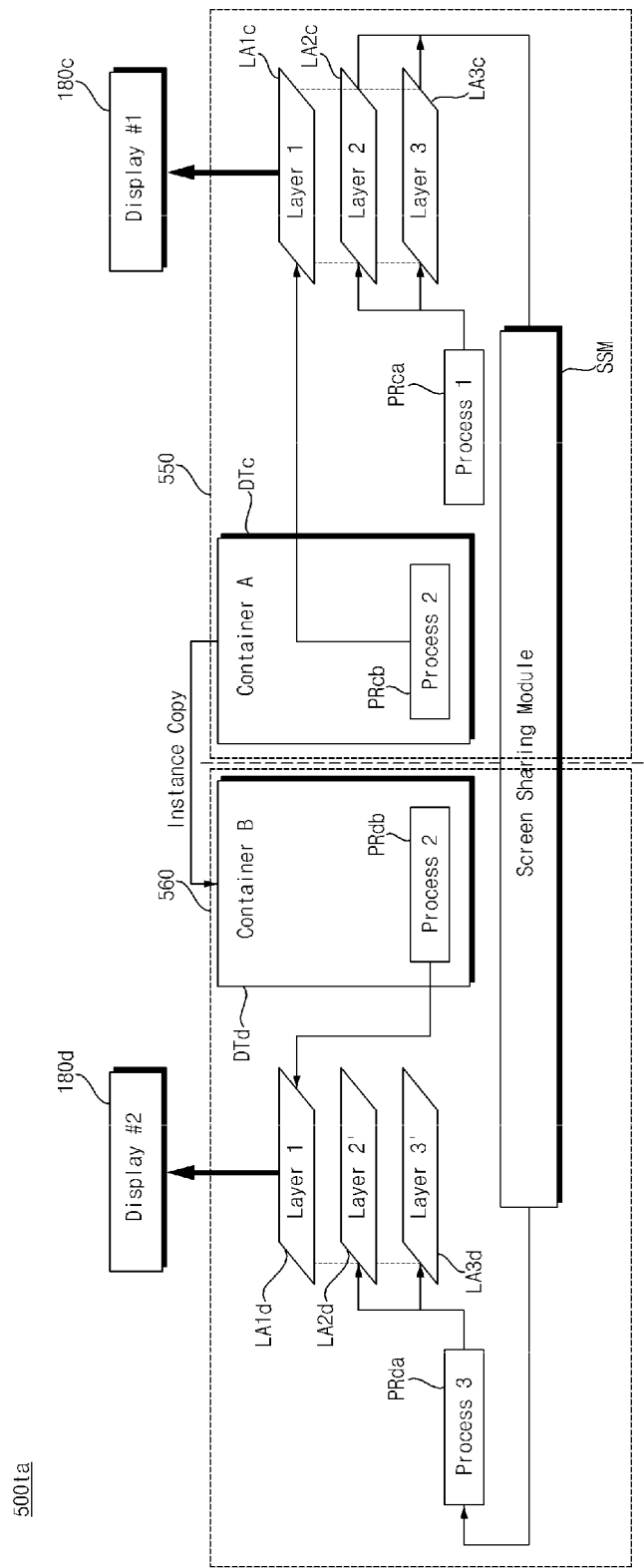
FIG. 16 is a diagram illustrating yet another example of a system executed in a signal processing device according to an embodiment of the present disclosure.

FIG. 16 is a diagram illustrating yet another example of a system executed in a signal processing device according to an embodiment of the present disclosure.

Referring to the drawing, a system 500*ta* running on the processor 175 in the signal processing device 170 according to an embodiment of the present disclosure may operate for the plurality of displays 180*c* and 180*d*.

For example, a first display of the plurality of displays 180*c* and 180*d* may be a passenger seat display 180*c*, and a second display thereof may be an RSE display 180*d*.

In view of FIG. 9B, the plurality of displays of FIG. 16 may be modified in various ways, but the following description will be given of an example in which the first display is the passenger seat display 180*c*, and the second display is the RSE display 180*d*.

Accordingly, the processor 175 may execute the fourth virtual machine 550 to control the passenger seat display 180*c* and execute the fifth virtual machine 560 to control the RSE display 180*d*.

Meanwhile, the processor 175 may execute the plurality of containers DTc and DTd, and particularly, the processor 175 may execute a first container DTc to control the passenger seat display 180*c* and execute a second container DTd to control the RSE display 180*d*.

In the drawing, an example is illustrated in which a process 1 PRCa in the fourth virtual machine 550 of the processor 175 generates a plurality of overlays LA2*c* and LA3*c*.

The fourth virtual machine 550 in the processor 175 may be configured to display the generated plurality of overlays LA2*c* and LA3*c* on the first display 180*c* at a first time.

Meanwhile, the fourth virtual machine 550 in the processor 175 may transmit the generated plurality of overlays LA2*c* and LA3*c* or information related to the plurality of overlays LA2*c* and LA3*c* to the fifth virtual machine 560 by using a screen sharing module SSM provided therein.

In the drawing, an example is illustrated in which a process 3 PRda in the fifth virtual machine 550 of the processor 175 generates a plurality of overlays LA2*d* and LA3*d* based on the received plurality of overlays LA2*c* and LA3*c* or information related to the plurality of overlays LA2*c* and LA3*c*. Accordingly, the fifth virtual machine 560 in the processor 175 may be configured to display the generated plurality of overlays LA2*d* and LA3*d* on the second display 180*d* at the first time.

That is, the processor 175 may be configured to display the first image, including the plurality of overlays LA2*c* and LA3*c* on the first display 180*c* at the first time and transmit the first image or information related to the first image by screen sharing, to display the second image of a mirrored image corresponding to the first image, on the second display 180*d*. Accordingly, the mirrored image may be displayed rapidly and accurately between the plurality of displays 180*c* and 180*d* in a vehicle.

Meanwhile, in response to receiving an input through a human machine interface after the first time, or in response to receiving data from an external source through the transceiver 120, or in response to receiving information, such as sensor information and the like, through the interface 130, the processor 175 may generate an additional overlay based on the received input or information, or the like.

In the drawing, an example is illustrated in which a process 2 PRCb in the fourth virtual machine 550 of the processor 175 generates an additional overlay LA1c.

Specifically, the process 2 PRCb in the first container DTc of the fourth virtual machine 550 in the processor 175 may generate the additional overlay LA1c.

Further, the fourth virtual machine 550 in the processor 175 may be configured to display an image generated by merging the additional overlay LA1c on top of the plurality of overlays LA2c and LA3c on the first display 180c at a second time after the first time.

Meanwhile, the use of screen sharing module SSM during transmission of the additional overlay LA1c to the fifth virtual machine 560 may result in considerable resource consumption or time consumption.

Accordingly, the embodiment of the present disclosure proposes a method of transmitting information related to the additional overlay LA1c to the fifth virtual machine 560 by instance copying.

In the drawing, an example is illustrated in which the first container DTc in the fourth virtual chine 550 of the processor 175 transmits the information to the second container DTd in the fifth virtual machine 560 of the processor 175 by instance copying.

Accordingly, the process 2 PRCb in the second container DTd of the fifth virtual machine 560 in the processor 175 may generate an additional overlay LA1d based on the received information.

Further, the fifth virtual machine 560 in the processor 175 may be configured to display an image generated by merging the additional overlay LA1d on top of the plurality of overlays LA2d and LA3d on the second display 180d at the second time after the first time.

Accordingly, objects may be displayed rapidly and accurately by instance copying during screen sharing. Particularly, the additional overlay may be displayed rapidly and accurately.

Figure 25A:
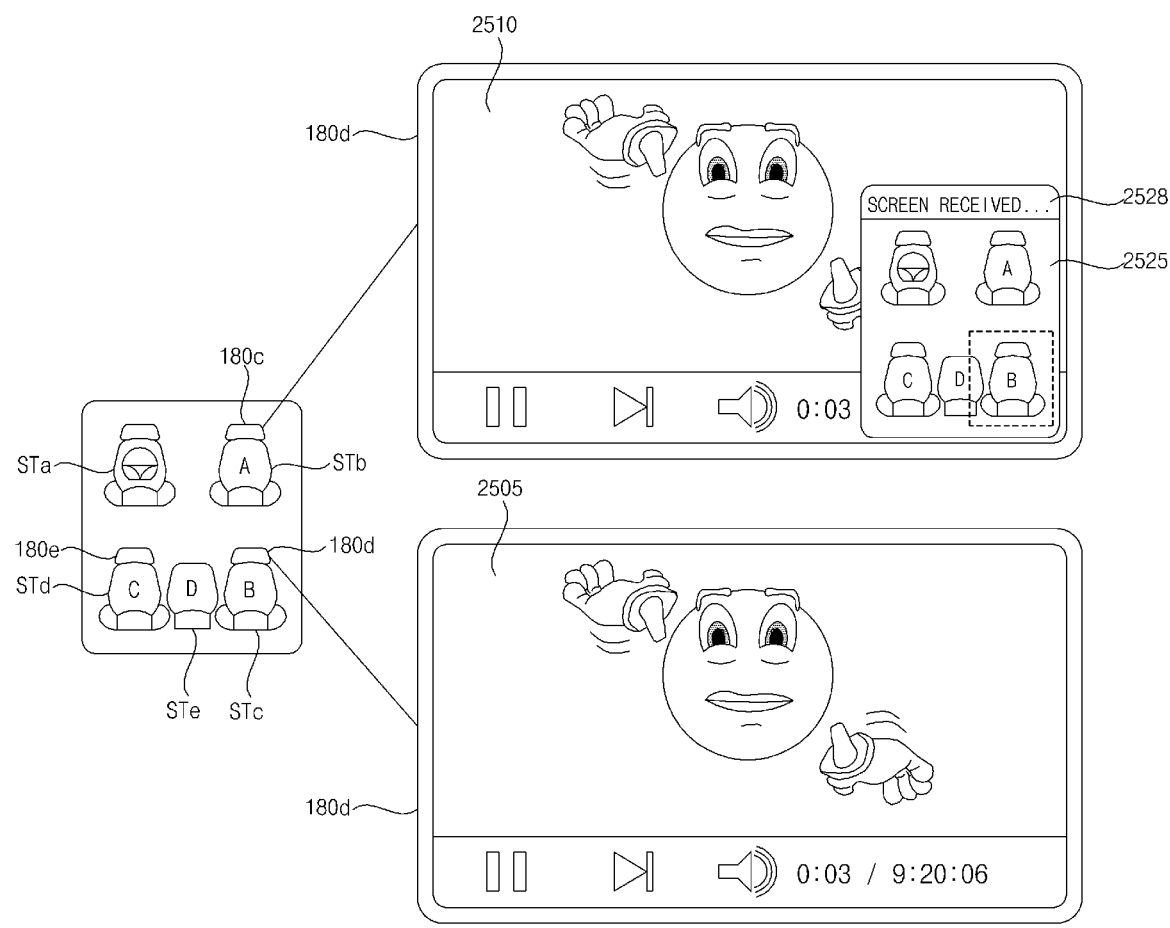
Figure 25B:
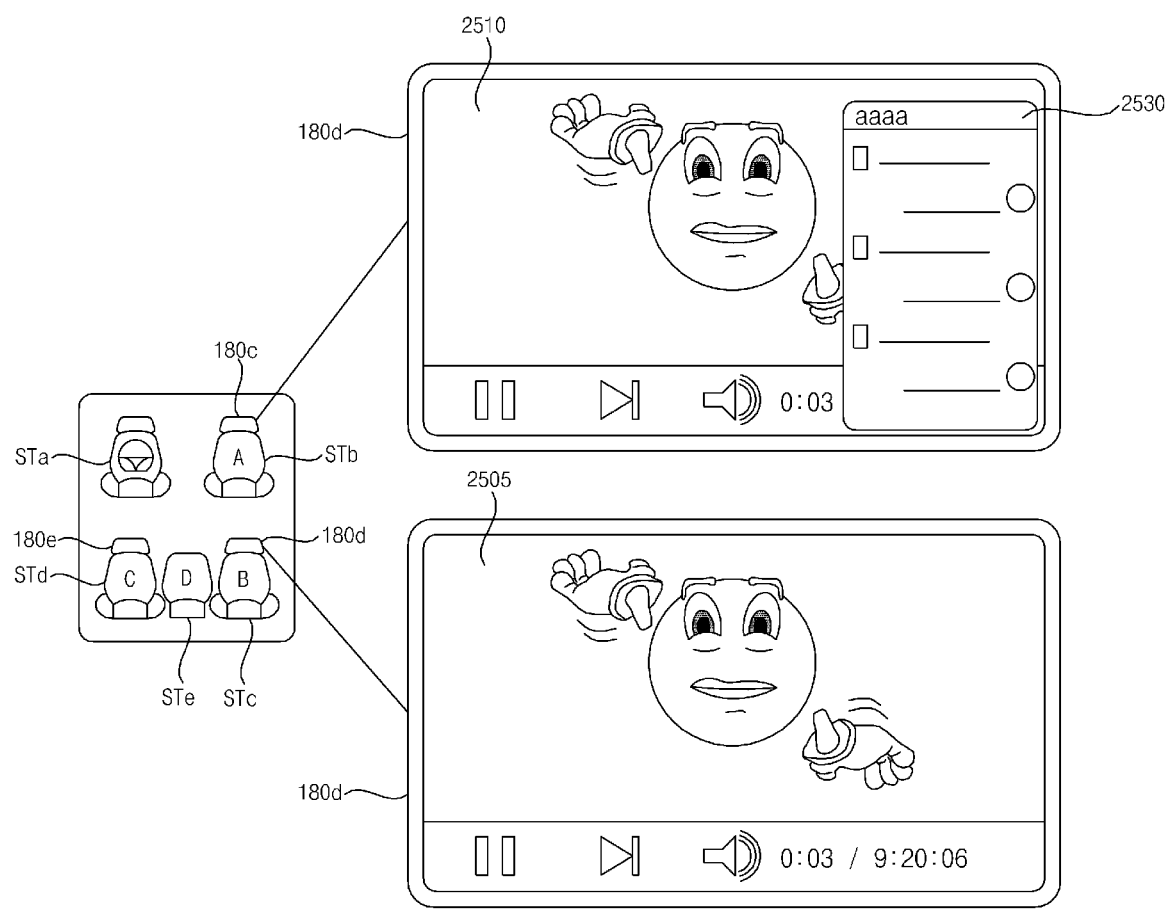
Figure 26A:
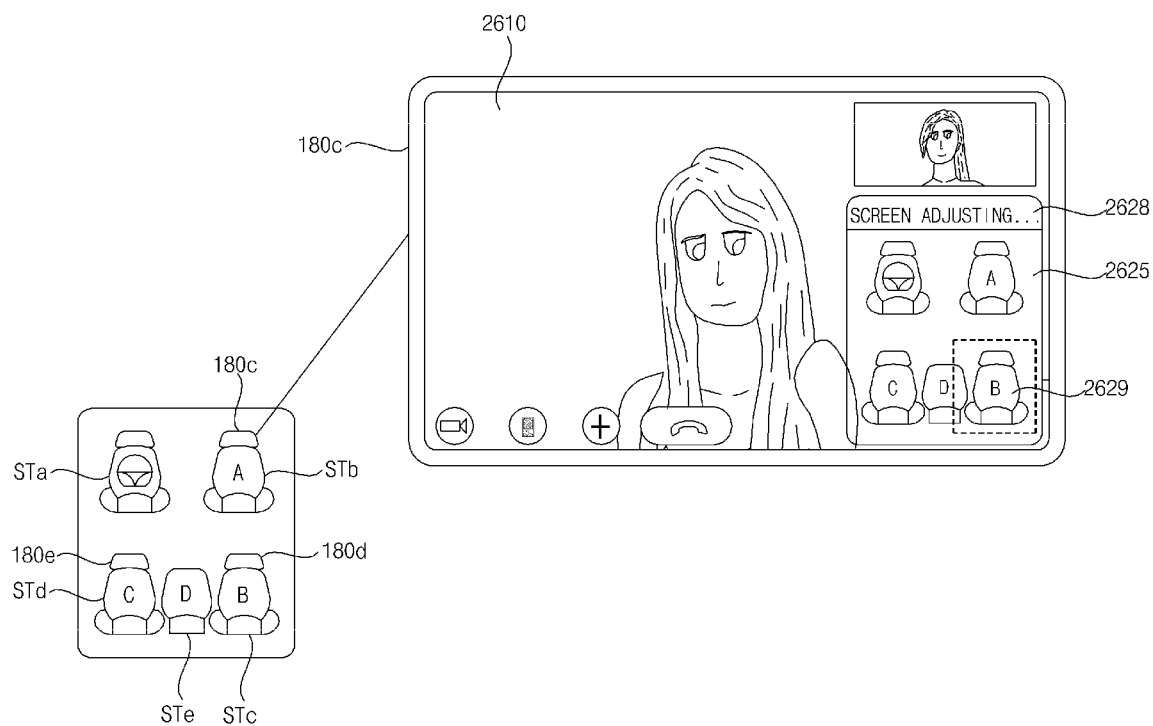
Figure 26B:
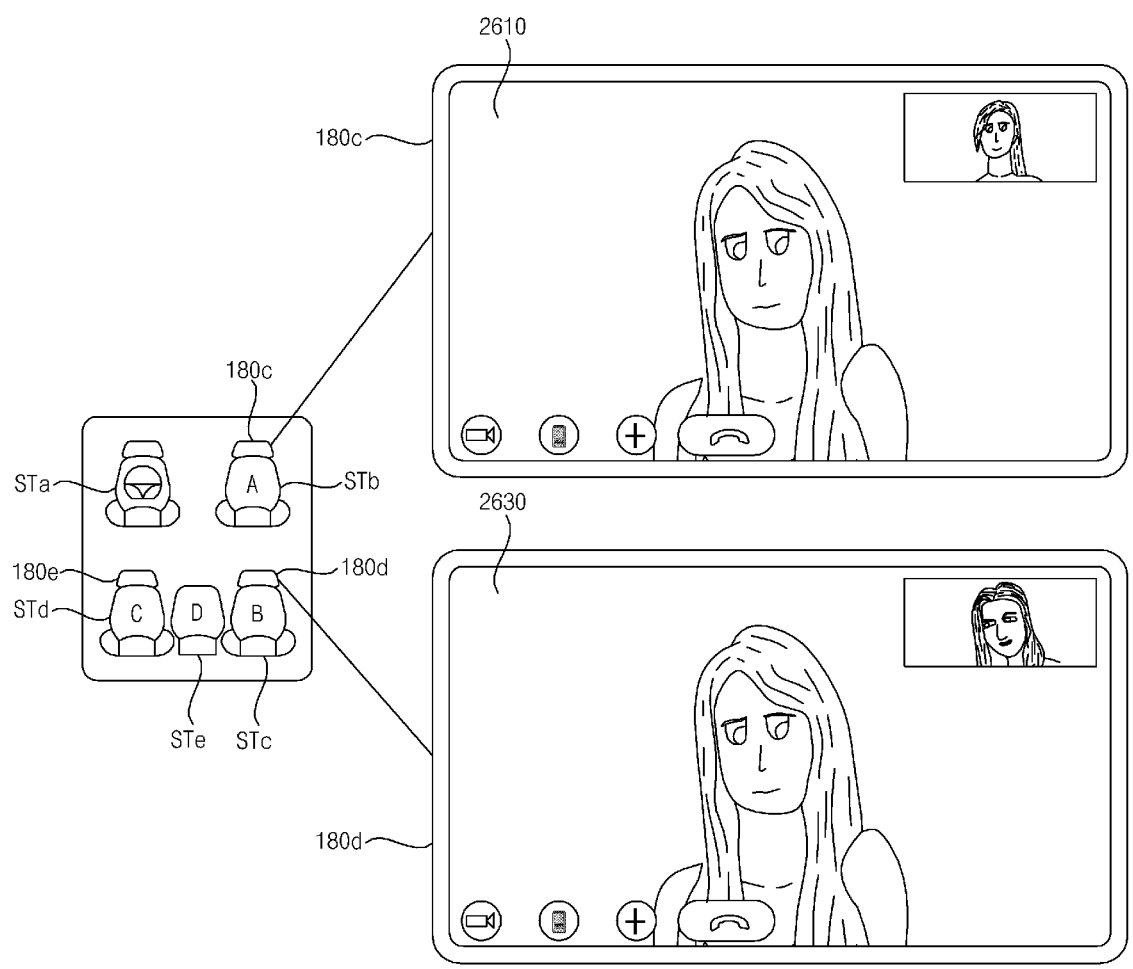

FIGS. 17A to 26B are diagrams referred to in the description of FIG. 26.

Figure 17A:
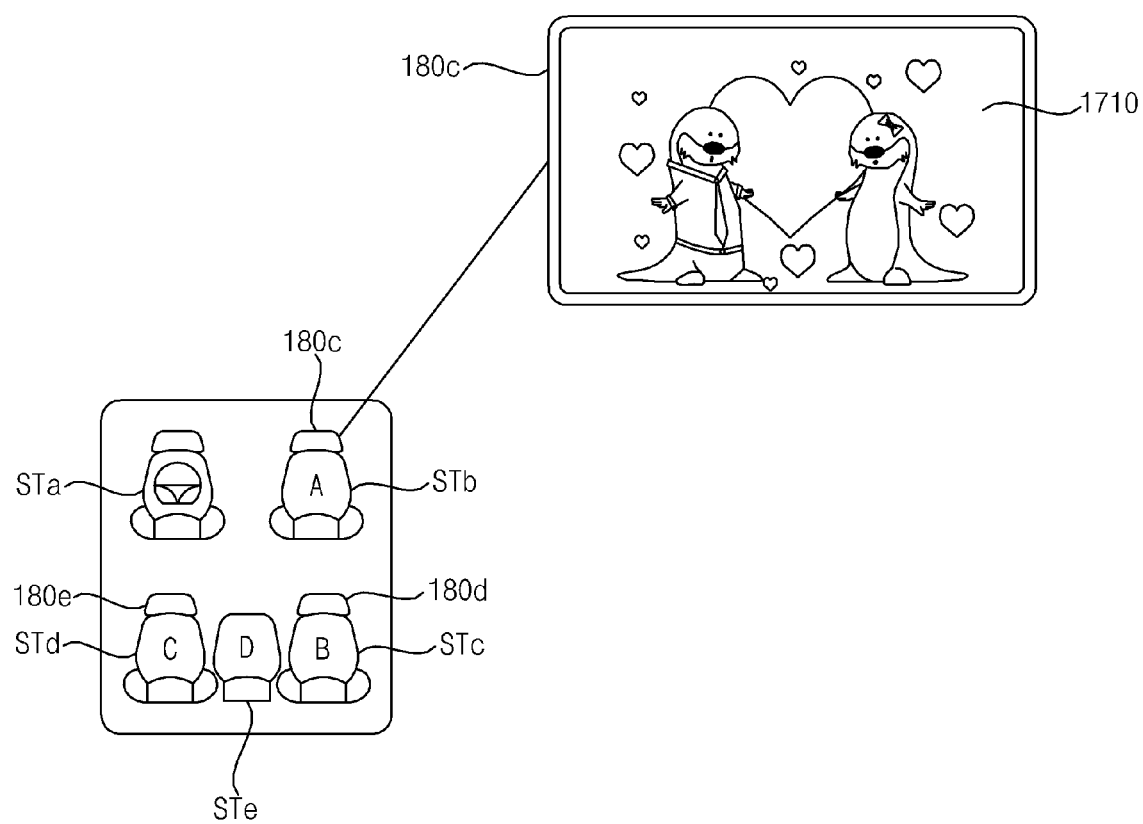
FIGS. 17A to 26B are diagrams referred to in the description of FIG. 26.

FIG. 17A is a diagram illustrating an example in which a first image 1710 is displayed on the passenger seat display 180c disposed in front of a passenger seat STb in a vehicle.

Referring to the drawing, the cluster display 180a is disposed in front of a driver's seat Sta, the passenger seat display 180c is disposed in front of the passenger seat STb, the first RSE display 180d is disposed in front of a right rear seat STc, and the second RSE display 180e may be disposed in front of a left rear seat STd.

Although not illustrated herein, the AVN display 180b may be disposed in front of a space between the driver's seat STa and the passenger seat STb.

Meanwhile, the fourth virtual machine 550 in the processor 175 may control display of the first image 1710.

For example, the processor 175 may be configured to display a first image 1710 including a first overlay on the first display 180c.

Meanwhile, during display of the first image 1710 on the passenger seat display 180c, if there is a mirroring input through the RSE display 180d disposed in front of the right rear seat STc, the fifth virtual machine 560 in the processor 175 may transmit a mirroring request or a screen sharing request to the fourth virtual machine 550.

In response thereto, the fourth virtual machine 550 in the processor 175 may transmit an image, corresponding to the first image 1710, or image information to the fifth virtual machine 560 in the processor 175.

Further, the fifth virtual machine 560 in the processor 175 may be configured to display a mirrored image corresponding to the received image or image information on the second display 180d.

Figure 17B:
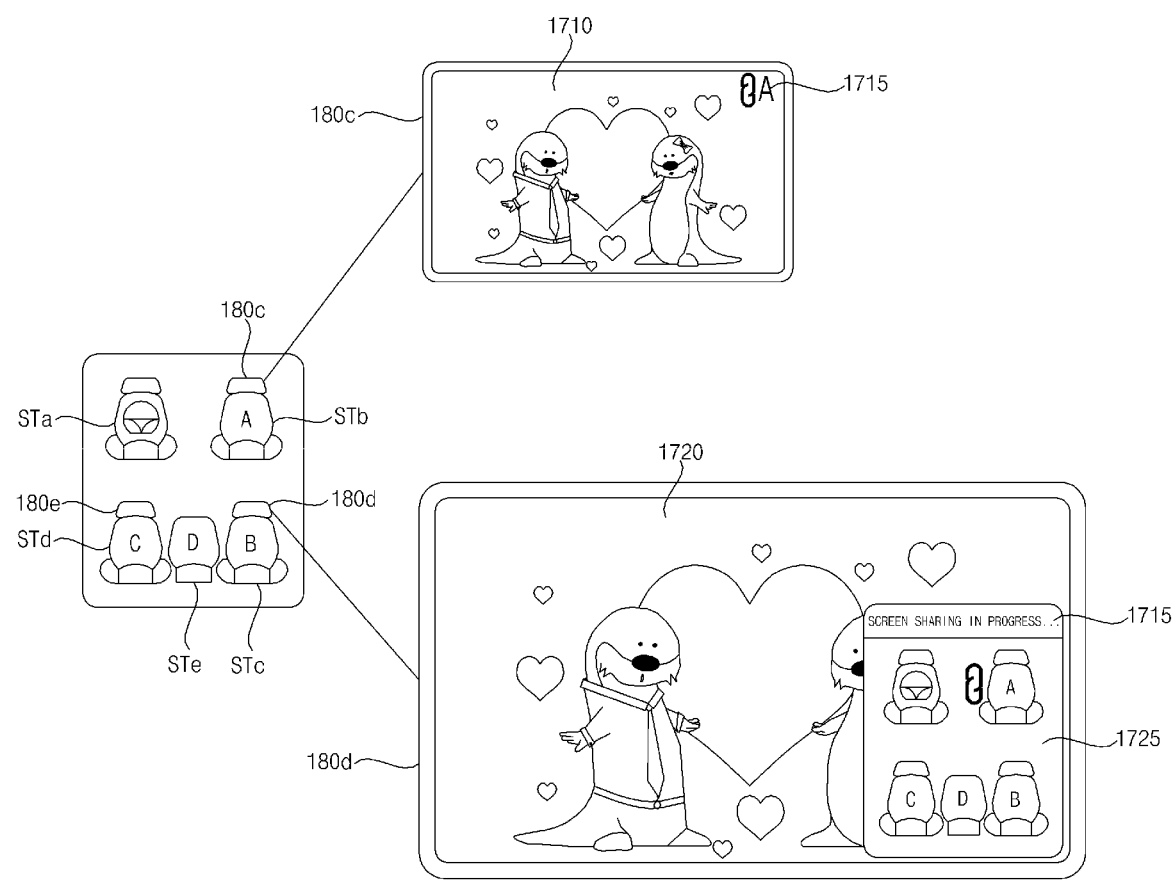

FIG. 17B is a diagram illustrating an example in which while the first image 1710 is displayed on the first display 180c, a second image 1720, which is a mirrored image, is displayed on the second display 180d by mirroring.

Meanwhile, the fourth virtual machine 560 in the processor 175 may generate a second overlay, including screen sharing information, while displaying the first image 1710, and may transmit information related to the second overlay to the fifth virtual machine 560 in the processor 175 by instance copying.

Meanwhile, the fifth virtual machine 560 in the processor 175 may generate a second overlay, including the screen sharing information, based on the information related to the second overlay, and may be configured to display screen sharing information 1715 on the second display 180d.

Particularly, the fifth virtual machine 560 in the processor 175 may be configured to display the second image 1720, which is the mirrored image, and display the screen sharing information 1715.

Meanwhile, in addition to the second image 1720 and the screen sharing information 1715, the fifth virtual machine 560 in the processor 175 may control an object 1725 that represents seat information to be further displayed on the second display 180d.

Particularly, the fifth virtual machine 560 in the processor 175 may be configured to display source information of the mirrored image within the object 1725 representing the seat information. Accordingly, source information of the mirrored image may be simply identified.

In the drawing, an example is illustrated in which source information, attached to a position corresponding to the passenger seat, is displayed within the object 1725.

Meanwhile, the fourth virtual machine 560 in the processor 175 may be configured to display information 1715 indicating that mirroring is in progress within the first image. Accordingly, it is possible to simply identify that mirroring is in progress.

Meanwhile, the fifth virtual machine 560 in the processor 175 may be configured to display the screen sharing information 1715, the object 1725 representing the seat information, etc., which are illustrated in FIG. 17B only for a predetermined period of time, and then to disappear.

Figure 17C:
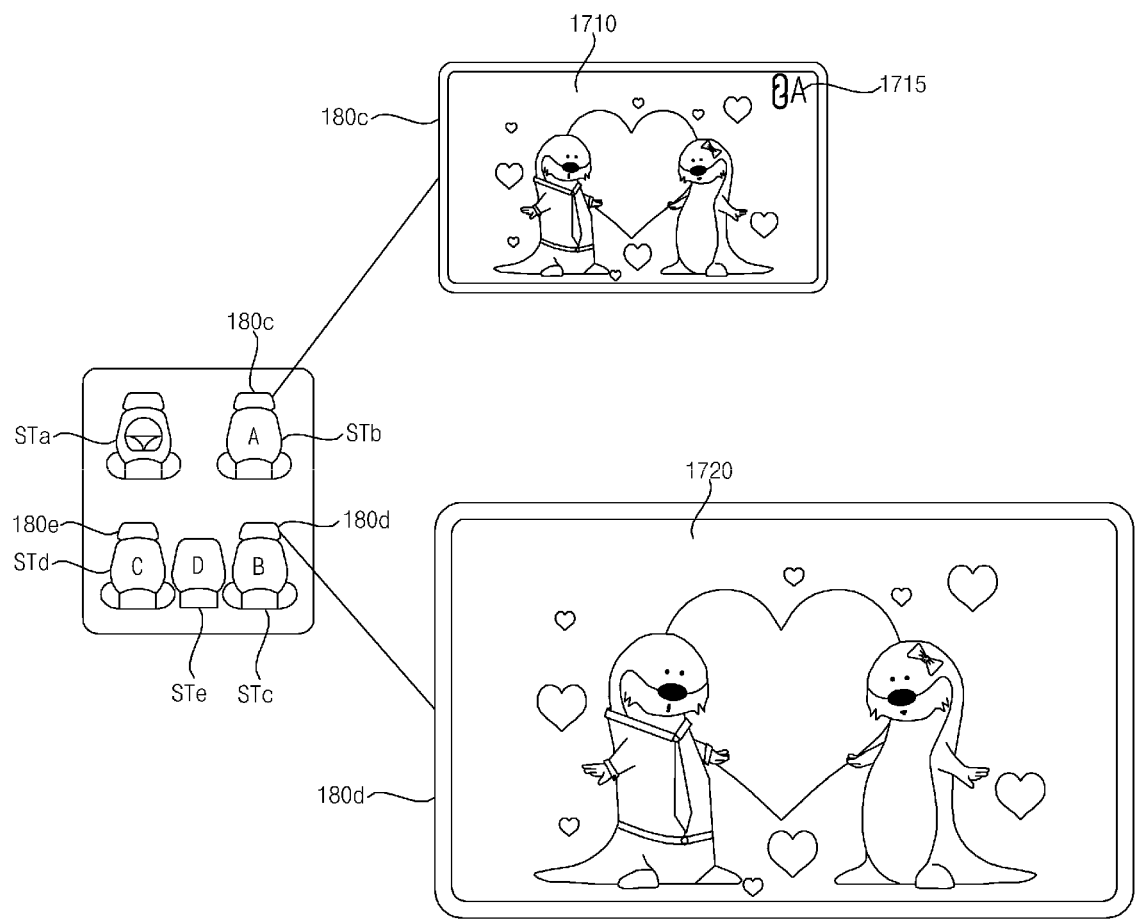

FIG. 17C is a diagram illustrating an example in which the screen sharing information 1715, the object 1725 representing the seat information, and the like disappear after being displayed on the second display 180d, and the second image 1720 which is the mirrored image is displayed on the second display 180d. Accordingly, the screen sharing information 1715 may be provided for a predetermined period of time.

Figure 18A:
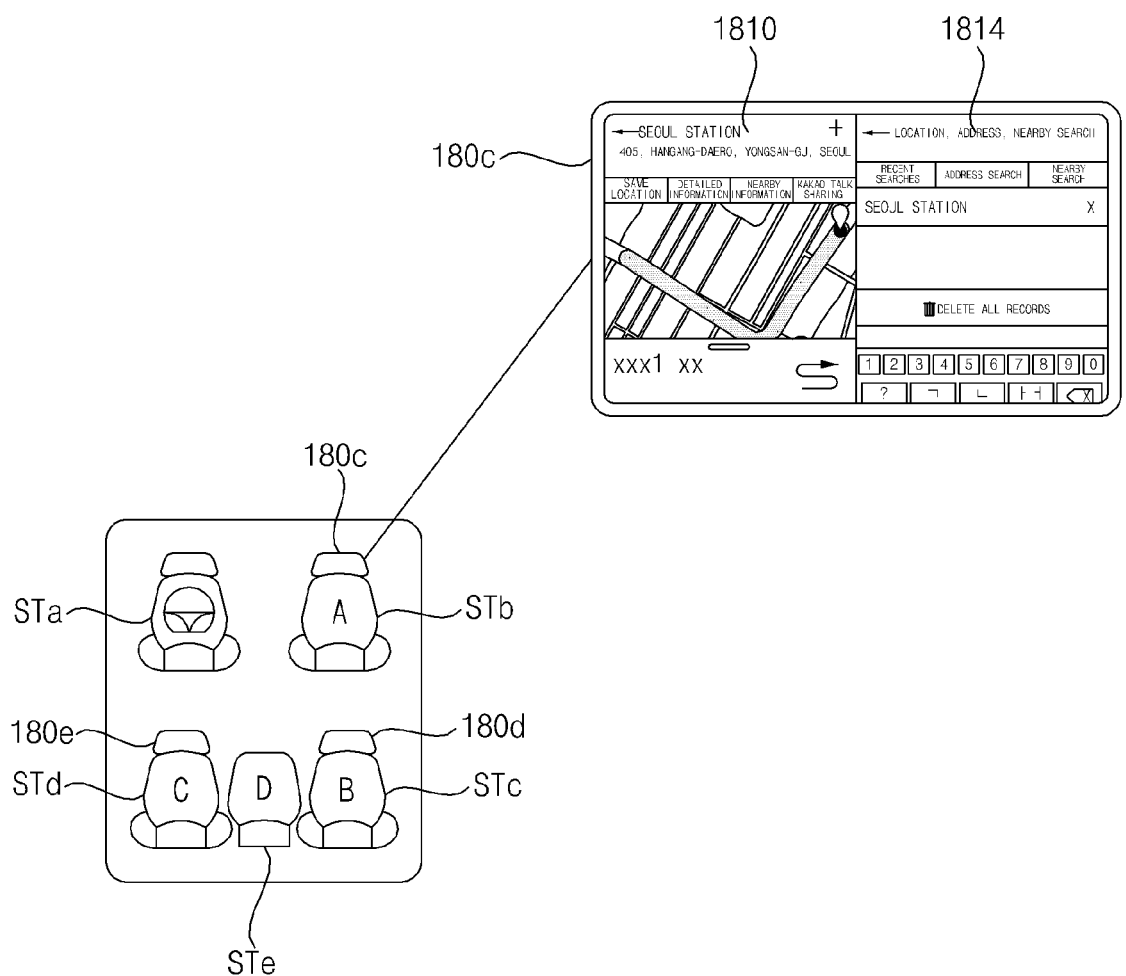

FIG. 18A is a diagram illustrating an example of displaying a first image 1810 on the passenger seat display 180c disposed in front of the passenger seat STb in a vehicle.

Meanwhile, the fourth virtual machine 550 in the processor 185 may display the first image 1810.

The first image 1810 may include map information and a search item 1814.

In response to a mirroring input through the RSE display 180d disposed in front of the right rear seat STc while displaying the first image 1810 on the passenger seat display 180c, the fifth virtual machine 560 in the processor 185 may transmit a mirroring request or a screen sharing request to the fourth virtual machine 550.

In response thereto, the fourth virtual machine 550 in the processor 185 may transmit an image, corresponding to the first image 1810, or image information to the fifth virtual machine 560 in the processor 175.

Further, the fifth virtual machine 560 in the processor 175 may be configured to display a mirrored image corresponding to the received image or image information on the second display 180*d*.

Figure 18B:
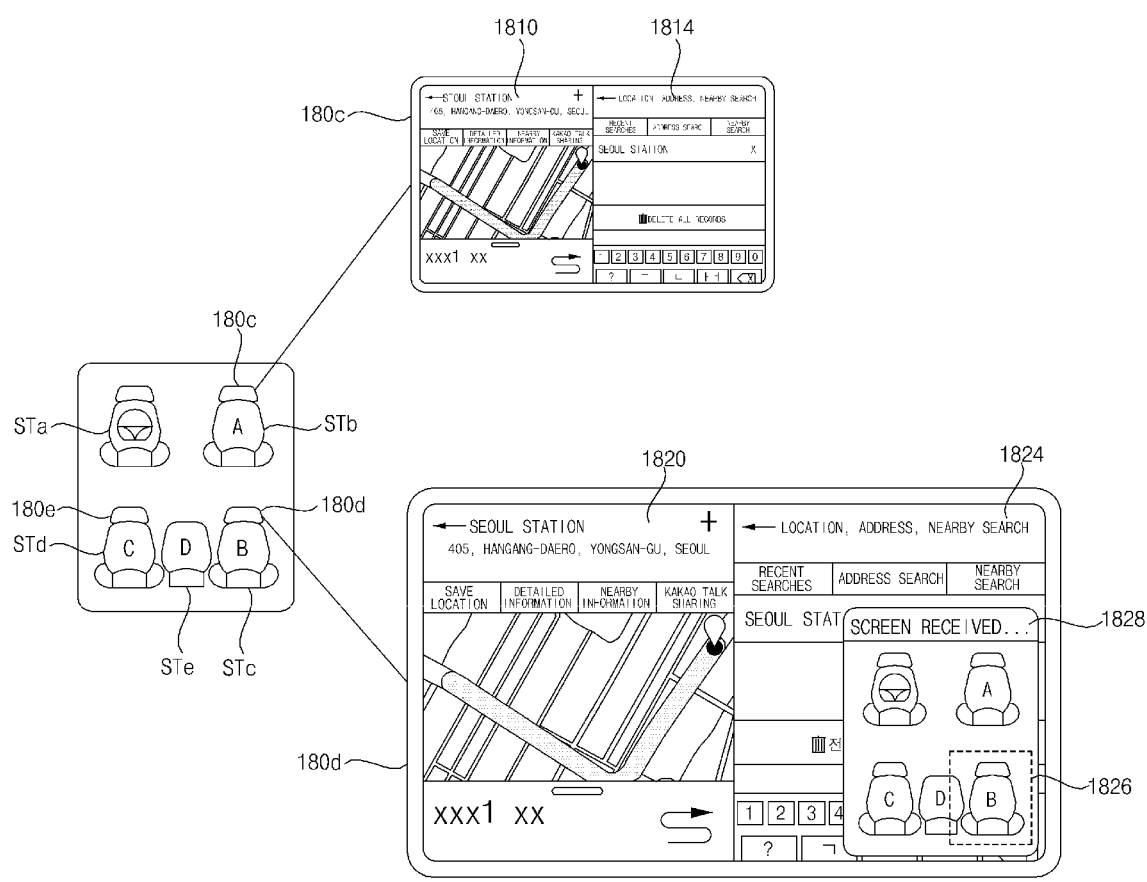

FIG. 18B is a diagram illustrating an example in which while the first image 1810 is displayed on the first display 180*c*, a second image 1820, which is a mirrored image, is displayed on the second display 180*d* by mirroring.

Meanwhile, the fourth virtual machine 560 in the processor 185 may generate a second overlay, including screen sharing information, while displaying the first image 1810, and may transmit information related to the second overlay to the fifth virtual machine 560 in the processor 185 by instance copying.

Meanwhile, the fifth virtual machine 560 in the processor 185 may generate a second overlay, including the screen sharing information, based on the information related to the second overlay, and may be configured to display screen sharing information 1828 on the second display 180*d*.

Particularly, the fifth virtual machine 560 in the processor 175 may be configured to display the second image 1820, which is the mirrored image, and display the screen sharing information 1828 together.

Meanwhile, in addition to the second image 1820 and the screen sharing information 1828, the fifth virtual machine 560 in the processor y control an object 1825 that represents seat information to be further displayed on the second display 180*d*.

Meanwhile, the fifth virtual machine 560 in the processor 185 may be configured to display the screen sharing information the object 1825 representing the seat information, etc., which are illustrated in FIG. 18B, only for a predetermined period of time, and then to disappear.

In this case, the fifth virtual machine 560 in the processor 185 may be configured to display another image instead of the mirrored image on the second display 180*d*.

Figure 18C:
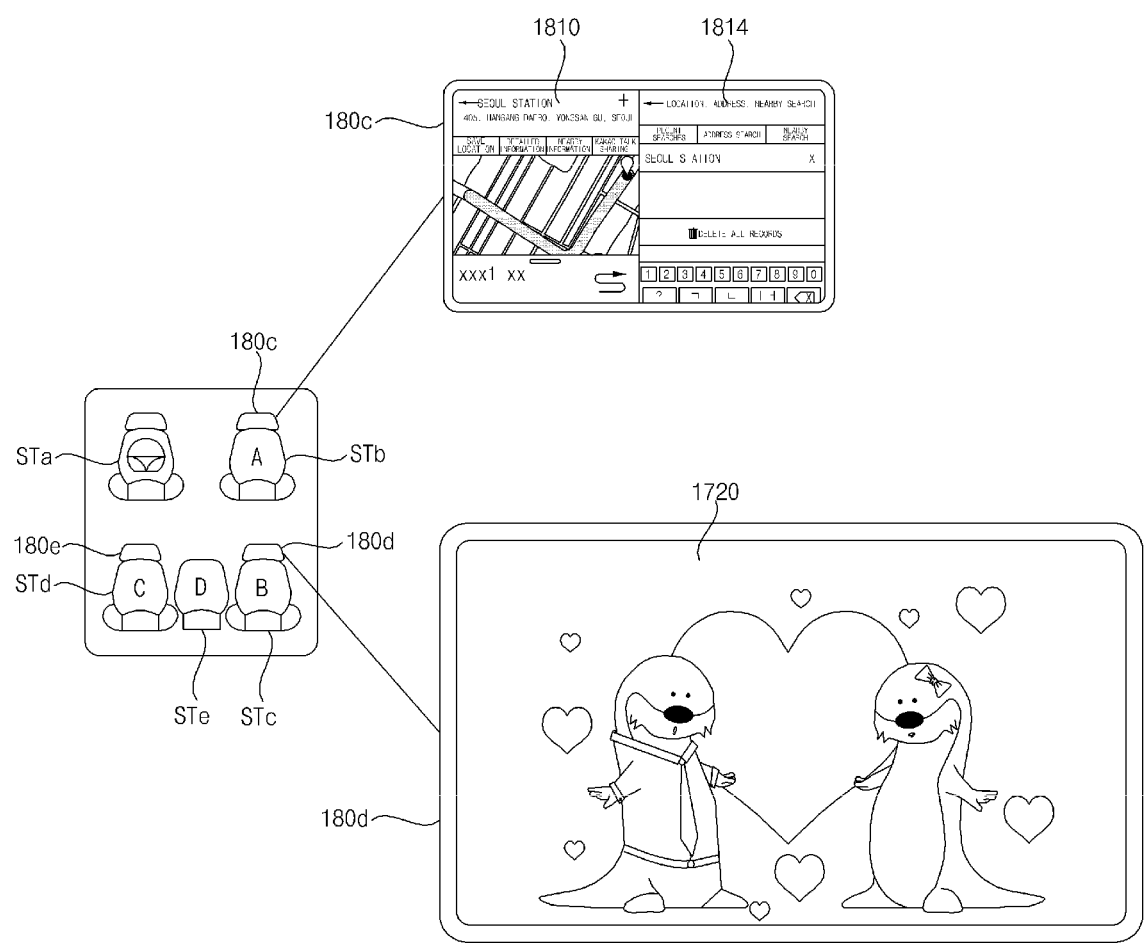

FIG. 18C is a diagram illustrating an example in which the screen sharing information 1828, the object 1825 representing the seat information, and the like disappear after being displayed on the second display 180*d*, and another image 1720 instead of the mirrored image is displayed on the second display 180*d*. Accordingly, the mirroring may be terminated.

Meanwhile, the processor 175 may be configured to display a first image including a first overlay on the first display 180*c* and display second image of a mirrored image corresponding to the first image on the second display 180*d* by screen sharing, in which the processor 175 may enlarge and display the second image step by step in a direction between first display the 180*c* and the second display 180*d*. Accordingly, the direction between the first display 180*c* and the second display 180*d* may be intuitively displayed, which will be described below with reference to FIGS. 19A and 19B.

Figure 19A:
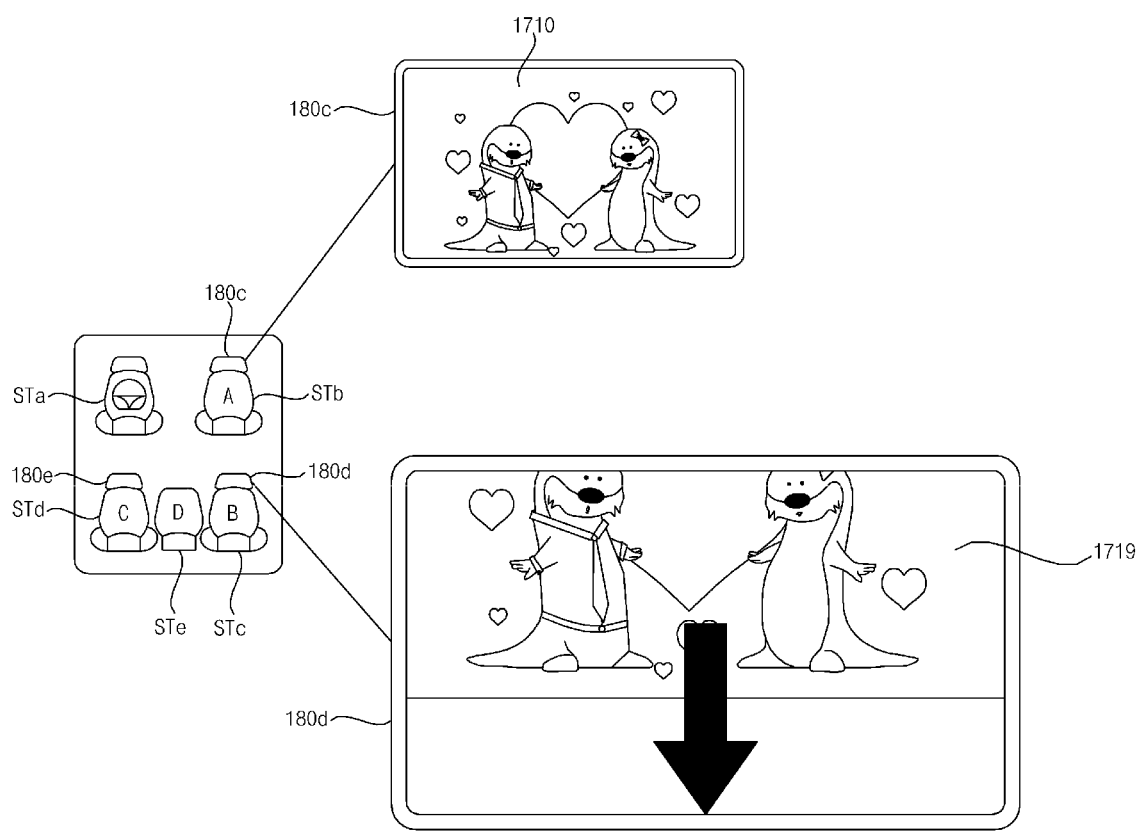

FIG. 19A is a diagram illustrating an example in which the first image 1710 is displayed on the passenger seat display 180*c* disposed in front of the passenger seat STb in a vehicle, and a second image 1719 which is a mirrored image is displayed on the first RSE display 180*d* disposed in front of the right rear seat STc.

In response to a mirroring input through the RSE display 180*d* disposed in front of the right rear seat STc while displaying the first image 1710 on the passenger seat display 180*c*, the fifth virtual machine 560 in the processor 175 may transmit a mirroring request or a screen sharing request to the fourth virtual machine 550.

In response thereto, the fourth virtual machine 560 in the processor 175 may transmit an image, corresponding to the first image 1710, or image information to the fifth virtual machine 560 in the processor 175.

Further, the fifth virtual machine 560 in the processor 175 may display a mirrored image corresponding to the received image or image information.

In this case, while displaying the second image, the fifth virtual machine 560 in the processor 175 may be configured to enlarge and display the second image step by step in a direction between the first display 180*c* and the second display 180*d*.

As illustrated in the drawing, if the direction between the first display 180*c* and the second display 180*d* is an up and down or vertical direction, the fifth virtual machine 560 in the processor 175 may control the second image 1719 to be enlarged step by step in the vertical direction.

Figure 19B:
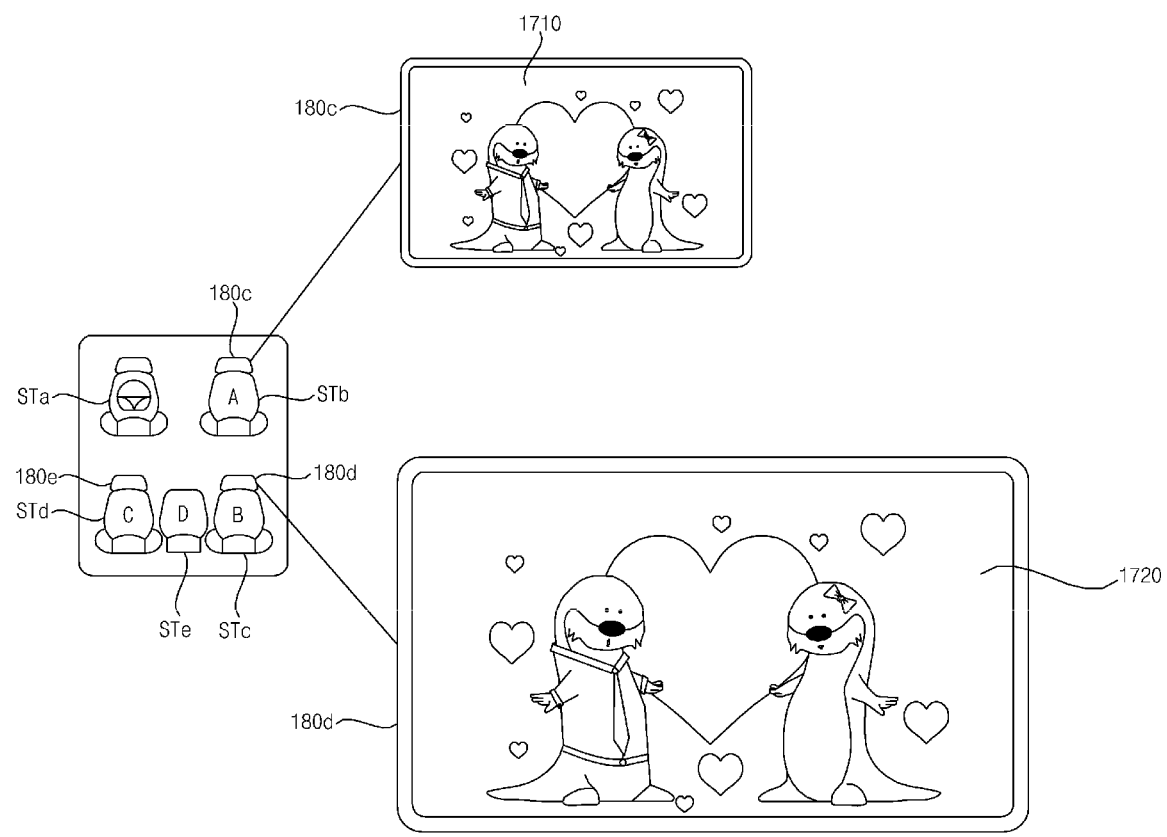

FIG. 19A is a diagram illustrating an example of displaying a portion of the second image, and FIG. 19B is a diagram illustrating an example of displaying the entire second image.

By displaying the image step by step, the direction between the first display 180*c* and the second display 180*d* may be displayed intuitively.

Figure 20:
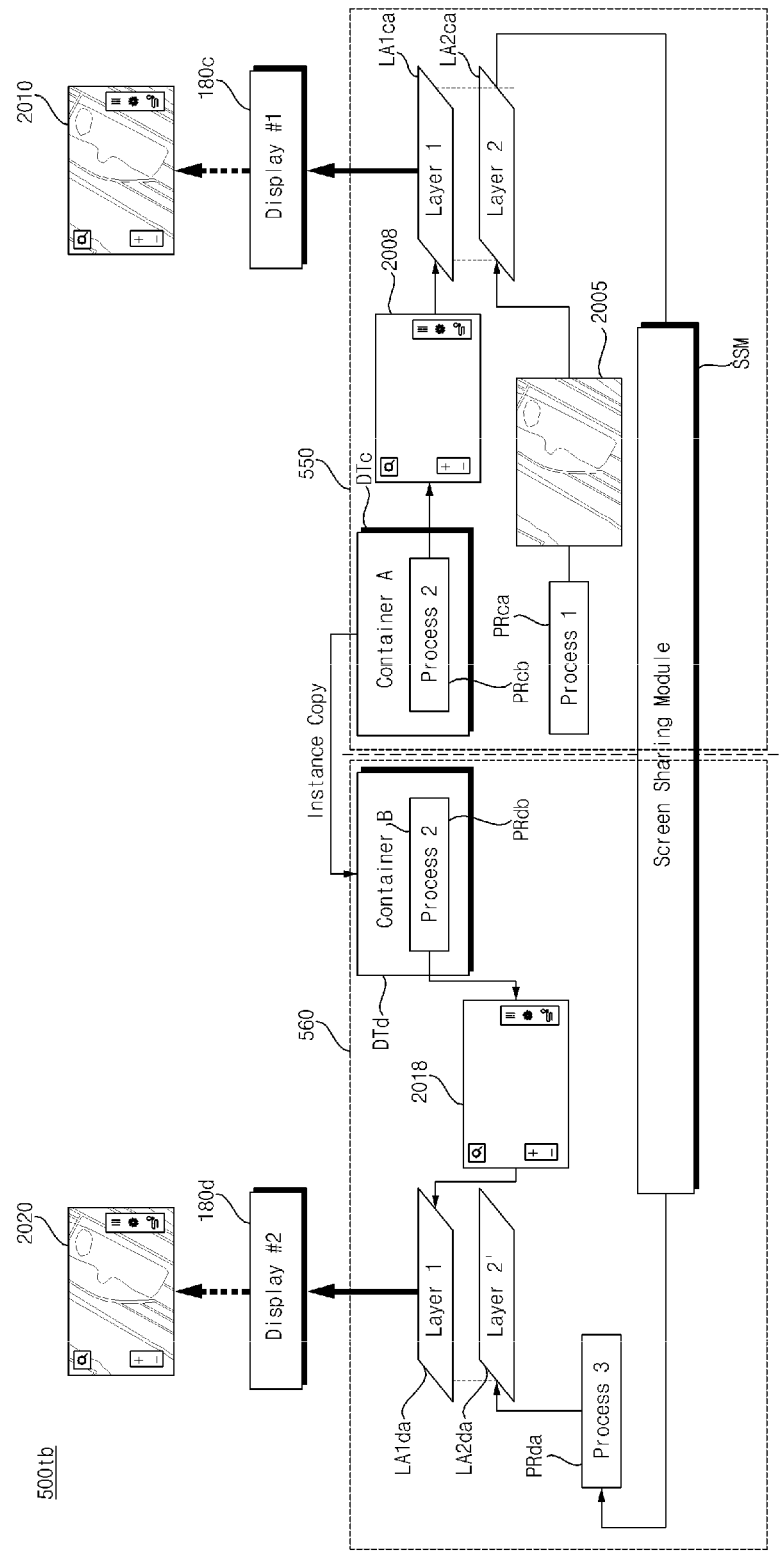

FIG. 20 is a diagram illustrating yet another example of a system executed in a signal processing device according to an embodiment of the present disclosure.

Referring to the drawing, a system 500*tb* running on the processor 175 in the signal processing device 170 according to an embodiment of the present disclosure may operate for the plurality of displays 180*c* and 180*d*.

For example, a first display of the plurality of displays 180*c* and 180*d* may be a passenger seat display 180*c*, and a second display thereof may be an RSE display 180*d*.

Meanwhile, the processor 175 may execute the fourth virtual machine 550 to control the passenger seat display 180*c* and execute the fifth virtual machine 560 to control the RSE display 180*d*.

Meanwhile, the processor 175 may execute the plurality of containers DTc and DTd, and particularly, the processor 175 may execute a first container DTc to control the passenger seat display 180*c* and execute a second container DTd to control the RSE display 180*d*.

In the drawing, an example is illustrated in which a process 1 PRCa in the fourth virtual machine 550 of the processor 175 generates a first overlay LA2*ca*.

The first overlay LA2*ca* may include map information, as illustrated in the drawing.

The fourth virtual machine 550 in the processor 175 may be configured to display the generated first overlay LA2*ca* on the first display 180*c* at a first time.

Meanwhile, the fourth virtual machine 550 the processor 175 may transmit the generated first overlay LA2*ca* or information related to the first overlay LA2*ca* to the fifth virtual machine 560 by using a screen sharing module SSM provided therein.

In the drawing, an example is illustrated in which a process 3 PRda in the fifth virtual machine 560 of the processor 175 generates a first overlay LA2*da* based on the received first overlay LA2*ca* or information related to the first overlay LA2*ca*.

Accordingly, the fifth virtual machine 560 in the processor 175 may be configured to display the generated first overlay LA2da on the second display 180d at a first time.

That is, the processor 175 may be configured to display a first image 2010 including the first overlay LA2ca on the first display 180c at the first time and transmit the first image 2010 or information related to the first image 2010 by screen sharing, and may be configured to display a second image 2020, which is a mirrored image corresponding to the first image 2010, on the second display 180d. Accordingly, the mirrored image may be displayed rapidly and accurately between the plurality of displays 180c and 180d in a vehicle.

Meanwhile, in response to receiving an input through a human machine interface after the first time, or in response to receiving data from an external source through the transceiver 120, or in response to receiving information, such as sensor information and the like, through the interface 130, the processor 175 may further generate an overlay based on the received input or information, or the like.

In the drawing, an example is illustrated in which a process 2 PRCb in the fourth virtual machine 550 of the processor 175 generates an additional overlay LA1ca.

Specifically, the process 2 PRCb in the first container DTc of the fourth virtual machine 550 in the processor 175 may generate the additional overlay LA1ca.

Further, the fourth virtual machine 550 in the processor 175 may be configured to display an image generated by merging the additional overlay LA1ca on top of the first overlay LA2ca on the first display 180c at a second time after the first time.

Meanwhile, the use of screen sharing module SSM during transmission of the additional overlay LA1ca to the fifth virtual machine 560 may result in considerable resource consumption or time consumption.

Accordingly, the embodiment of the present disclosure proposes a method of transmitting information related to the additional overlay LA1ca to the fifth virtual machine 560 by instance copying.

In the drawing, an example is illustrated in which the first container DTc in the fourth virtual chine 550 of the processor 175 transmits the information to the second container DTd in the fifth virtual machine 560 of the processor 175 by instance copying.

Accordingly, the process 2 PRCb in the second container DTd of the fifth virtual machine 560 in the processor 175 may generate an additional overlay LA1da based on the received information.

Further, the fifth virtual machine 560 in the processor 175 may be configured to display an image generated by merging the additional overlay LA1da on top of the first overlay LA2da on the second display 180d at a second time after the first time.

Accordingly, objects may be displayed rapidly and accurately by instance copying during screen sharing. Particularly, the additional overlay may be displayed rapidly and accurately.

Figure 21A:
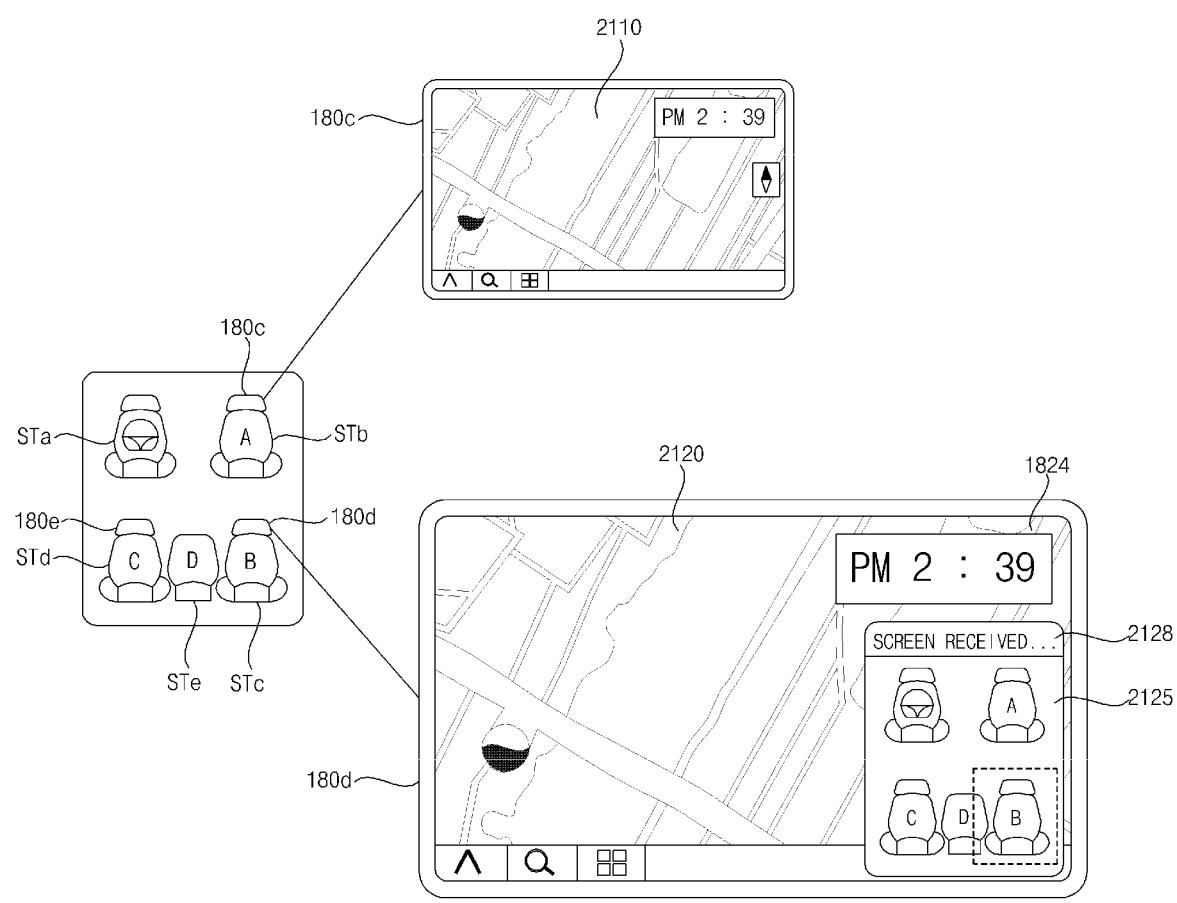

FIG. 21A is a diagram illustrating an example of displaying a first image 2110, including map information, on the passenger seat display 180c disposed in front of the passenger seat STb in a vehicle.

Meanwhile, the fourth virtual machine 550 may be configured to display the first image 2110 including the map information on the first display 180c which is the passenger seat display.

For example, the processor 175 may be configured to display the first image 2110 including a first overlay on the first display 180c.

In response to a mirroring input through the RSE display 180d disposed in front of the right rear seat STc while displaying the first image 2110 on the passenger seat display 180c, the fifth virtual machine 560 in the processor 175 may transmit a mirroring request or a screen sharing request to the fourth virtual machine 550.

In response thereto, the fourth virtual machine 560 in the processor 175 may transmit an image, corresponding to the first image 2110, or image information to the fifth virtual machine 560 in the processor 175.

Further, the fifth virtual machine 560 in the processor 175 may be configured to display a mirrored image corresponding to the received image or image information on the second display 180d.

That is, as illustrated in the drawing, while displaying the first image 2110 on the first display 180c, the processor 175 may be configured to display a second image 2120, which is a mirrored image, on the second display 180d.

Meanwhile, the fifth virtual machine 560 in the processor 175 may generate a second overlay, including screen sharing information, based on information related to the second overlay and may be configured to display screen sharing information 2128 on the second display 180d.

Particularly, the fifth virtual machine 560 in the processor 175 may be configured to display the second image 2120, which is the mirrored image, and the screen sharing information 2128 together.

Meanwhile, in addition to the second image 2120 and the screen sharing information 2128, the fifth virtual machine 560 in the processor 175 may control an object 2125 that represents seat information to be further displayed on the second display 180d.

Meanwhile, fourth virtual machine 550 in the processor 175 may be configured to display time information within the first image 2110, and the fifth virtual machine 560 in the processor 175 may be configured to display time information 1824 within the second image 2120 by instance copying.

Meanwhile, unlike the drawing, the second overlay may include message information.

For example, if the first overlay includes map information and the second overlay includes message information, the processor 175 may be configured to display the first image 2110 including the map information together with the message information on the first display 180c and display the second image 2120 and the message information together on the second display 180d.

Meanwhile, unlike the drawing, the second overlay may include a search item, a zoom in item, and a zoom out item.

For example, if the first overlay includes the map information and the second overlay includes the search item, zoom in item, and zoom out item, the processor 175 may be configured to display the first image 2110 including the map information together with the search item, zoom in item, and zoom out item on the first display 180c, and may be configured to display the second image 2120 together with the search item, zoom in item, and zoom out item on the second display 180d.

Meanwhile, unlike the drawing, the second overlay may include an item corresponding to the human machine interface.

For example, if the first overlay includes the map information and the second overlay includes the item corresponding to the human machine interface, the processor 175 may be configured to display the first image 2110 including the map information together with the item corresponding to the human machine interface on the first display 180c and display the second image 2120 together with the item corresponding to the human machine interface on the second display 180d.

Figure 21B:
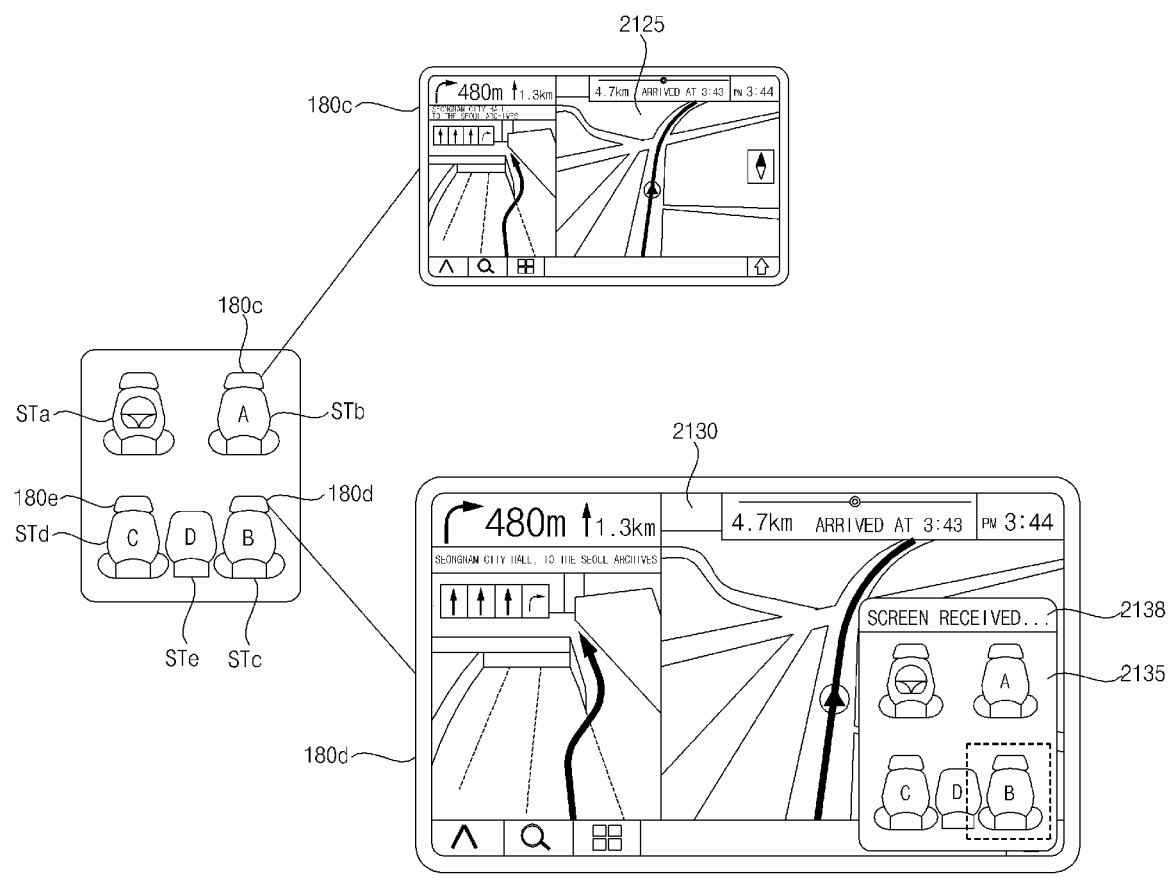

FIG. 21B is a diagram illustrating an example in which while an image 2125 including map information is displayed on the first display 180c, a mirrored image 2130 is displayed on the second display 180 by mirroring.

Meanwhile, the processor 175 may be configured to display the mirrored image 2130 and the screen sharing information 2128 together on the second display 180d.

Particularly, the fifth virtual machine 560 in the processor 175 may be configured to display the second image 2130, which is the mirrored image, together with the screen sharing information 2128.

Meanwhile, in addition to the second image 2130 and the screen sharing information 2128, the fifth virtual machine 560 in the processor 175 may control an object 2135 that represents seat information to be further displayed on the second display 180d.

Meanwhile, while displaying the first image including the map information on the first display 180c and displaying the second image, which is the mirrored image corresponding to the first image, on the second display 180d, in response to receiving destination information through the second display 180d, the processor 175 may generate a second overlay corresponding to the destination information, transmit information related to the second overlay by instance copying, and display a second overlay generated based on the information related to the second overlay on top of the first image on the first display 180c. Accordingly, the second overlay corresponding to the destination information may be displayed rapidly and accurately.

Further, after displaying the destination information, the processor 175 may display map information corresponding to the destination information.

Figure 21C:
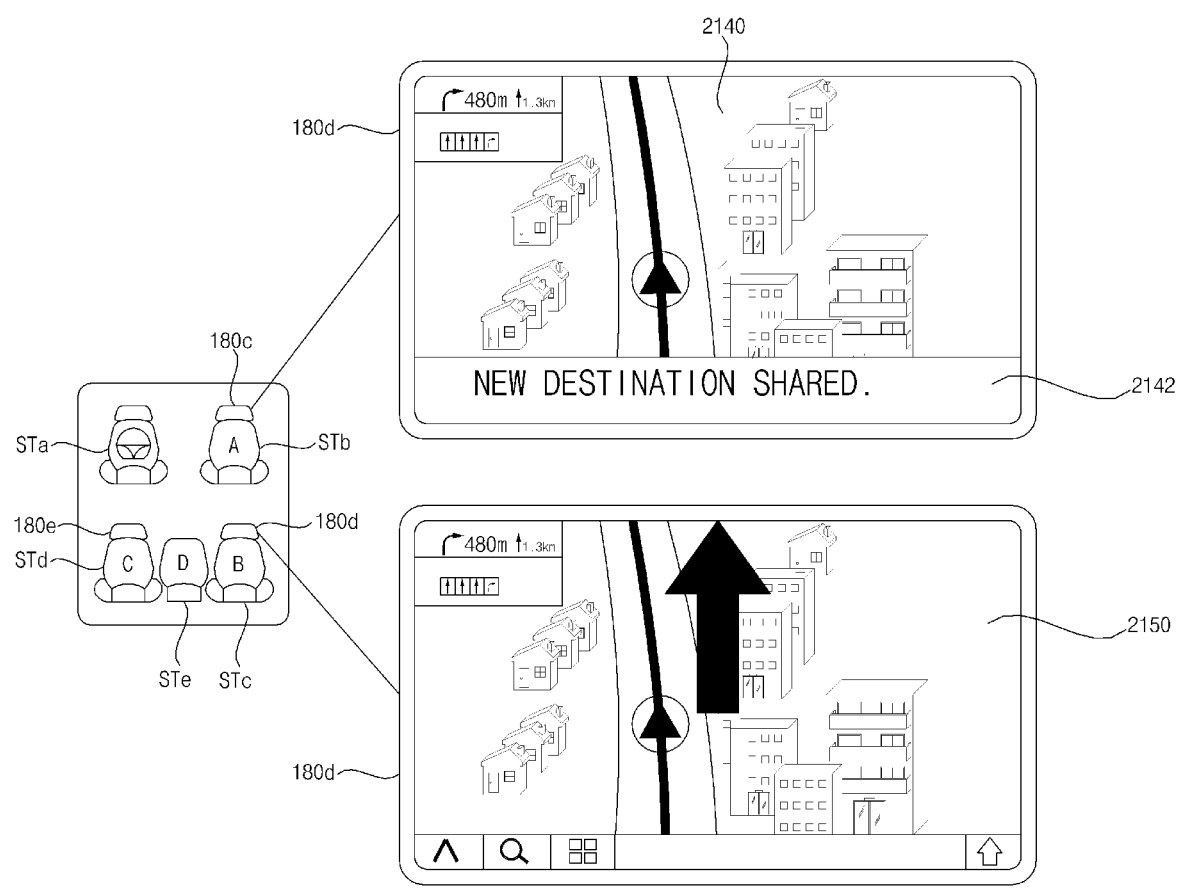

FIG. 21C is a diagram illustrating an example of sharing destination information.

Referring to the drawing, after the destination information is displayed, an image 2150 including destination map information may be displayed on the second display 180d, and a mirrored image 2140, corresponding to the destination map information, may be displayed on the first display 180c by screen sharing. Accordingly, the destination map information may be shared simply.

Figure 22:
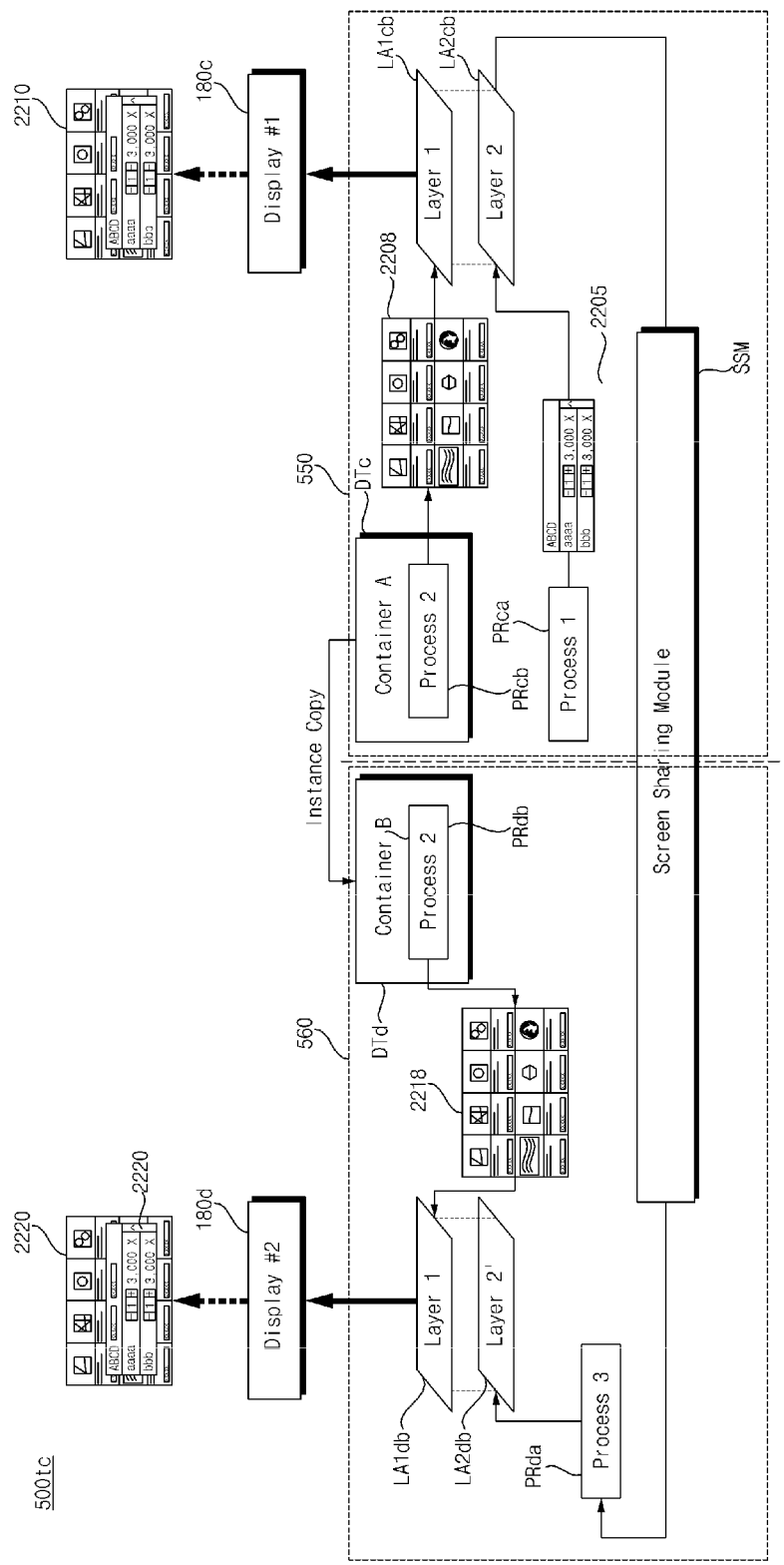

FIG. 22 is a diagram illustrating yet another example of a system executed in a signal processing device.

Referring to the drawing, a system 500tc running on the processor 175 in the signal processing device 170 according to an embodiment of the present disclosure may operate for the plurality of displays 180c and 180d.

Meanwhile, the processor 175 may execute the fourth virtual machine 550 to control the passenger seat display 180c and execute the fifth virtual machine 560 to control the RSE display 180d.

Meanwhile, the processor 175 may execute the plurality of containers DTc and DTd, and particularly, the processor 175 may execute a first container DTc to control the passenger seat display 180c and execute a second container DTd to control the RSE display 180d.

In the drawing, an example is illustrated in which a process 1 PRcb in the fourth virtual machine 550 of the processor 175 generates a first overlay LA2cb.

As illustrated in the drawing, the first overlay LA2cb may include order information.

The fourth virtual machine 550 in the processor 175 may be configured to display the generated first overlay LA2cb on the first display 180c at a first time.

Meanwhile, the fourth virtual machine 550 in the processor 175 may transmit the generated first overlay LA2cb or information related to the first overlay LA2cb to the fifth virtual machine 560 by using a screen sharing module SSM provided therein.

In the drawing, an example is illustrated in which a process 3 PRdb in the fifth virtual machine 560 of the processor 175 generates a first overlay LA2db based on the received first overlay LA2cb or information related to the first overlay LA2cb.

Accordingly, the fifth virtual machine 560 in the processor 175 may be configured to display the generated first overlay LA2db on the second display 180d at a first time.

Meanwhile, in response to receiving an input through a human machine interface after the first time, or in response to receiving data from an external source through the transceiver 120, or in response to receiving information, such as sensor information and the like, through the interface 130, the processor 175 may further generate an overlay based on the received input or information, or the like.

In the drawing, an example is illustrated in which a process 2 PRCb in the fourth virtual machine 550 of the processor 175 generates an additional overlay LA1cb.

Specifically, the process 2 PRCb in the first container DTc of the fourth virtual machine 550 in the processor 175 may generate the additional overlay LA1cb.

Further, the fourth virtual machine 560 in the processor 175 may be configured to display an image 2210 generated by merging the additional overlay LA1cb on top of the first overlay LA2cb on the first display 180c at a second time after the first time.

Meanwhile, the use of screen sharing module SSM during transmission of the additional overlay LA1cb to the fifth virtual machine 560 may result in considerable resource consumption or time consumption.

Accordingly, the embodiment of the present disclosure proposes a method of transmitting information related to the additional overlay LA1cb to the fifth virtual machine 560 by instance copying.

In the drawing, an example is illustrated in which the first container DTc in the fourth virtual chine 550 of the processor 175 transmits the information to the second container DTd in the fifth virtual machine 560 of the processor 175 by instance copying.

Accordingly, the process 2 PRCb in the second container DTd of the fifth virtual machine 560 in the processor 175 may generate an additional overlay LA1db based on the received information.

For example, the additional overlay LA1db may include a menu option screen.

Further, the fifth virtual machine 560 in the processor 175 may be configured to display an image 2220 generated by merging the additional overlay LA1db on top of the first overlay LA2db on the second display 180d at the second time after the first time. Accordingly, objects may be displayed rapidly and accurately by instance copying during screen sharing.

Meanwhile, the processor 175 may be configured to display a first image including the menu option screen on the first display 180c and display a second image of a mirrored image corresponding to the first mage on the second display 180d, and in response to receiving order information through the second display 180d while displaying the first image and the second image, the processor 175 may generate a second overlay, corresponding to the order information, and transmit information related to the second overlay by instance copying and display a second overlay generated based on the information related to the second overlay on top of the first image on the first display 180*c*. Accordingly, the second overlay corresponding to the order information may be displayed rapidly and accurately.

Figure 23A:
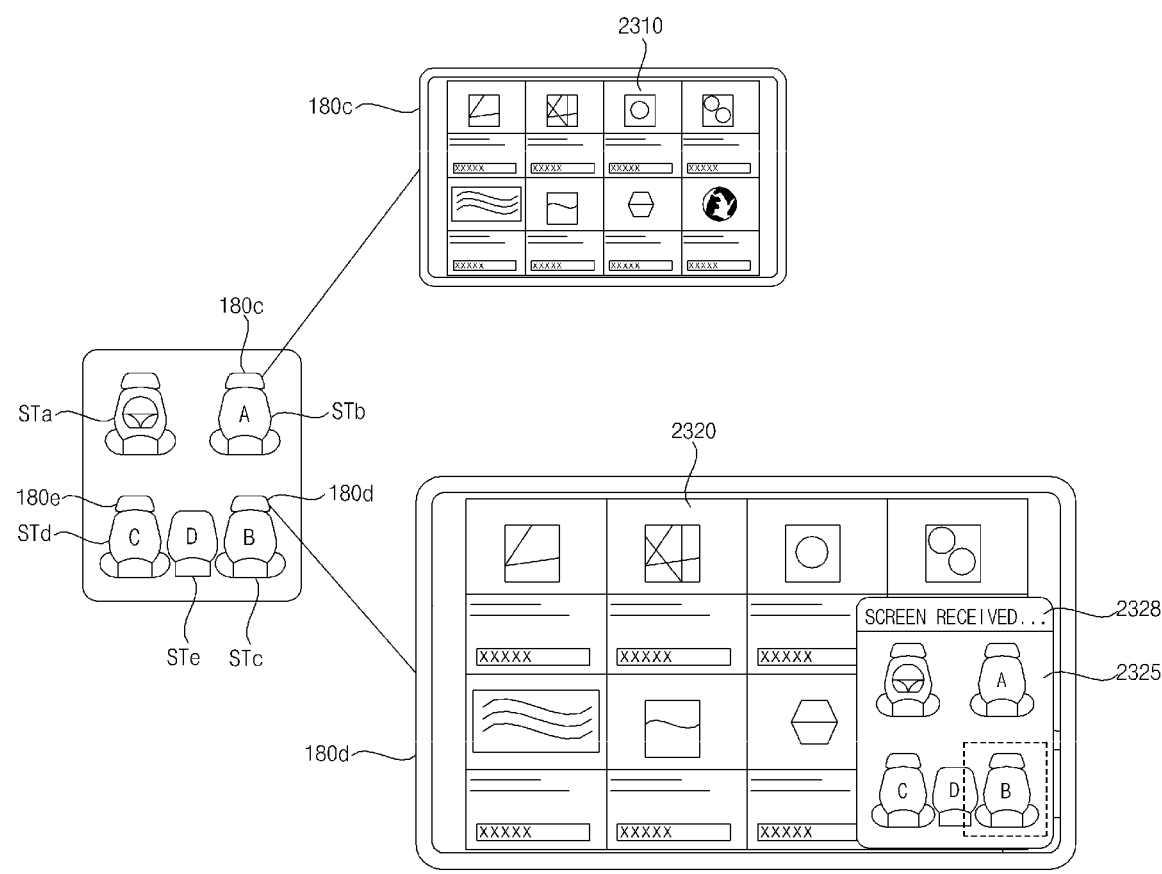

FIG. 23A is a diagram illustrating an example in which a menu option screen 2310 is displayed on the first display 180*c*, and a menu option screen 2320 which is a mirrored image is displayed on the second display 180*d*.

That is, while displaying the first image 2310 on the first display 180*c*, the processor 175 may be configured to display the second image 2320, which is the mirrored image, on the second display 180*d*.

Meanwhile, the fifth virtual machine 560 in the processor 175 may generate a second overlay, including screen sharing information, based on information related to the second overlay and may be configured to display screen sharing information 2328 on the second display 180*d*.

Particularly, the fifth virtual machine 560 in the processor 175 may be configured to display the second image 2320, which is the mirrored image, and the screen sharing information 2328 together.

Meanwhile, in addition to the second image 2320 and the screen sharing information 2328, the fifth virtual machine 560 in the processor 175 may control an object 2325 that represents seat information to be further displayed on the second display 180*d*.

Figure 23B:
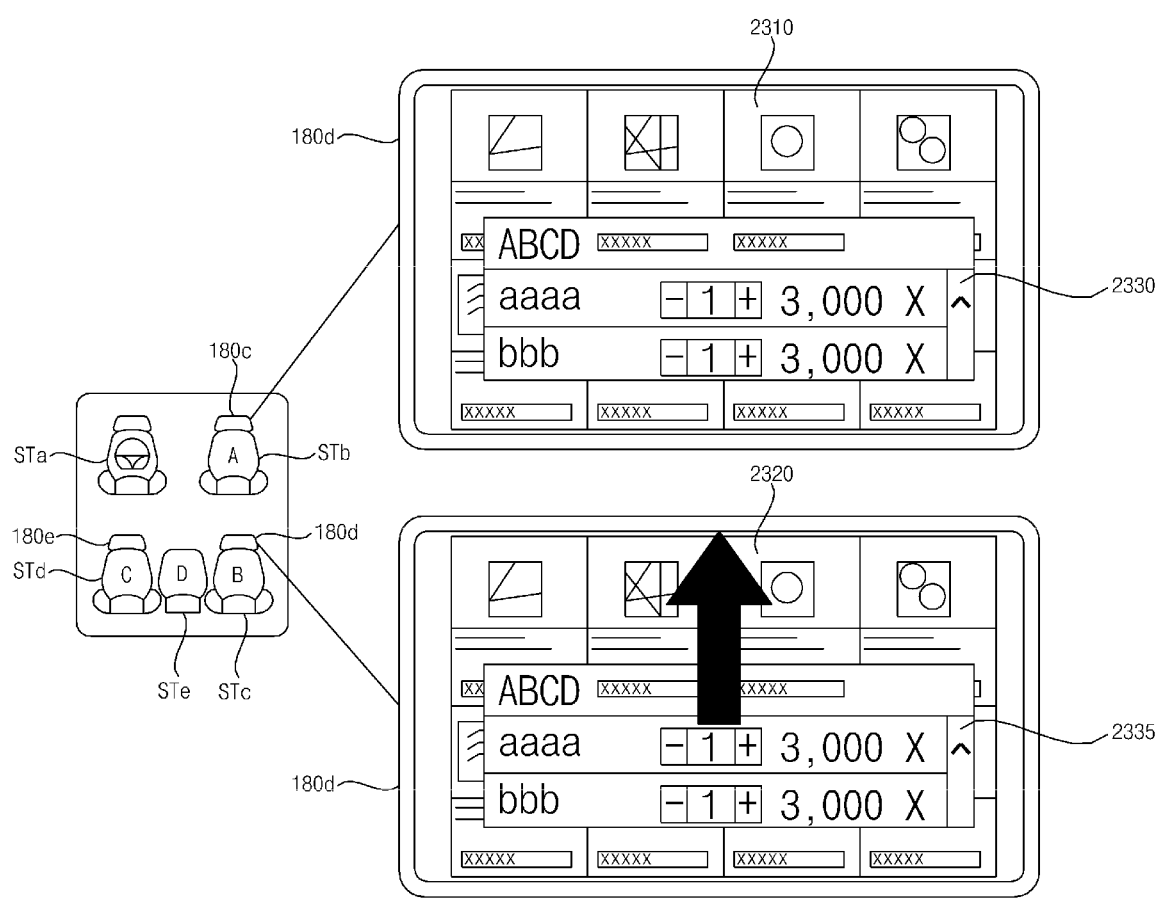

FIG. 23B is a diagram illustrating an example in which while the first image 2310 including a menu option screen is displayed on the first display 180*c* and the second image 2320, which is a mirrored image corresponding to the first image, is displayed on the second display 180*d*, in response to receiving order information through the second display 180*d*, the order information is shared.

Referring to the drawing, while displaying the first image 2310, including the menu option screen, on the first display 180*c* and displaying the second image 2320, which is the mirrored image corresponding to the first image, on the second display 180*d*, in response to receiving the order information through the second display 180*d*, the processor 175 may generate a second overlay corresponding to the order information and transmit information related to the second overlay by instance copying, and may be configured to display a second overlay 2330 generated based on the information related to the second overlay on top of the first image 2310 on the first display 180*c*. Accordingly, the second overlay, corresponding to the order information, may be displayed rapidly and accurately.

Meanwhile, as illustrated in the drawing, the processor 175 may be configured to display a second overlay 2335 corresponding to the order information on top of the second image 2320.

Figure 24A:
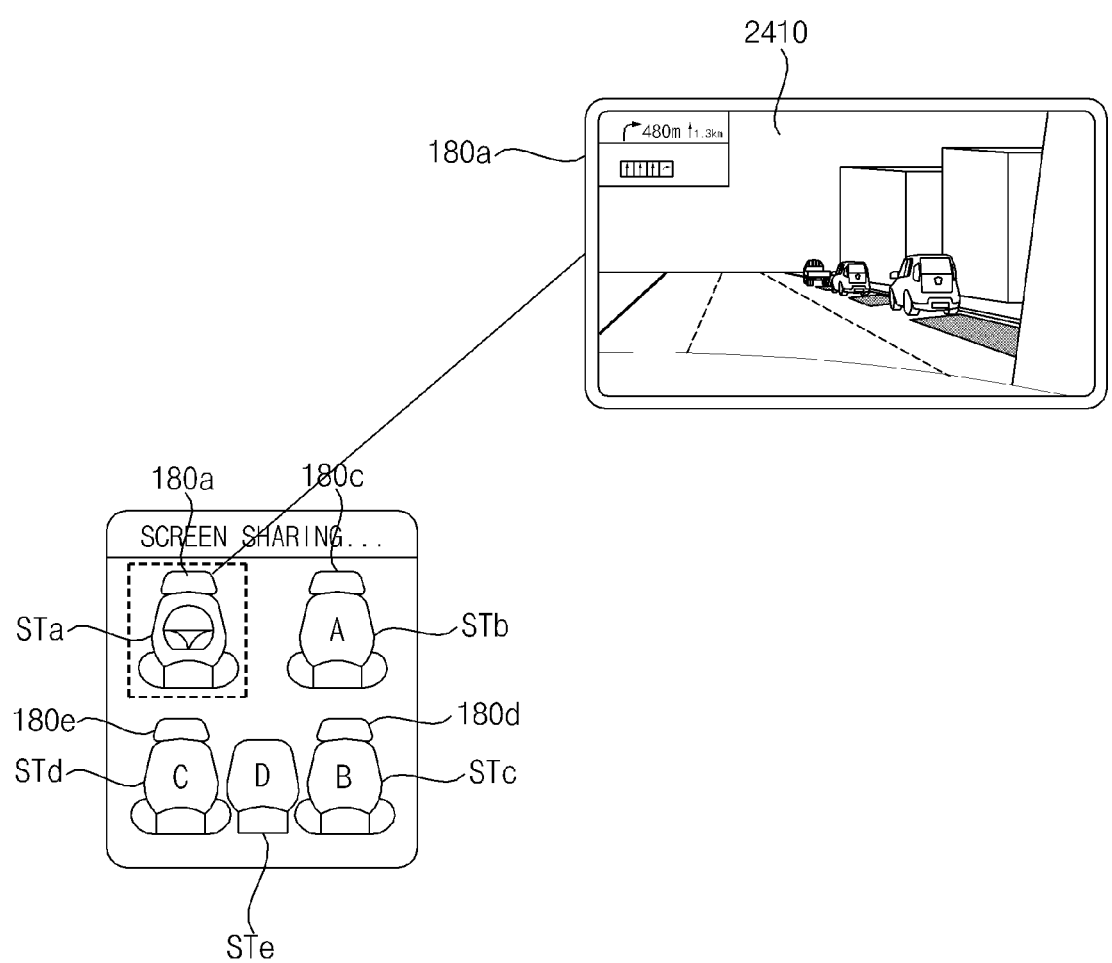
Figure 24B:
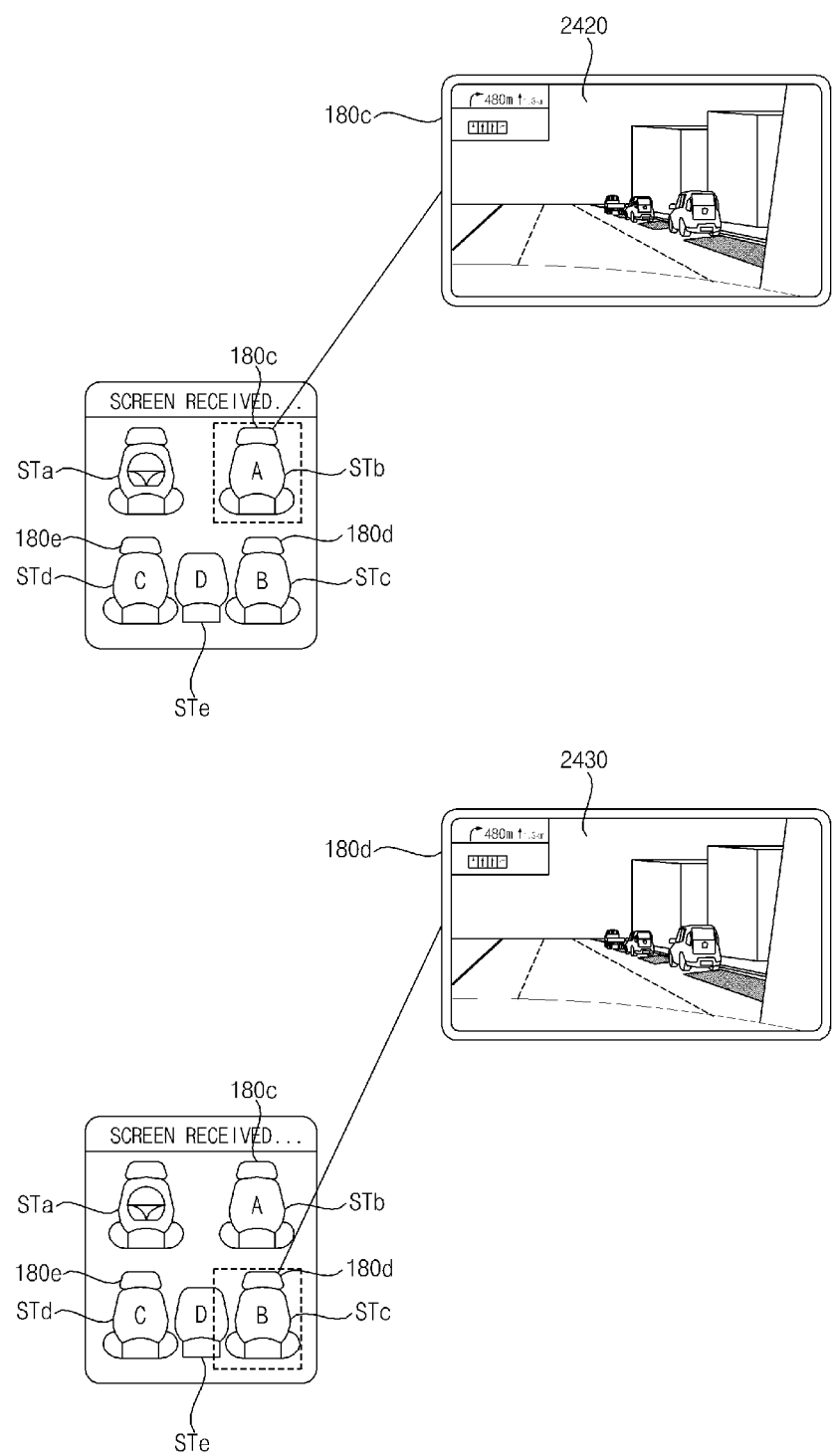

FIGS. 24A to 24B are d illustrating various examples of mirroring.

First, FIG. 24A illustrates an example of displaying an image 2410, including map information, on the driver's seat display 180*a*.

The processor 175 may be configured to display the image 2410 including location information, such as GPS, and map information indicating a current location by using stored map data on the cluster display 180*a*.

Specifically, the first virtual machine 520 in the processor 175 receives location information from the transceiver 120 or the sensor device 760 and map data from the memory 140.

Further, the first virtual machine 520 in the processor 175 may transmit the location information and the map data information to the second virtual machine 530.

Then, the second virtual machine 530 may generate an image by using the location information and the map data information and may be configured to display the generated image 2410 on the cluster display 180*a*.

Meanwhile, in response to a mirroring request from the passenger seat display 180*c*, the second virtual machine 530 in the processor 175 may transmit the first image or information related to the first image to the fourth virtual machine 550 in the processor 175 by screen sharing.

FIG. 24B is a diagram illustrating an example of displaying a mirrored image by mirroring.

Referring to the drawing, the fourth virtual machine 550 in the processor 175 may generate a first mirrored image 2420 based on the received first image or information related to the first image, and may be configured to display the first mirrored image 2420 on the passenger seat display 180*c*. Accordingly, the mirrored image may be displayed simply.

Then, in response to a mirroring request from the first RSE display 180*d*, the fourth virtual machine 550 in the processor 175 may transmit the first image or information related to the first image to the fifth virtual machine 560 in the processor 175 by screen sharing.

In addition, the fifth virtual machine 560 in the processor 175 may generate a second mirrored image 2430 based on the received first image or information related to the first image, and may be configured to display the second mirrored image 2430 on the first RSE display 180*d*. Accordingly, the mirrored image may be displayed simply.

Meanwhile, the processor 175 may be configured to display the first image including the map information on the first display 180*c* and display the second image, which is the mirrored image corresponding to the first image, on the second display 180*d*, and in response to receiving traffic information and place information while displaying the first image and the second image, the processor 175 may generate a second overlay corresponding to the traffic information and a third overlay corresponding to the place information and transmit information related to the second overlay and information related to the third overlay by instance copying, and may display a second overlay generated based on the information related to the second overlay on top of the first image on the first display 180*c* and display a third overlay generated based on the information related to the third overlay on top of the second image on the second display 180*d*. Accordingly, different information may be displayed on each display rapidly and accurately.

For example, as illustrated in FIG. 24B, while displaying the first mirrored image 2420 and the second mirrored image 2430 on the passenger seat display 180*c* and the first RSE display 180*d*, respectively, the processor 175 may be configured to display information customized for each seat or each individual on each display.

Specifically, while displaying the first mirrored image 2420 and the second mirrored image 2430 on the passenger seat display 180*c* and the first RSE display 180*d*, respectively, in response to receiving traffic information and place information through the transceiver 120 and the like, the fourth virtual machine 550 in the processor 175 may be configured to display the generated traffic information together with the first mirrored image 2420 by instance copying, and the fifth virtual machine 560 in the processor 175 may be configured to display the generated place information together with the second mirrored image 2430 by instance copying. Accordingly, different information may be displayed on each display rapidly and accurately.

FIG. 25A is a diagram illustrating an example in which an image 2505 displayed on the first RSE display 180*d* is mirrored, such that a mirrored image 2510 is displayed on the passenger seat display 180c.

In this case, the processor 175 may be configured to display screen sharing information 2528 and seat information 2525 together with the mirrored image 2510.

FIG. 25B is a diagram illustrating an example in which during display of the first image 2510 and the second image 2505, an object or an overlay is displayed only on top of the first image 2510.

Referring to the drawing, the processor 175 may be configured to display the first image 2510 on the first display 180c and display the second image 2505 corresponding to the first image 2510 on the second display 180d, and in response to receiving social networking service information while displaying the first image 2510 and the second image 2505, the processor 175 may generate overlay corresponding to the social networking service information and transmit information related to the second overlay by instance copying, and may be configured to display a second overlay 2530 generated based on the information related to the second overlay on top of the first image 2510 on the first display 180c and not display the second overlay on the second display 180d. Accordingly, the second overlay 2530 may be displayed only on the first display 180c rapidly and accurately. That is, by controlling display of information for each seat, user convenience may be improved.

FIG. 26A is a diagram illustrating an example in which while a first image 2610 is displayed on the passenger seat display 180c, a mirrored image is transmitted to a display of another seat.

Referring to the drawing, the fourth virtual machine 550 in the processor 175 may be configured to display the first image 2610 on the passenger seat display 180c.

Meanwhile, in response to a mirroring transmission input through a human machine interface, the fourth virtual machine 550 in the processor 175 may be configured to display screen sharing information 2628 and seat information 2625 together.

In addition, if a right rear seat item 2629 is selected from the seat information 2625, the fourth virtual machine 550 in the processor 175 may transmit the first image 2610 or information related to the first image 2610 to the fifth virtual machine 560.

The fifth virtual machine 560 in the processor 175 may generate a mirrored image based on the received first image 2610 or information related to the first image 2610 and may be configured to display the mirrored image.

FIG. 26B is a diagram illustrating an example in which the first image 2610 is displayed on the passenger seat display 180c, and a second image 2630, which is a mirrored image, is displayed on the first RSE display 180d. Accordingly, the mirrored image may be displayed rapidly and accurately.

Meanwhile, the first image 2610 or the second image 2630 of FIG. 26B may include a video call screen.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device, comprising:
a processor configured to perform signal processing for displays located in a vehicle, execute a hypervisor, and execute a plurality of virtual machines on the hypervisor; and a memory configured to store data regarding the hypervisor or the plurality of virtual machines,
wherein the processor is configured to:
display a first image including a first overlay on a first display, transmit the first image by screen sharing, and display a second image of a mirrored image corresponding to the first image on a second display;
generate a second overlay different from the first overlay while displaying the first image and the second image;
transmit information related to the second overlay by instance copying;
display a second overlay generated based on the information related to the second overlay on top of the first image and the second image;
display an information indicating that mirroring is in progress; and
execute a server virtual machine and a plurality of guest virtual machines,
wherein a first guest virtual machine of the plurality of guest virtual machines is operated for the first display, and a second guest virtual machine of the plurality of guest virtual machines is operated for the second display,
wherein the server virtual machine is configured to allocate a shared memory using the hypervisor, and write the information related to the second overlay in the shared memory,
wherein the first guest virtual machine and the second guest virtual machine are configured to access the shared memory based on a received key data and receive the information related to the second overlay from the shared memory, and
wherein the first guest virtual machine is configured to display the first image including the second overlay generated based on the information related to the second overlay, and the second guest virtual machine is configured to display the second image including the second overlay generated based on the information related to the second overlay.

2. The signal processing device of claim 1, wherein after displaying the first image and the second image, the processor is configured to display images including the first overlay and the second overlay on the first display and the second display, respectively.

3. The signal processing device of claim 1, wherein in response to receiving an input through a human machine interface while displaying the first image and the second image, the processor is configured to generate the second overlay.

4. The signal processing device of claim 1, wherein the processor is configured to:
in response to receiving an input through the first display while displaying the first image and the second image, generate the second overlay and display a third image, including the first overlay and the second overlay on the first display;
transmit information related to the second overlay by instance copying; and
display a fourth image including the second overlay generated based on the information related to the second overlay and the first overlay on the second display.

5. The signal processing device of claim 1, wherein the processor is configured to:
- in response to receiving an input through the second display while displaying the first image and the second image, generate the second overlay and display a third image, including the first overlay and the second overlay on the second display;
- transmit information related to the second overlay by instance copying; and
- display a fourth image including the second overlay generated based on the information related to the second overlay and the first overlay on the first display.

6. The signal processing device of claim 1, wherein the processor is configured to execute a plurality of containers, the plurality of containers operating for a plurality of displays, respectively,
- wherein among the plurality of containers, a first container is configured to transmit the information related to the second overlay to a second container by the instance copying, and the second container is configured to generate the second overlay based on the information received from the first container.

7. The signal processing device of claim 1, wherein the first overlay includes map information, and the second overlay includes message information.

8. The signal processing device of claim 1, wherein the first overlay includes map information, and the second overlay includes a search item, a zoom in item, and a zoom out item.

9. The signal processing device of claim 1, wherein the first overlay includes map information, and the second overlay includes an item corresponding to a human machine interface,
- wherein in response to receiving an input through the human machine interface, the processor is configured to generate the second overlay.

10. The signal processing device of claim 1, wherein the processor is configured to:
- display the first image including the first overlay on the first display;
- display the second image of the mirrored image corresponding to the first image on the second display by screen sharing; and
- while displaying the second image on the second display, further display screen sharing information.

11. The signal processing device of claim 10, wherein while displaying the screen sharing information, the processor is configured to further display seat information related to an image source.

12. The signal processing device of claim 1, wherein the processor is configured to:
- display the first image including the first overlay on the first display; and
- while displaying the second image of the mirrored image corresponding to the first image, on the second display by the screen sharing, sequentially enlarge and display the second image.

13. The signal processing device of claim 1, wherein while displaying the second image on the second display, the processor is configured to control screen sharing information to disappear after being displayed for a predetermined period of time.

14. The signal processing device of claim 1, wherein the processor is configured to:
- display the first image including map information on the first display and display the second image of the mirrored image corresponding to the first image on the second display;
- in response to receiving destination information through the second display while displaying the first image and the second image, generate the second overlay corresponding to the destination information;
- transmit information related to the second overlay by instance copying; and
- display the second overlay generated based on the information related to the second overlay on top of the first image on the first display.

15. The signal processing device of claim 1, wherein the processor is configured to:
- display the first image including a menu option screen on the first display and display the second image of the mirrored image corresponding to the first image on the second display;
- in response to receiving order information through the second display while displaying the first image and the second image, generate the second overlay corresponding to the order information;
- transmit information related to the second overlay by instance copying; and
- display the second overlay generated based on the information related to the second overlay on top of the first image on the first display.

16. The signal processing device of claim 1, wherein the processor is configured to:
- display the first image including map information on the first display and display the second image of the mirrored image corresponding to the first image on the second display;
- in response to receiving traffic information and place information while displaying the first image and the second image, generate the second overlay corresponding to the traffic information and a third overlay corresponding to the place information;
- transmit information related to the second overlay by instance copying and information related to the third overlay;
- display the second overlay generated based on the information related to the second overlay on top of the first image on the first display; and
- display a third overlay generated based on the information related to the third overlay on top of the second image on the second display.

17. The signal processing device of claim 1, wherein the processor is configured to:
- display the first mage on the first display and display the second image corresponding to the first image on the second display;
- in response to receiving social networking service information while displaying the first image and the second image, generate the second overlay corresponding to the social networking service information;
- transmit information related to the second overlay by instance copying;
- display the second overlay generated based on the information related to the second overlay on top of the first image on the first display; and
- not display the second overlay on the second display.

18. The signal processing device of claim 1,
the first guest virtual machine is configured to display the first image including the first overlay on the first display and to transmit the first image by screen sharing; and
the second guest virtual machine is configured to display the second image of the mirrored image corresponding to the first image on the second display,
wherein:
the first guest virtual machine is configured to generate the second overlay different from the first overlay, while displaying the first image and the second image and to transmit information related to the second overlay by instance copying; and
the second guest virtual machine is configured to display the second overlay generated based on the information related to the second overlay on top of the second image.

19. The signal processing device of claim 1,
wherein a touch input to the first display or a touch input to the second display is input only to the server virtual machine, and is not input to the first guest virtual machine and the second guest virtual machine, and
wherein the server virtual machine is configured to transmit information regarding the touch input to the first guest virtual machine or the second guest virtual machine.

20. A vehicle display apparatus, comprising:
a first display;
a second display; and
a signal processing device comprising a processor configured to perform signal processing for the first display and the second display, execute a hypervisor, and execute a plurality of virtual machines on the hypervisor,
wherein the processor is configured to:
display a first image including a first overlay on a first display, transmit the first image by screen sharing, and display a second image of a mirrored image corresponding to the first image on a second display;
generate a second overlay different from the first overlay while displaying the first image and the second image;
transmit information related to the second overlay by instance copying;
display a second overlay generated based on the information related to the second overlay on top of the first image or the second image;
display an information indicating that mirroring is in progress; and
execute a server virtual machine and a plurality of guest virtual machines,
wherein a first guest virtual machine among the plurality of guest virtual machines is operated for the first display, and a second guest virtual machine among the plurality of guest virtual machines is operated for the second display,
wherein the server virtual machine is configured to allocate a shared memory using the hypervisor, and write the information related to the second overlay in the shared memory,
wherein the first guest virtual machine and the second guest virtual machine are configured to access the shared memory based on a received key data and receive the information related to the second overlay from the shared memory, and
wherein the first guest virtual machine is configured to display the first image including the second overlay generated based on the information related to the second overlay, and the second guest virtual machine is configured to display the second image including the second overlay generated based on the information related to the second overlay.

* * * * *